(12) United States Patent
Thometschek et al.

(10) Patent No.: US 11,465,325 B2
(45) Date of Patent: Oct. 11, 2022

(54) METHOD FOR MANUFACTURING A CLOSURE FOR A PRODUCT-RETAINING CONTAINER

(71) Applicant: VINVENTIONS USA, LLC, Zebulon, NC (US)

(72) Inventors: Marc Anton Charles Thometschek, Zandvoorde (BE); Olav Marcus Aagaard, Rotterdam (NL); Floriane Marie Gabrielle Morel, Marcq en Baroeul (FR); Niels René Roos Everaert, Sint-Denijs (BE); Charlotte Laetitia Jeanette Boutry, Villeneuve d'Ascq (FR); Christine Phi Phuong Duong, Paris (FR)

(73) Assignee: VINVENTIONS USA, LLC, Zebulon, NC (US)

( * ) Notice: Subject to any disclaimer, the term of this patent is extended or adjusted under 35 U.S.C. 154(b) by 205 days.

(21) Appl. No.: 16/186,232

(22) Filed: Nov. 9, 2018

(65) Prior Publication Data

US 2019/0134872 A1 May 9, 2019

Related U.S. Application Data

(60) Provisional application No. 62/583,584, filed on Nov. 9, 2017.

(51) Int. Cl.
  *B29C 48/154* (2019.01)
  *B65D 39/00* (2006.01)
  (Continued)

(52) U.S. Cl.
  CPC ............... *B29C 48/154* (2019.02); *B27J 5/00* (2013.01); *B27N 1/02* (2013.01); *B29C 48/0011* (2019.02);
  (Continued)

(58) Field of Classification Search
  CPC . B29C 48/0011; B29C 48/0022; B29C 48/06; B29C 48/154; B29C 48/2883;
  (Continued)

(56) References Cited

U.S. PATENT DOCUMENTS 2,244,750 A    6/1941   Weisenburg
2,631,355 A    3/1953   Craig
(Continued)

FOREIGN PATENT DOCUMENTS

CN        1124968 A    6/1996
CN        1646387 A    7/2005
(Continued)

OTHER PUBLICATIONS

Machine translation of FR 3020592 published Nov. 6, 2015. (Year: 2015).*
(Continued)

*Primary Examiner* — Xiao S Zhao
*Assistant Examiner* — Joseph S Leyson
(74) *Attorney, Agent, or Firm* — Withrow & Terranova, P.L.L.C.; Vincent K. Gustafson

(57) ABSTRACT

A method for manufacturing a closure constructed to be inserted and securely retained in a neck of a product-retaining container includes intimately combining a plurality of coated particles (each comprising a cork material core and a first plastic material) with a second plastic material, and other optional constituents; heating the composition to form a melt; extruding or molding a closure precursor from the melt; and optionally cutting and/or finishing the closure precursor. A composition for use in manufacturing a closure includes a plurality of coated particles (each comprising a cork material core and a first plastic material) with a second plastic material, and one or more blowing agents. Methods for producing particulate material, cork composite material,
(Continued)

and additional method for producing closures are also provided.

43 Claims, 2 Drawing Sheets

(51) Int. Cl.
  B29C 48/06      (2019.01)
  B29D 99/00     (2010.01)
  B29C 48/285    (2019.01)
  B29C 48/80     (2019.01)
  B29K 711/02    (2006.01)
  B29L 31/56     (2006.01)
  B27J 5/00      (2006.01)
  B29C 71/02     (2006.01)
  B29C 48/00     (2019.01)
  B27N 1/02      (2006.01)
  B29L 9/00      (2006.01)
  B29K 67/00     (2006.01)
  B27N 3/28      (2006.01)
  B29B 7/90      (2006.01)

(52) U.S. Cl.
  CPC .......... B29C 48/0022 (2019.02); B29C 48/06
       (2019.02); B29C 48/2883 (2019.02); B29C
       48/802 (2019.02); B29C 71/02 (2013.01);
       B29D 99/0096 (2013.01); B65D 39/0011
       (2013.01); B65D 39/0017 (2013.01); B65D
       39/0058 (2013.01); B27N 3/28 (2013.01);
       B29B 7/90 (2013.01); B29K 2023/06
       (2013.01); B29K 2067/00 (2013.01); B29K
       2711/02 (2013.01); B29L 2009/005 (2013.01);
       B29L 2031/56 (2013.01); B29L 2031/565
       (2013.01); B65D 2539/001 (2013.01)

(58) Field of Classification Search
  CPC ... B29C 48/2886; B29C 48/30; B29C 48/802;
       B29C 48/832; B29C 48/845; B29C 71/02;
       B27J 5/00; B29D 99/0096; B29K
       2711/02; B29L 2009/005; B29L 2031/56;
       B29L 2031/565; B65D 39/0011; B65D
       39/0017; B65D 39/0058; B65D 2539/001
  See application file for complete search history.

(56) References Cited

U.S. PATENT DOCUMENTS

| | | |
|---|---|---|
| 2,884,060 A | 4/1959 | Kao et al. |
| 4,042,543 A | 8/1977 | Strickman et al. |
| 4,647,324 A | 3/1987 | Mtangi et al. |
| 4,664,275 A | 5/1987 | Kasai et al. |
| 5,236,645 A | 8/1993 | Jones |
| 5,317,047 A | 5/1994 | Sabate et al. |
| 8,063,163 B2 | 11/2011 | Hatke et al. |
| 2002/0103275 A1 | 8/2002 | Nogueria de Sousa |
| 2004/0024073 A1 | 2/2004 | Stieler et al. |
| 2004/0247644 A1* | 12/2004 | Bratt ............... A61L 27/446 424/426 |
| 2006/0284334 A1 | 12/2006 | Christel |
| 2008/0300345 A1 | 12/2008 | Pfaadt |
| 2014/0224759 A1 | 8/2014 | Aagaard et al. |
| 2016/0039577 A1 | 2/2016 | Aagaard et al. |
| 2016/0351885 A1 | 12/2016 | Umehara |
| 2017/0232640 A1 | 8/2017 | Hollar, Jr. et al. |
| 2018/0362198 A1* | 12/2018 | Volpe .................. D01F 1/10 |
| 2019/0135498 A1 | 5/2019 | Thometschek et al. |
| 2019/0135499 A1 | 5/2019 | Thometschek et al. |
| 2019/0135500 A1 | 5/2019 | Thometschek et al. |
| 2019/0136063 A1 | 5/2019 | Thometschek et al. |

FOREIGN PATENT DOCUMENTS

| | | | |
|---|---|---|---|
| CN | 101203438 A | 6/2008 | |
| CN | 102361801 A | 2/2012 | |
| CN | 202529211 U | 11/2012 | |
| CN | 103025619 A | 4/2013 | |
| CN | 104487357 A | 4/2015 | |
| CN | 104507649 A | 4/2015 | |
| CN | 105857879 A | 8/2016 | |
| EP | 2014723 A1 | 1/2009 | |
| FR | 2799183 A1 | 4/2001 | |
| FR | 3020592 A1 * | 11/2015 | ............. B29C 70/58 |
| FR | 3030592 A1 | 6/2016 | |
| GB | 669548 | 4/1952 | |
| GB | 2347407 A | 9/2000 | |
| WO | 03018304 A1 | 3/2003 | |
| WO | 2004103844 A1 | 12/2004 | |
| WO | 2012029448 A1 | 3/2012 | |
| WO | 2017106191 A1 | 6/2017 | |

OTHER PUBLICATIONS

Author Unknown, "Advanced Force Gauge (Model AFG) Specifications," Qantrol™ by Dillon, Retrieved Feb. 14, 2019 from https://dqplus.com/pdf/afg_u.pdf, 2 pages.
Author Unknown, "Coefficient of Friction Fixture—2810-005," Instron, Retrieved Feb. 15, 2019 from http://www.instron.us/-/media/literature-library/products/2012/11/coefficient-of-friction-fixture-2810005.pdf?la=en-US, 2 pages.
Author Unknown, "Corking 4040," 2013, Prospero International, Retrieved Feb. 14, 2019 from http://www.prosperointernational.it/en/prodotti/gai/corking-4040/, 2 pages.
Author Unknown, "Dynaflex™ Thermoplastic Elastomers," 2015, PolyOne, Retrieved Feb. 14, 2019 from http://www.polyone.com/products/thermoplastic-elastomers/gls-dynaflex-thermoplastic-elastomers, 2 pages.
Author Unknown, "ecoflex® F Blend C1200: Biodegradable polyester for compostable film," Product Information, Version 1.0, Jan. 2013, BASF SE, Retrieved Feb. 1, 2018 from https://www.plasticsportal.net/wa/plasticsEU~en.../Ecoflex_F_Blend_C1200.pdf, 3 pages.
Author Unknown, "Elastocon TPE—TPE Products," 2019, Elastocon TPE Technologies, Inc., Retrieved Feb. 14, 2019 from https://www.elastocontpe.com/tpe-products/, 2 pages.
Author Unknown, "Elexar®: Wired for Performance," 2019, Teknor Apex, Retrieved Feb. 14, 2019 from https://www.teknorapex.com/elexar-tpes-for-flexible-cords-and-cables, 1 page.
Author Unknown, "Europrene® SOL T/TH TPR," Oct. 2018, Versalis S.p.A., Retrieved Feb. 14, 2019 from https://www.versalis.eni.com/irj/go/km/docs/versalis/Contenuti%20Versalis/EN/Documenti/Prodotti/Elastomeri/Brochure/TPR_violetto_ESE_02.pdf, 10 pages.
Author Unknown, "Evoprene®," 2018, Mexichem Specialty Compounds, Inc., Retrieved Feb. 14, 2018 from https://www.mexichemspecialtycompounds.com/brands/evoprene/browse/?technology=2&market=5, 4 pages.
Author Unknown, "Expancel blowing agents," 2019, Nouryon, Retrieved Feb. 14, 2019 from https://expancel.nouryon.com/blowing-agents/, 8 pages.
Author Unknown, "Green Polymer Additives: Additives by Resin," Dec. 2016, Emery Oleochemicals, Retrieved Feb. 14, 2019 from https://greenpolymeradditives.emeryoleo.com/wp-content/uploads/Emery_GPA_EN.pdf, 24 pages.
Author Unknown, "Globalprene Thermoplastic Elastomers," LCY Chemical Corporation, Retrieved Feb. 14, 2019 from https://www.lcygroup.com/lcy/en/SBC.php, 3 pages.
Author Unknown, "High performance Ceralene® waxes," Euroceras, Retrieved Feb. 14, 2019 from https://www.euroceras.com/products/, 4 pages.
Author Unknown, "Hydrocerol®: Chemical Foaming & Nucleating Agents," Product Data Sheet Additive Masterbatches, Dec. 18, 2018, Clariant International Ltd., Retrieved Feb. 1, 2018 from https://www.clariant.com/polska/en/products/additives/hydrocerol, 2 pages.

(56) References Cited

OTHER PUBLICATIONS

Author Unknown, "Hydrotopcork," Mikroquimica, Retrieved Feb. 14, 2019 from http://www.mikroquimica.pt/en/products/equalising/hydrotopcork/, 3 pages.
Author Unknown, "Invision®," A. Schulman, Inc., Retrieved Feb. 14, 2019 from https://www.aschulman.com/products/engineered-thermoplastics, 1 page.
Author Unknown, "Kraton™ Products," 2019, Kraton Corporation, Retrieved Feb. 14, 2019 from http://kraton.com/products/KRATON_D_SIS.php, 19 pages.
Author Unknown, "Leostomer®," Riken Technos Corp, Retrieved Feb. 14, 2019 from https://www.rikentechnos.co.jp/e/product/item/plug-e/, 5 pages.
Author Unknown, "Licocene® Performance Polymers," 2013, Clariant International Ltd., Retreived Feb. 14, 2019 from https://www.google.com/url?sa=t&rct=j&q=&esrc=s&source=web&cd=1&ved=2ahUKEwjvlLbZkrzgAhVDcq0KHSPpDlcQFjAAegQICRAC&url=https%3A%2F%2Fwww.clariant.com%2F~%2Fmedia%2FFiles%2FSolutions%2FProducts%2FAdditional-Files%2FC%2FCeridust-3610%2FLicocene_Performance_Polymers.pdf&usg=AOvVaw0w69pMVbUtkcjLTNLAmor4, 4 pages.
Author Unknown, "Luwax®," BASF, Retrieved Feb. 14, 2019 from https://worldaccount.basf.com/wa/AP~en_US/Catalog/ChemicalsAP/pi/BASF/Brand/luwax, 1 page.
Author Unknown, "Maxelast® TPEs," Nantong Polymax Elastomer Technology Co., Ltd., Retrieved Feb. 1, 2018 from www.apstpe.com/maxelast, 6 pages.
Author Unknown, "megol® SEBS Compounds—TPE," 2018, API, Retrieved Feb. 14, 2019 from https://www.apiplastic.com/en/products/tpes/tpe-s/megol/, 12 pages.
Author Unknown, "Product Specification: Micro Agglomerated Cork Bungs," Puretree Cork, May 1, 2015, https://puretreecork.com/storage/products/product_documents//24035-datasheet.pdf, 2 pages.
Author Unknown, "Monprene® Thermoplastic Elastomer Compounds (TPEs)," 2019, Teknor Apex, Retrieved Feb. 14, 2019 from https://www.teknorapex.com/monprene-tpes-for-consumer-products-and-packaging, 2 pages.
Author Unknown, "Multi-Flex® TPE Plastic Materials Supplied by Multibase, A Down Corning Company," 2019, UL LLC, Retrieved Feb. 14, 2019 from https://plastics.ulprospector.com/materials/693/multi-flex-tpe, 5 pages.
Author Unknown, "New! RTP 6000 Series," Compunding Lines Newsletter, Mar. 2005, RTP Company, Retrieved Feb. 14, 2019 from https://www.rtpcompany.com/new-rtp-6000-series/, 1 page.
Author Unknown, "OnFlex™ Thermoplastic Elastomers," 2015, PolyOne, Retrieved Feb. 14, 2019 from http://www.polyone.com/products/thermoplastic-elastomers/gls-onflex-thermoplastic-elastomers, 3 pages.
Author Unknown, "Raplan," API, Retrieved Feb. 14, 2019 from https://www.apiplastic.com/en/products/tpes/tpe-s/raplan/, 1 page.
Author Unknown, "RTP 2700 Series: SBC-Based Thermoplastic Elastomers," Product Brochure, Dec. 2016, RTP Company, Retrieved Feb. 14, 2019 from https://www.rtpcompany.com/wp-content/uploads/RTP-Co_RTP-2700-Series_121316.pdf, 4 pages.
Author Unknown, "Sariink® TPV and TPE," 2019, Teknor Apex, Retrieved Feb. 14, 2019 from https://www.teknorapex.com/sarlink-tpv-thermoplastic-vulcanizate-and-tpe, 2 pages.
Author Unknown, "Septon™ Hybrar™: Kuraray's Thermoplastic Elastomers," Sep. 2016, Kuraray America, Inc., Retrieved Feb. 1, 2018 from https://www.elastomer.kuraray.com/fileadmin/user_upload/ELASTOMERE/DOWNLOADS/product_brochures/Septon_and_Hybrar.pdf, 8 pages.
Author Unknown, "Styroflex®: Styrene/Butadiene Block Copolymer (SBS)," 2005, BASF Corporation, Retrieved Feb. 1, 2019 from www2.basf.us/PLASTICSWEB/displayanyfile?id=0901a5e1800d4e3a, 4 pages.
Author Unknown, "Styrolux®: Styrene-Butadiene Copolymer Resins," Fact Sheet, 2003, BASF Corporation, Retrieved Feb. 1, 2018 from http://www2.basf.us/PLASTICSWEB/displayanyfile?id=0901a5e180005b45, 2 pages.

Author Unknown, "Sunprene™," 2016, Mitsubishi Chemical Corporation, Retrieved Feb. 14, 2019 from https://www.mcpp-global.com/en/america/products/brand/sunprenetm/, 4 pages.
Author Unknown, "Surface Roughness Tester TR110 Instruction Manual," Time Group Inc., Retrieved Feb. 15, 2019 from http://www.bamr.co.za/instruction-manual/tr110-portable-roughness-tester-instruction-manual.pdf, 12 pages.
Author Unknown, "Thermolast®," Kraiburg TPE, Retrieved Feb. 14, 2019 from https://www.kraiburg-tpe.com/en/products/thermolast/overview, 1 page.
Author Unknown, "Thermoplastic Polyurethane Elastomers (TPU): Elastollan®—Product Range," Jan. 11, 2017, BASF, Retrieved Feb. 14, 2019 from https://products.basf.com/en/Elastollan.download.html?viewType=info, 40 pages.
Author Unknown, "Topas® Elastomer E-140," Data Sheet, Jan. 14, 2015, Topas Advanced Polymers, Retrieved Feb. 1, 2019 from https://topas.com/sites/default/files/PDS%20Topas%20E-140.pdf, 1 page.
Author Unknown, "TPE," 2019, Washington Penn Plastic Co., Inc., Retrieved Feb. 14, 2019 from http://washingtonpennplastic.com/products/tpe, 2 pages.
Author Unknown, "TPE Dryflex® Thermoplastic Elastomers," 2018, Hexpol TPE, Retrieved Feb. 14, 2019 from https://www.hexpoltpe.com/en/product-guides.htm, 7 pages.
Author Unknown, "TPV: Shaping the future with Santoprene™ thermoplastic vulcanizates (TPVs)," Exxon Mobil Corporation, Retrieved Feb. 14, 2019 from https://www.exxonmobilchemical.com/en/products/tpv, 3 pages.
Author Unknown, "Versaflex™ Thermoplastic Elastomers," 2015, PolyOne, Retrieved Feb. 14, 2019 from http://www.polyone.com/products/thermoplastic-elastomers/gls-versaflex-thermoplastic-elastomers, 3 pages.
Author Unknown, "Versalloy™ Thermoplastic Elastomers," 2015, PolyOne, Retrieved Feb. 14, 2019 from http://www.polyone.com/products/thermoplastic-elastomers/gls-versalloy-thermoplastic-elastomers, 1 page.
Author Unknown, "Versollan™ Thermoplastic Elastomers," 2015, PolyOne, Retrieved Feb. 14, 2019 from http://www.polyone.com/products/thermoplastic-elastomers/gls-versollan-thermoplastic-elastomers, 1 page.
Author Unknown, "Quintac Series," Zeon Corporation, Retrieved Feb. 14, 2019 from http://www.zeon.co.jp/business_e/enterprise/chemical/chemical5.html, 2 pages.
Council of Europe, "Resolution ResAP(2004)2: on cork stoppers and other cork materials and articles intended to come into contract with foodstuffs," Adopted by the Committee of Ministries on Dec. 4, 2004 at the 907th Meeting of the Ministers' Deputies, Strasbourg Cedex, France, Retrieved Feb. 2, 2018 from https://search.coe.int/cm/Pages/result_details.aspx?ObjectId=09000016805db887, 4 pages.
International Search Report and Written Opinion for International Patent Application No. PCT/US2018/060058, dated Mar. 13, 2019, 19 pages.
International Search Report and Written Opinion for International Patent Application No. PCT/US2018/060081, dated Feb. 22, 2019, 15 pages.
Non-Final Office Action for U.S. Appl. No. 16/186,176, dated Apr. 17, 2020, 11 pages.
Non-Final Office Action for U.S. Appl. No. 16/186,206, dated Apr. 17, 2020, 10 pages.
International Preliminary Report on Patentability for International Patent Application No. PCT/US2018/060058, dated May 22, 2020, 13 pages.
International Preliminary Report on Patentability for International Patent Application No. PCT/US2018/060081, dated May 22, 2020, 9 pages.
International Preliminary Report on Patentability for International Patent Application No. PCT/US2018/060105, dated May 22, 2020, 8 pages.
International Preliminary Report on Patentability for International Patent Application No. PCT/US2018/060136, dated May 22, 2020, 13 pages.

(56) References Cited

OTHER PUBLICATIONS

International Preliminary Report on Patentability for International Patent Application No. PCT/US2018/060143, dated May 22, 2020, 10 pages.
International Search Report and Written Opinion for International Patent Application No. PCT/US2018/060105, dated Feb. 22, 2019, 14 pages.
Invitation to Pay Additional Fees and Partial International Search for International Patent Application No. PCT/US2018/060136, dated Jan. 24, 2019, 15 pages.
International Search Report and Written Opinion for International Patent Application No. PCT/US2018/060136, dated Mar. 29, 2019, 22 pages.
International Search Report and Written Opinion for International Patent Application No. PCT/US2018/060143, dated Apr. 1, 2019, 16 pages.
First Office Action for Chinese Patent Application No. 201880072652.2, dated Apr. 25, 2021, 17 pages.
Examination Report for European Patent Application No. 18811429.2, dated Jul. 9, 2021, 6 pages.
Author Unknown, "Multi-Flex® TEA 4001-35 Natural TPO Thermoplastic Polyolefin Elastomer," Product Data Sheet, Multibase, 2019, MatWeb, Retrieved Jun. 23, 2021 from http://www.matweb.com/search/datasheet.aspx?matguid=58d00414600b4596a4b1e46883a96f2d, 1 page.
Author Unknown, "Tufprene™ Asaprene™ T," Product Brochure, Aug. 2018, Asahi Kasei, Retrieved Jun. 23, 2021 from https://www.akelastomer.com/en/brochures, 10 pages.
Non-Final Office Action for U.S. Appl. No. 16/186,250, dated Jan. 26, 2021, 27 pages.
Final Office Action for U.S. Appl. No. 16/186,250, dated Jul. 1, 2021, 28 pages.
First Office Action for Chinese Patent Application No. 2018800726607, dated Jun. 21, 2021, 23 pages.
Advisory Action for U.S. Appl. No. 16/186,250, dated Sep. 13, 2021, 3 pages.
Non-Final Office Action for U.S. Appl. No. 16/186,250, dated Nov. 29, 2021, 29 pages.
Second Office Action for Chinese Patent Application No. 201880072652.2, dated Feb. 14, 2022, 24 pages.
Second Office Action for Chinese Patent Application No. 2018800726607, dated Mar. 7, 2022, 22 pages.
Final Office Action for U.S. Appl. No. 16/186,250, dated May 19, 2022, 30 pages.

\* cited by examiner

METHOD FOR MANUFACTURING A CLOSURE FOR A PRODUCT-RETAINING CONTAINER

CROSS-REFERENCE TO RELATED APPLICATIONS

The present application claims priority to U.S. Provisional Patent Application Ser. No. 62/583,584 filed on Nov. 9, 2017 entitled "METHOD FOR MANUFACTURING A CLOSURE FOR A PRODUCT-RETAINING CONTAINER," wherein the contents of such application are hereby incorporated by reference herein in their entirety.

TECHNICAL FIELD

The present disclosure relates to a method for manufacturing a closure for a product-retaining container, to a closure that is obtainable by a method of the present disclosure, and to a closure system comprising a closure and a product-retaining container.

BACKGROUND

In view of the wide variety of products that are sold for being dispensed from containers, particularly containers with round necks which define the dispensing portal, numerous constructions have evolved for container stoppers or closure means for the portals, including for example screw caps, stoppers, corks and crown caps, to name a few. Generally, products such as vinegar, vegetable oils, laboratory liquids, detergents, honey, condiments, spices, alcoholic beverages, and the like, have similar needs regarding the type and construction of the closure means used for containers for these products. However, wine sold in bottles represents the most demanding product in terms of bottle closure technology. In an attempt to best meet these demands, most wine bottle closures or stoppers have been produced from cork, a natural material.

While natural cork remains a dominant material for wine closures, wine closures made from alternative materials, such as polymers, also referred to as synthetic closures, have become increasingly popular, largely due to the shortage in high quality natural cork material and the awareness of wine spoilage as a result of "cork taint," a phenomenon that is associated with natural cork materials. Synthetic closures have the advantage that by means of closure technology, their material content and physical characteristics can be designed, controlled and fine-tuned to satisfy the varying demands that the wide range of different wine types produced throughout the world impose on closures.

One of the principal difficulties to which any bottle closure is subjected in the wine industry is the manner in which the closure is inserted into the bottle. Typically, the closure is placed in a jaw clamping member positioned above the bottle portal. The clamping member incorporates a plurality of separate and independent jaw members which peripherally surround the closure member and are movable relative to each other to compress the closure member to a diameter substantially less than its original diameter. Once the closure member has been fully compressed, a plunger moves the closure means from the jaws directly into the neck of the bottle, where the closure member is capable of expanding into engagement with the interior diameter of the bottle neck and portal, thereby sealing the bottle and the contents thereof.

In view of the fact that the jaw members are generally independent of each other and separately movable in order to enable the closure member to be compressed to the substantially reduced diameter, each jaw member comprises a sharp edge which is brought into direct engagement with the closure member when the closure member is fully compressed. Score lines are frequently formed on the outer surface of the closure member, which prevents a complete, leak-free seal from being created when the closure member expands into engagement with the bottle neck. This can occur, for example, if the jaw members of the bottling equipment are imperfectly adjusted or worn. Leakage of the product, particularly of liquid product, from the container can occur.

It is generally desirable that any bottle closure be able to withstand this conventional bottling and sealing method. Furthermore, many cork sealing members also incur damage during the bottling process, resulting in leakage or tainted wine.

Another issue in the wine industry is the capability of the wine stopper to withstand a pressure build up that can occur during storage of the wine product after it has been bottled and sealed. Due to natural expansion of the wine, for example during hotter months, pressure builds up, which can result in the bottle stopper being displaced from the bottle. As a result, it is generally desirable that the bottle stopper employed for wine products be capable of secure, intimate, frictional engagement with the bottle neck in order to resist any such pressure build up.

A further issue in the wine industry is the general desirability that secure, sealed engagement of the stopper with the neck of the bottle be achieved quickly, if not virtually immediately after the stopper is inserted into the neck of the bottle. During normal wine processing, the stopper is compressed, as detailed above, and inserted into the neck of the bottle to enable the stopper to expand in place and seal the bottle. Such expansion desirably occurs immediately upon insertion into the bottle since many processors tip the bottle onto its side or neck down after the stopper is inserted into the bottle neck, allowing the bottle to remain stored in this position for extended periods of time. If the stopper is unable rapidly to expand into secure, intimate, frictional contact and engagement with the walls of the neck of the bottle, wine leakage can occur.

It is further desirable that the closure be removable from the bottle using a reasonable extraction force. Although actual extraction forces extend over a wide range, the generally accepted, conventional extraction force is typically below 100 pounds (445 Newtons).

In achieving a commercially viable stopper or closure, a careful balance must be made between secure sealing and providing a reasonable extraction force for removal of the closure from the bottle. Since these two characteristics are believed to be in direct opposition to each other, a careful balance must be achieved so that the stopper or closure is capable of securely sealing the product, in particular the wine in the bottle, preventing or at least reducing both leakage and gas transmission, while also being removable from the bottle without requiring an excessive extraction force.

Furthermore, it is generally desirable to effectively prevent or reduce oxygen from entering the bottle. Too much oxygen can cause the premature spoilage of wine. In fact, oxidation may occur over a period of time to render the beverage undrinkable. Thus, it is generally desirable that the closure has a low oxygen permeability in order to extend and preserve the freshness and shelf life of the product. Any commercially viable wine stopper or closure should therefore generally have a low oxygen transfer rate (OTR). It is also possible to incorporate additives that act as oxygen scavengers into the closure. A combination of low closure permeability to oxygen and incorporation of oxygen scavengers can be effective at reducing oxygen-mediated spoilage of wine.

In addition to the above, it is also desirable, for economic and environmental reasons, to reduce the total amount of material in a closure made from materials such as polymers, particularly the amount of polymer material. Since the size of the closure is determined by the size of the bottle neck, reducing the amount of material can principally be achieved by reducing the density of the closure, in particular of the core member, which is generally in the form of a foamed material comprising air- or gas-filled cells. However, reducing the density of the core member generally increases the deformability of the core member and thus of the closure, which in turn results in a worsened sealing capability and increased leakage. In order to avoid this, a thicker and/or denser outer layer or skin is conceivable, as is the incorporation of a stiffer and/or denser central element within the core member. However, either of these approaches increases the total amount of material, thereby diminishing or even eliminating any advantages achieved by reducing the core density.

It is also possible to reduce the amount of polymer material by using filler material. Closures are known which incorporate fillers into a polymer matrix. For example, U.S. Pat. No. 5,317,047 describes a stopper made of expandable microspheres, cork powder, and a binder such as a polyurethane or acrylic type glue. The preparation method for closures incorporating cork powder in a polyurethane or acrylic matrix generally involves combining the cork powder with polyurethane or acrylic monomers, oligomers, or prepolymers, and polymerizing in situ. However, residual monomers and low molecular weight compounds such as dimers, trimers, and other oligomers, remain in the matrix and/or in the cork powder. These residual monomers and low molecular weight compounds may not be compatible with food safety considerations, since they can migrate into food products which are in contact with the closure. In addition, the methods usually require sustained application of heat over a period of hours in order to set and finish the glue.

It would be advantageous to be able to control the properties of a closure incorporating cork material, in the same way as a closure consisting principally of a single material such as polymer or cork. It would be particularly advantageous to be able to achieve homogeneous properties within such a closure. It would also be advantageous to be able to ensure that the desirable properties for such a closure, for example making it suitable as a closure for a wine bottle, as described herein, are achievable in industrial scale production without significant deviation for individual closures.

In addition to the above, it is often desirable for closures not made of cork to resemble natural cork closures as closely as possible in appearance. Both the longitudinal surface and the flat ends of cylindrical cork closures generally have an irregular appearance, for example showing naturally occurring irregularities in color, structure and profile. The same is true for non-cylindrical cork or cork-type closures, such as closures for champagne bottles. Methods have been developed for providing synthetic closures with a physical appearance similar to natural cork, for example by blending colors to produce a streaking effect in the outer portion of the closure, along the cylindrical axis, or to provide the flat terminating ends of a synthetic closure with a physical appearance similar to natural cork.

The cork industry generates large quantities of by-products, for example cork dust, cork powder and cork pieces, that are often considered waste products. It would be advantageous to transform these by-products into a high value composite product. It is known to incorporate cork materials into composites with polymers. The incorporation of cork particles into a polymer matrix can, however, be detrimental to the processing and performance properties thereof. Composites comprising large amounts of cork particles, for example more than about 50 wt. % cork particles, based on the total weight of the composite, tend to have properties such as hardness, density and permeability which make them unsuitable as closures for wine bottles. Crosslinkers and/or compatibilizers are often indicated in order to improve properties. However, crosslinkers and/or compatibilizers can raise issues of food safety when used in products which come into contact with foodstuffs. Moreover, cork can contain and release substances that affect the sensory perception of food when used in bulk or in composites as packaging material. Examples of such substances are sensory constituents such as haloanisoles, in particular, but not exclusively, trichloroanisole (TCA). In addition, a closure containing the cork should have good mechanical properties. It would be advantageous for a closure to overcome these problems as far as possible.

Production methods for composite closures comprising cork have so far been limited largely to moulding methods, in particular reactive moulding methods, where cork is combined with monomer or pre-polymer units which are then polymerized in situ in a mould, compression moulding methods, or a combination of compression moulding and reactive moulding methods, largely because of the difficulties often associated with moulding and extrusion methods that use thermoplastic polymers. These difficulties can include achieving a sufficient degree of foaming and/or a sufficient uniformity of foaming and thus a desired low and uniform polymer foam density, as well as achieving a homogeneous distribution of cork particles. It can also be difficult to obtain a cylindrical extrudate with a smooth polymer surface which is not subject to surface melt fracture or undesired surface roughness. If increasing amounts of cork are incorporated, any difficulties and disadvantages in processing and performance are exacerbated. Composites comprising large amounts of smaller particles, for example cork powder, such as more than about 50 wt. % of cork powder, based on the total weight of the composite, tend to have properties such as hardness, density and permeability which make them unsuitable as closures for wine bottles. Crosslinkers are often required in order to improve properties. However, crosslinkers can raise issues of food safety when used in products which come into contact with foodstuffs. Composites comprising larger particles, for example cork granules, can have the disadvantage that the cork granules in the matrix contribute to, or even dominate, the mechanical and permeability properties of the composite, with one result being that these properties are not uniform throughout the composite. In order to be usable as closures for wine bottles, substantially uniform properties throughout the closure are desirable.

Closures incorporating cork material in a synthetic matrix have been previously described. For example, FR 2 799 183 describes synthetic closures consisting of a mixture of cork granulate and cork powder in a polyurethane matrix. The mixture of cork granulate and cork powder is said to be necessary for the homogeneity of the closure. However, the properties of such closures are generally not homogeneous throughout because of the presence of different "zones" comprising either cork or polyurethane. This can be difficult to avoid in moulding processes because of the inherent lack of mixing of components within the mould. This is exacerbated by the fact that coating of cork particles with glue is done by mixing the components at low shear rates and low temperatures. These conditions are necessary in order not to cure the glue prematurely. However, these conditions lead to poor mixing and can create clusters of cork or glue. Furthermore, such closures can crumble and even fall apart because of weaknesses in the matrix arising from the incorporation of larger cork granules and/or the presence of clusters of cork particles which are to a certain extent devoid of binder. It would be advantageous to be able to mix at high shear and/or high temperature which is something which could not be done with glue because it would cure the glue prematurely. High-shear mixing is better than low-shear mixing to provide a good homogeneous blend of particles in the polymer.

Furthermore, it can be more difficult to remove haloanisoles, in particular trichloroanisole (TCA) and other anisoles that can cause organoleptic problems, such as tribromoanisole (TBA), tetrachloroanisole (TeCA) and pentachloroanisole (PCA), from larger pieces of cork, such as cork granules compared to cork powder, so that closures including such larger cork granules might risk the problem of so-called cork taint to a greater extent than those including cork powder. This can, however, be largely or entirely overcome by suitable cleaning methods. As the ease of cleaning is expected to increase with smaller particle sizes, it still remains easier to remove organoleptically active substances from cork granules than from traditional closures made from a single piece of natural cork.

For these reasons, it would be advantageous to be able to produce closures comprising pieces of natural cork, in particular cork particles, wherein the cork particles are embedded in a polymer matrix, which do not suffer from the problems of either natural corks or known cork-polymer composite closures.

In addition to the above, it is also desirable, for environmental reasons, that closures made from alternative materials such as polymers be biodegradable, recyclable, compostable, or derived from renewable resources, to the greatest extent possible. Biodegradability and compostability can be measured by standard test methods such as, for example, DIN EN 13432 or ASTM D6400, and in compliance with relevant EU and USA legislation and guidelines, or, for example, the Japanese GreenPla standard for compostable and biodegradable polymers. Biodegradable, recyclable and compostable objects can be, but need not be, made entirely from non-fossil resources. In fact, in addition to polymers derived from natural or renewable sources, which can be synthetic or natural polymers, there are also available polymers made from fossil resources that can be metabolized, for example by microorganisms, due to their chemical structure. Some polyesters, such as poly(caprolactone) or poly(butylenadipate-co-terephthalate), are made from fossil resources and yet are biodegradable. Polymers made from a combination of fossil and renewable resources, such as poly(butylenesebacate-co-terephthalate), are also available and can have biodegradability according to the above standard norms. Polymers made or derived from or including components or units derived from renewable resources, such as poly(butylenesebacate-co-terephthalate), in particular those which are biodegradable according to ASTM D6400, contribute to achieving improved environmental friendliness.

It is, furthermore, often desirable to provide decorative indicia such as letters and ornaments on the surface of wine stoppers, such as the crest or emblem of a winery. Natural corks are generally marked by a method commonly referred to as "fire branding," i.e., by the application of a hot branding tool. Alternatively, natural corks may also be branded or printed by application of colors or dyes. Due to food safety concerns, marking of natural corks with colors or dyes is generally only effected on the curved peripheral surface of the cork that is not in direct contact with the wine. Marking on the flat terminating surfaces of natural corks is generally effected by means of fire branding only since this method does not impose any food safety concerns.

It is also known to brand synthetic closures. These closures are commonly branded by means of inkjet or offset printing using special dyes or colors approved for indirect food contact. Since such colors and dyes are normally not approved for direct food contact, marking of closures with colors or dyes is generally only effected on the curved cylindrical surface—the peripheral surface—of the closure that is not in direct contact with the wine. Such marking can be on the outermost surface, or on an inner surface which is subsequently covered with an outer, preferably at least partially transparent, layer. Marking on the flat terminating surfaces of closures made from alternative materials such as polymers is generally better known for injection molded closures, where marking is effected during the molding process of the closure by providing raised portions on the flat terminating surfaces.

Methods are available for marking the flat terminating surface of closures from alternative materials such as polymers. Laser marking may, in theory, be a feasible method since it allows the avoidance of direct food contact. This method can allow in line printing, for example of closures that have been manufactured by means of extrusion. A further method involves the application of a decorative layer, in particular a decorative polymer layer, to a flat terminating surface, by means of heat and/or pressure transfer. This method allows for permanent branding of synthetic closures without giving rise to concerns relating to food safety and without negatively impacting the gas permeation and/or mechanical properties of synthetic closures, in particular of co-extruded synthetic closures.

It is possible that closures with a high proportion of synthetic material are not allowed to be used for certain type of wines which have described natural cork as the choice of closure material. According to European Union Council of Europe Resolution ResAP(2004)2 on cork stoppers and other cork materials and articles intended to come into contact with foodstuffs, for example, a closure may be defined as a cork closure if it includes a minimum of 51% w/w cork. The inclusion of 51% w/w cork in a closure can thus be advantageous in opening up a wider market for its use. In contrast to natural cork closures, synthetic closures often cannot be reinserted into a bottle, or only with some difficulty, once they have been removed. It would therefore be advantageous to provide a closure, having a synthetic component, that can be reinserted into a bottle once it has been removed.

Therefore, there exists a need for a closure or stopper which particularly comprises at least one of the characteristic features described above, said closure or stopper preferably having a physical appearance and/or tactile characteristics similar in at least one aspect to a natural cork closure, said closure preferably being biodegradable, particularly with only minimal impairment, particularly with no impairment or even with improvement of the other properties of the closure such as, inter alia, OTR, leakage, ease of insertion and removal, compressibility and compression recovery, and/or compatibility with food products.

Other and more specific needs will in part be apparent and will in part appear hereinafter.

SUMMARY

The closure of the present disclosure may be employed as a bottle closure or stopper for any desired product. However, for the reasons detailed above, wine products impose the most burdensome standards on a bottle closure. Consequently, in order to demonstrate the universal applicability of the closure of the present invention, the following disclosure focuses on the applicability and usability of the closure of the present invention as a closure or stopper for wine containing bottles. This discussion is for exemplary purposes only and is not intended as a limitation of the present disclosure.

As discussed above, a bottle closure or stopper for wine must be capable of performing numerous separate and distinct functions. One principal function is the ability to withstand the pressure build up due to temperature variations during storage, as well as prevent any seepage or leakage of the wine from the bottle. Furthermore, a tight seal must also be established to prevent unwanted gas exchange between ambient conditions and the bottle interior, so as to prevent any unwanted oxidation or permeation of gases from the wine to the atmosphere. In addition, the unique corking procedures employed in the wine industry impart substantial restrictions on the bottle closure, requiring a bottle closure which is highly compressible, has high immediate compression recovery capabilities and can resist any deleterious effects caused by the clamping jaws of the bottle closure equipment. In view of environmental considerations, it would be an advantage to be able to provide a closure that is at least partially biodegradable, compostable or recyclable. The tactile properties and/or the physical appearance should preferably be similar to a natural cork closure. The contained product should not be spoiled by the closure. Additionally, it would be advantageous for a closure to be easily extractable and reinsertable. A further advantage would be to be able to print or brand a closure as if it were a cork closure.

Although prior art products have been produced in an attempt to satisfy the need for alternative bottle closures employable in the wine industry, such prior art systems have often been found lacking in one or more of the generally desirable aspects of a bottle closure for wine products. However, by employing the present disclosure, many of the prior art disadvantages have been reduced or even obviated and an effective, easily employed, mass-produced closure has been realized.

In the present disclosure, many of the prior art disadvantages can be reduced or even overcome by achieving a cork composite closure for a product-retaining container constructed for being inserted and securely retained in a portal forming neck of said container and a method for producing such a closure.

In accordance with one aspect of the present disclosure, a method for manufacturing a closure as described herein is provided. According to another aspect of the present disclosure, a composition as described, and according to yet another aspect of the present disclosure, a closure is provided. According to yet another aspect of the present disclosure, a closure system is provided.

In accordance with the present disclosure, a method for manufacturing a closure for a product-retaining container is provided, wherein the closure comprises a plurality of coated particles comprising (1) a core comprising cork material and (2) at least one outer shell comprising a first plastic material, said first plastic material comprising one or more thermoplastic polymers and at least one second thermoplastic polymer.

If at least one biodegradable polymer is comprised as a thermoplastic polymer, the closures of the invention can be biodegradable, or at least a part of the closure content can be biodegradable. The closures of the invention thus have the potential for improved environmental friendliness compared to known synthetic closures. Desirable closure properties such as oxygen permeability, compressibility and recovery capabilities are largely unaltered or even improved compared to a synthetic closure not comprising cork particles. The sealing properties of the closure are also substantially not affected by the incorporation of cork particles. At the same time, the extraction force required to remove the closure from the bottle is not altered substantially. The closure can more easily be reinserted into a bottle after opening, and may have printability approaching or the same as that of natural cork. In addition, the closure resembles a natural cork closure in its physical appearance. Furthermore, the tactile properties of the closure are very similar to a closure from natural cork.

In one aspect the present disclosure provides for a method for manufacturing a closure for a product-retaining container constructed for being inserted and securely retained in a portal-forming neck of said container.

According to this aspect, the method for manufacturing a closure for a product-retaining container constructed for being inserted and securely retained in a portal-forming neck of said container comprises at least the following method steps:
  i. intimately combining the following components, to form a composition:
    (a) 51 to 80 wt. % (dry weight) or 51 to 85 wt. % of a plurality of coated particles, said coated particles comprising (1) a core comprising cork material and (2) at least one outer shell comprising a first plastic material, said first plastic material comprising one or more thermoplastic polymers;
    (b) 12 to 49 wt. % of a second plastic material comprising one or more thermoplastic polymers;
    (c) optionally 0 to 10 wt. % of one or more blowing agents;
    (d) optionally, 0 to 15 wt. % of one or more lubricants;
    (e) optionally, 0 to 2 wt. % of one or more pigments; and
    (f) optionally, 0 to 10 wt. % of one or more additives and/or fillers;
  ii. heating the composition obtained in step i. to form a melt;
  iii. forming, by means of extrusion or molding, a closure precursor from the melt obtained in step ii,
  iv. optionally cutting and/or finishing the closure precursor to form the closure.

The present disclosure further provides for a method for manufacturing a closure for a product-retaining container constructed for being inserted and securely retained in a portal-forming neck of said container.

According to this aspect, the method for manufacturing a closure for a product-retaining container constructed for being inserted and securely retained in a portal-forming neck of said container comprises at least the following method steps:

i. intimately combining the following components, to form a composition:
   (a) 52 to 100 wt. % (dry weight) of a plurality of coated particles, said coated particles comprising (1) a core comprising cork material and (2) at least one outer shell comprising a first plastic material, said first plastic material comprising one or more thermoplastic polymers;
   (b) 0 to 48 wt. % of a second plastic material comprising one or more thermoplastic polymers;
   (c) optionally 0 to 10 wt. % of one or more blowing agents;
   (d) optionally, 0 to 15 wt. % of one or more lubricants;
   (e) optionally, 0 to 2 wt. % of one or more pigments; and
   (f) optionally, 0 to 10 wt. % of one or more additives and/or fillers;
ii. heating the composition obtained in step i. to form a melt;
iii. forming, by means of extrusion or molding, a closure precursor from the melt obtained in step ii,
iv. optionally cutting and/or finishing the closure precursor to form the closure.

The closure manufactured according to any of the methods described herein will be referred to by terms such as "the closure of the present invention", "the closure of the present disclosure" or "the closure". The phrases "according to the present disclosure" and "according to the present invention" are used synonymously herein. Furthermore, whatever is written herein about the first plastic material applies likewise also to the second plastic material, and vice versa.

Further embodiments of the method according to the present disclosure are described in the accompanying dependent claims The closure of the invention preferably has a substantially cylindrical form. A cylindrical closure comprises a substantially cylindrical peripheral surface and two substantially flat terminating faces at the opposing ends of the cylindrical form. Alternatively, the closure of the invention can be in the form of a closure for a champagne or sparkling wine bottle. This form is well known to the skilled person. The ends of the inventive closure can be beveled or chamfered, as is known from the prior art. Although any desired bevel or chamfered configuration can be employed, such as a radius, curve, or flat surface, it has been found that merely cutting the terminating ends at the intersection with the longitudinal cylindrical surface of the elongated length of material at an angle in the range of from about 30° to about 75°, for example in the range of from about 35° to about 70°, particularly in the range of from about 40° to about 65°, allows formation of a closure which is easier to insert into the neck of a container. Angles of about 45°, 46°, 47°, 48°, 49°, 50°, 51°, 52°, 53°, 54°, 55°, 56°, 57°, 58°, 59° or 60° have been found particularly to contribute to the present disclosure. The bevel or chamfer angle is measured relative to the longitudinal axis of the cylindrical closure. The chamfer angle for a closure for a still wine bottle is particularly within the above ranges, particularly with a chamfer length in the range of from about 0.4 mm to about 2.5 mm, particularly in the range of from about 0.5 mm to about 2.0 mm. Closures for sparkling wine bottles advantageously have a chamfer in the above range, but generally have a deeper and/or longer chamfer than closures for still wine bottles, for example having a chamfer angle in the range of from about 35° to about 55°, particularly in the range of from about 40° to about 50°, more particularly a chamfer angle of about 40°, 41°, 42°, 43°, 44°, 45°, 46°, 47°, 48°, 49° or 50°, and/or a chamfer length in the range of from about 3 mm to about 8 mm, particularly in the range of from about 4 mm to about 7 mm, particularly a chamfer length of about 3 mm, 4 mm, 5 mm, 6 mm, 7 mm or 8 mm. In addition, an end cap can be attached to one or both of said flat terminating surfaces of the closure. Said end cap can be made from any material, preferably from a plastic material. Preferably, the end cap has a circular cross-section with a diameter larger than the diameter of the closure.

The closure may have a construction comprising a single component. This component may be referred to as the closure or as a core member. If the closure comprises more than one component, it may be referred to as a multi-component closure or a multi-layer closure. A multi-component closure preferably has a construction comprising a core member, which corresponds to the closure or the core member of the single-component closure, and additionally one or more peripheral layers at least partially surrounding and intimately bonded to the peripheral surface of the core member. According to this embodiment of the disclosure, the closure comprises:

a) a core member comprising at least one thermoplastic polymer, and
b) at least one peripheral layer at least partially surrounding and intimately bonded to at least one surface of the core member, said peripheral layer comprising at least one thermoplastic polymer. This construction can be preferred for cylindrical closures. An alternative type of closure comprising plural components can comprise a construction such that a core member as described herein is provided with a disc, for example a disc made from natural cork, at one or both flat terminating ends. The disc or discs, if present, completely cover one or both of the terminating ends of the closure. In the case of a cylindrical closure, such as are generally used for still wine bottles, the core member is in the form of a cylinder and the terminating ends are the flat terminating ends of the cylinder. In the case of a closure for a sparkling wine bottle, a disc, if comprised, preferably covers the terminating end of the closure that faces towards the interior of the bottle. A second disc facing the exterior of the bottle is also conceivable.

In the present disclosure, the disclosure relating to a "core member" is intended to mean a single component closure and/or a core member of a multi-component closure. References herein to a "closure" encompass single component closures and multi-component closures, as well as core members of multi-component closures, because core members of multi-component closures and single component closures are generally identical in the presently disclosed closures, having the same composition and the same properties and characteristics, and generally being formed in the same way. Any details herein regarding a core member thus apply to a single component closure, and any details herein regarding a closure or a single component closure likewise apply to a core member. In particular, any reference herein to a core member applies to the entirety of a single component closure. References to the "plastic material" are generally intended to mean the plastic material of the core member, or of a single component closure, although the disclosure relating to plastic material can also apply to the material of a peripheral layer. Where indicated herein, the details regarding the plastic material can also apply to a peripheral layer, if present.

The closure of the present invention preferably comprises a plurality of cells. In particular the plastic material preferably comprises a plurality of cells. In particular the plastic material preferably comprises a polymer matrix comprising a plurality of cells. Preferably the plastic material forms a polymer matrix comprising a plurality of cells. Natural cork comprises a plurality of cells. A plurality of cells is thus already comprised in the cork particles. A plurality of cells according to the invention is preferably also comprised in the plastic material. A plurality of cells can be comprised, for example, in a foamed plastic material, also referred to as a foam, as a foam polymer, as a foam plastic material, as a plastic foam, as a polymer foam, as a foamed polymer, as a foamed polymer material, or as a foamed plastic. The plastic material is preferably in the form of a foam. The closure according to the present disclosure particularly comprises at least one foamed plastic material. The foamed plastic material preferably forms a polymer matrix comprising a plurality of cells. The polymer matrix preferably forms a continuous phase in which the plurality of cork particles (or the plurality of coated particles as defined herein) is embedded. A peripheral layer, if present, can also comprise a plurality of cells, for example in the form of an at least partially foamed material. A peripheral layer, if present, may be formed with a substantially greater density than the core material, in order to impart desired physical characteristics to the bottle closure of the present disclosure. According to an exemplary aspect of the present disclosure, the core member is foamed and at least one peripheral layer, if a peripheral layer is present, is substantially not foamed, particularly not foamed. It is also conceivable for a peripheral layer, if present, to be foamed. A peripheral layer may be foamed in the same way as the core member, or to a lesser extent, for example by means of a smaller amount of foaming agent (blowing agent) or expandable microspheres in the peripheral layer, for example to make it more flexible. However, a peripheral layer, if present, advantageously has a higher density than the core member.

It is preferred that the plurality of cells comprised in the closure is a plurality of substantially closed cells, in particular is a plurality of closed cells. The cells comprised in natural cork are closed cells or substantially closed cells. It is particularly preferred that the plurality of cells comprised in the plastic material is a plurality of substantially closed cells, in particular a plurality of closed cells. In particular it is preferred that the plastic material comprises a polymer matrix comprising a plurality of cells, and the plurality of cells in the polymer matrix is a plurality of substantially closed cells, in particular a plurality of closed cells. By "substantially closed cells" is meant that while the great majority, for example more than 90%, preferably more than 95%, preferably more than 99% of the cells in the plurality of cells are closed cells, some of the cells in the plurality of cells, for example up to 10%, preferably less than 5%, preferably less than 1%, may be open cells. The plurality of cells of the disclosed closure is thus further advantageously defined as being a plurality of substantially closed cells, or that the foam is a substantially closed cell foam. Closed cell foams are generally defined as comprising cells, also referred to as pores, which are substantially not interconnected with each other. Closed cell foams have higher dimensional stability, lower moisture absorption coefficients, and higher strength compared to open-cell-structured foams. A foamed peripheral layer, if present, preferably comprises substantially closed cells.

The plurality of cells, in particular the plurality of cells comprised in the plastic material, preferably has an average cell size in a range of from about 0.025 mm to about 0.5 mm, in particular from about 0.05 mm to about 0.35 mm. Average cell sizes in the plastic material can also be from about 0.05 mm to about 0.3 mm, from about 0.075 mm to about 0.25 mm, preferably from about 0.1 mm to about 0.25 mm, preferably from about 0.1 mm to about 0.2 mm. The average cell size is measured according to standard test methods known to the skilled person, preferably by means of microscopy.

In order to ensure that the core member or the closure possesses inherent consistency, stability, functionality and capability of providing long-term performance, the cell size and/or cell distribution of the plurality of cells is preferably substantially homogeneous throughout the entire length and diameter of the core member or the closure, in particular throughout the entire plastic material. In this way closures and core members with substantially uniform properties, such as, for example OTR, compressibility and compression recovery, can be provided. It is preferred that at least one of the size and the distribution of the plurality of cells in the closure or in the core member is substantially uniform throughout at least one of the length and the diameter of the closure. Particularly preferably, at least one of the size and the distribution of the plurality of cells comprised in the foam plastic material is substantially uniform throughout at least one of the length and the diameter of the closure or the core member, preferably throughout the plastic material comprised in the closure or the core member. Such a uniformity contributes to the homogeneity of the closure or the core member, in respect of both structural stability and performance properties. It also contributes to a homogeneous distribution of the cork particles (or the coated particles) throughout the closure or the core member, by providing a uniformly supporting polymer matrix and avoiding clustering or clumping together of cork particles (or the coated particles), which could be caused, for example by localized weak spots in the polymer matrix.

In another exemplary aspect of the present disclosure, the core member or the closure, in particular the plastic material, comprises closed cells having at least one of an average cell size ranging from about 0.02 millimeters to about 0.50 millimeters and a cell density ranging from about 8,000 cells/cm$^3$ to about 25,000,000 cells/cm$^3$. Although this cell configuration has been found to produce a highly effective product, it has been found that even more advantageous products are those wherein said core member comprises closed cells having at least one of an average cell size ranging from about 0.05 mm to about 0.1 mm and a cell density ranging from about 1,000,000 cells/cm$^3$ to about 8,000,000 cells/cm$^3$. According to one embodiment, the cork particles forming the core of the coated particles as defined herein, have an average cell size in the range of from 0.02 mm to 0.05 mm and a cell density in the range of from $4 \times 10^7$ to $20 \times 10^7$ cells/cm$^3$. Preferably the plastic material has average cell size in a range of from about 0.025 mm to about 0.5 mm, in particular in the range of from about 0.05 mm to about 0.35 mm, preferably in the range of from about 0.05 mm to about 0.3 mm, preferably in the range of from about 0.075 mm to about 0.25 mm, preferably in the range of from about 0.1 mm to about 0.25 mm, preferably in the range of from about 0.1 mm to about 0.2 mm and a cell density in the range of from $1.8 \times 10^6$ to $5 \times 10^6$ cells/cm$^3$.

The closure of the present invention can be formed, for example, by means of extrusion or moulding. In known closures formed from thermoplastic polymers by means of extrusion or moulding, the synthetic component, or the polymer, can be foamed by means of a blowing agent, also referred to as a foaming agent. It is well known in the industry to employ a blowing agent in forming plastic material, for example extruded or moulded foam plastic material, such as is advantageous for the closure. In the present disclosure, a variety of blowing agents can optionally be employed during the manufacturing process to produce the closure. Typically, either physical blowing agents or chemical blowing agents, or a combination of physical and chemical blowing agents, are employed. Expandable microspheres can also be used. The blowing agent used in formation of the inventive closure can be selected, for example, from the group consisting of expandable microspheres, chemical blowing agents, physical blowing agents, and combinations of two or more thereof. Particularly preferably, the blowing agent comprises or is expandable microspheres.

Chemical blowing agents include azodicarbonamic, azodicarbonamide, azodiisobutyro-nitride, benzenesulfon-hydrazide, 4,4-oxybenzene sulfonylsemicarbazide, p-toluene sulfonylsemicarbazide, barium azodicarboxlyate, N,N'-Dimethyl-N,N'-dinitrosoterephthalamide, and trihydrazinotriazine. An example of a suitable chemical blowing agent is sold by Clamant International Ltd, BU Masterbatches (Rothausstr. 61, 4132 Muttenz, Switzerland) under the trade name Hydrocerol®.

Alternatively, or in addition to, a chemical blowing agent, it is possible for an inorganic, or physical, blowing agent to be used in making the closure according to the present disclosure. Examples of physical blowing agents include carbon dioxide, water, air, helium, nitrogen, argon, and mixtures thereof. Carbon dioxide and nitrogen are particularly useful blowing agents.

Suitable physical blowing agents that have been found to be efficacious in producing the closure of the present disclosure can comprise one or more selected from the group consisting of: aliphatic hydrocarbons having 1-9 carbon atoms, halogenated aliphatic hydrocarbons having 1-9 carbon atoms and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons and fluorinated hydrocarbons they include, for example, methylfluoride, perfluoromethane, ethyl fluoride, 1,1-difluoroethane (HFC-152a), 1,1,1-trifluoroethane (HFC-430a), 1,1,1,2-tetrafluoroethane (HFC-134a), pentafluoroethane, perfluoroethane, 2,2-difluoropropane, 1,1,1-trifluoropropane, perfluoropropane, perfluorobutane, perfluorocyclobutane. Partially hydrogenated chlorocarbon and chlorofluorocarbons for use in this disclosure include methyl chloride, methylene chloride, ethyl chloride, 1,1,1-trichlorethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol and isopropanol.

If a chemical and/or physical blowing agent is employed, in order to control the cell size in the closure, in particular in the plastic material, and attain the desired cell size detailed herein, a nucleating agent is often employed during foaming of the plastic material. Preferred nucleating agents are selected from the group consisting of calcium silicate, talc, clay, titanium oxide, silica, barium sulfate, diatomaceous earth, and mixtures of citric acid and sodium bicarbonate, which enable the desired cell density and cell size to be achieved. In a particular embodiment of the present invention, it has been found that a nucleating agent, such as one of those listed herein, may be employed. Cork particles can also act as nucleating agent.

If a chemical or physical blowing agent is used, or a combination of one or more chemical blowing agents and one or more physical blowing agent, the blowing agent or agents may be incorporated into the plastic material in an amount ranging from about 0.005 wt. % to about 10 wt. %, based on the total weight of the plastic material.

In order to achieve the objects of the invention, the plurality of cells is preferably obtained by using expandable microspheres as blowing agent. Expandable microspheres consist of a thin thermoplastic shell, usually made from a copolymer of monomers such as vinylidene chloride, acrylonitrile and/or methyl methacrylate, that encapsulates a low boiling point liquid hydrocarbon blowing agent, typically isobutene or isopentane. When heated, the polymeric shell gradually softens, and the hydrocarbon expands, thereby increasing the internal pressure inside the microsphere and causing the polymeric shell to expand. When the heat is removed, the shell stiffens and the microsphere remains in its expanded form. When fully expanded, the volume of the microspheres can increase by more than 40 times, potentially up to 60 to 80 times. It is believed that in the closures of the present invention the thermoplastic polymer or polymers of the microsphere shell are fused into the polymer matrix while maintaining the integrity of the microsphere or the expanded microsphere, and thus form at least a part of the cell walls of the plurality of cells in the polymer matrix. The cell walls that define the cells in the plurality of cells and face the interior of the respective cell are believed to comprise predominantly the thermoplastic polymer or polymers of the expandable microspheres' shells. In this way, at least one cell in the plurality of cells comprised in the plastic material is defined by at least one cell wall facing the interior of the cell, the plastic material of at least a part of the cell wall comprising a different thermoplastic polymer composition compared to the plastic material forming the remainder of the polymer matrix. Preferably, the cells in the plurality of cells comprised in the plastic material are defined by cell walls, the plastic material of the cell walls facing the interiors of the cells comprising a different thermoplastic polymer composition compared to the plastic material forming the remainder of the polymer matrix. If thermoplastic expandable microspheres are used, a nucleating agent as described herein need not be employed, preferably is not employed. Particularly preferably a nucleating agent is not added to the composition from which the closure is formed.

Expandable microspheres may be used in the method of the present invention in an amount ranging from about 0.005 wt. % to about 10 wt. %, preferably in an amount ranging from about 0.05 wt. % to about 10 wt. %, preferably in an amount ranging from about 0.5 wt. % to about 10 wt. %, preferably in an amount ranging from about 0.1 wt. % to about 5 wt. %, preferably in an amount ranging from about 0.1 wt. % to about 4 wt. %, preferably in an amount ranging from about 1.0 wt. % to about 4 wt. %, preferably in an amount ranging from about 1.5 wt. % to about 3 wt. %, preferably in an amount ranging from about 2 wt. % to about 2.5 wt. % based on the total weight of the composition. Expandable microspheres may be used in combination with one or more blowing agents selected from chemical blowing agents and physical blowing agents, or expandable microspheres may be used as the sole foaming agent, in the absence of one or more blowing agents selected from chemical blowing agents and physical blowing agents. In the absence of a blowing agent such as a chemical blowing agent and/or a physical blowing agent, the cells in the foam are substantially formed from the expandable microspheres. In this case, the amount of expandable microspheres is preferably sufficient to achieve the desired foam density of the plastic material. According to one embodiment of the invention, if expandable microspheres are used as foaming agent in the absence of a chemical or physical blowing agent, a nucleating agent is not used and the composition used to form the closure does not comprise a nucleating agent. According to another embodiment of the invention, if a combination of expandable microspheres with one or more chemical and/or physical blowing agents is used, the composition can comprise a nucleating agent.

The closure according to the invention preferably has an overall density in the range of from 100 kg/m$^3$ to 500 kg/m$^3$, preferably in the range of from about 125 kg/m$^3$ to 500 kg/m$^3$, preferably in the range of from about 150 kg/m$^3$ to 500 kg/m$^3$, preferably in the range of from about 150 kg/m$^3$ to 480 kg/m$^3$, preferably in the range of from about 150 kg/m$^3$ to 450 kg/m$^3$, preferably in the range of from about 175 kg/m$^3$ to 450 kg/m$^3$, or in the range of from about 200 kg/m$^3$ to 420 kg/m$^3$, or in the range of from about 200 kg/m$^3$ to 400 kg/m$^3$. The overall density takes into account the density of the cork particles, which is generally in the range of from about 150 kg/m$^3$ to 280 kg/m$^3$, typically in the range of from about 180 kg/m$^3$ to 280 kg/m$^3$, often about 180 kg/m$^3$. The plastic material preferably has a density in the range of from about 25 kg/m$^3$ to 800 kg/m$^3$, preferably in the range of from about 50 kg/m$^3$ to 800 kg/m$^3$, preferably in the range of from about 75 kg/m$^3$ to 800 kg/m$^3$, preferably in the range of from about 100 kg/m$^3$ to 800 kg/m$^3$, preferably in the range of from about 150 kg/m$^3$ to 700 kg/m$^3$, preferably in the range of from about 150 kg/m$^3$ to 600 kg/m$^3$, preferably in the range of from about 150 kg/m$^3$ to 500 kg/m$^3$, preferably in the range of from about 180 kg/m$^3$ to 500 kg/m$^3$, or in the range of from about 200 kg/m$^3$ to 450 kg/m$^3$, preferably in the range of from about 200 kg/m$^3$ to 420 kg/m$^3$. These density ranges allow the closure to attain desired closure properties as disclosed herein.

It has been found that in known closures and methods for production of closures, in particular extrusion methods, achieving a desired, homogeneous foam density using selected chemical and/or physical blowing agents can be detrimentally affected by the presence of large amounts, such as greater than about 40 wt. %, based on the total closure weight, of cork particles (or the coated particles as defined herein). It is believed that the cork particles (or the coated particles as defined herein) may in some way detrimentally affect the formation of a homogeneous foam with a density in the desired range, when using selected conventional chemical or physical blowing agents. While chemical and/or physical blowing agents may be used according to the invention, it has been found that the use of expandable microspheres generally results in a foam having the desirable properties. In a preferred aspect of the inventive closure, expandable microspheres are used as foaming agent. In this aspect, according to a preferred embodiment of the invention, no additional chemical or physical blowing agent and no added nucleating agent is employed, particularly no additional chemical or physical blowing agent and no added nucleating agent is added to the composition used to form the closure.

One of the difficulties associated with incorporating cork particles (or the coated particles as defined herein) into an extruded or moulded polymer matrix of the sort described herein, particularly in larger amounts, for example where greater than about 40% by weight of cork particles is comprised, is in embedding the particles in the polymer matrix so that a smooth, continuous peripheral surface is achieved, without protruding pieces of cork and without discontinuous or rough areas on the peripheral surface. This is a particular problem with extruded parts, because the peripheral surface of the polymer matrix can catch and drag where it contacts the extrusion equipment, resulting in an uneven surface. While a certain amount of surface roughness can be smoothed by means of sanding, for example as is done with natural cork closures, this adds an additional process step, as well as generating extra waste, which cannot always be recycled but must be disposed of. In addition, if surface roughness increases, any sanding step must remove more material, which can also require that the extrudate includes more material, e.g. a wider diameter, to accommodate the greater amount of sanding. The present invention makes it possible to achieve a cylindrical extrudate or a moulded part in the form of a cylinder or a sparkling wine closure, with a smooth, continuous peripheral surface, or with a small degree of surface roughness that can be removed by sanding, preferably wherein the smooth, continuous peripheral surface comprises the plastic material, even when more than 50 wt. % of cork particles (or the coated particles as defined herein) are comprised. The cork particles (or the coated particles as defined herein) may form part of the peripheral surface. This can be advantageous inter alia in terms of appearance of the closure. In this case the plurality of particles (or the coated particles as defined herein), and in particular individual particles or groups of particles, preferably do not protrude from the peripheral surface. Accordingly, it is preferred that the closure of the present invention is cylindrical, or is in the form of a sparkling wine closure, and comprises a peripheral surface, wherein the peripheral surface preferably comprises a smooth surface comprising plastic material and particles comprising cork (or the coated particles as defined herein), or comprises a smooth, continuous surface of plastic material.

An advantage of the closures, compositions and methods defined herein is that they allow the prevention or elimination of surface melt fracture, also sometimes referred to as sharkskin, in an extruded closure. While the exact causes of surface melt fracture are a matter of debate in the scientific literature, it appears that surface melt fracture can occur in extruded polymer melts as a function of extrusion rates, with higher extrusion rates resulting in a greater degree of surface melt fracture. At a lower degree of surface melt fracture, surface irregularities are less pronounced and may appear as surface roughness. Higher degrees of surface melt fracture result in significant surface deformities and fracturing, fissuring or breaking of the extrudate surface, which is not always restricted to the surface but can extend to a significant depth within the extrudate. Such a high degree of deformation would prevent the use of such an extrudate as a closure. Polymer matrices with a high load of cork particles, for example greater than 40 wt. % cork particles, or greater than 50 wt. % cork particles, based on the total weight of the formulation, are susceptible to melt stress fracture. This significantly affects the available window of processing parameters for the production of extruded cylindrical closures such as those defined herein. The present invention permits the reduction or substantially the elimination of surface melt fracture, while maintaining commercially and technically advantageous production methods and processing parameters.

An advantageous aspect of the closure according to the present invention is that the distribution of the cork particles (or the coated particles as defined herein) in the closure is preferably substantially uniform throughout at least one of the length and the diameter of the closure. This prevents areas of weakness within the closure, for example regions comprising substantially cork particles (or the coated particles as defined herein) without sufficient plastic material to form a supporting matrix, which can result in crumbling and breaking of the closure. The present invention achieves this by the selection of composition components, in particular the combination of plastic material and pre-coated cork particles ("coated particles") as described herein. The optional use of expandable microspheres as foaming agent according to a preferred embodiment of this invention can also contribute to achieving this advantage, for example by contributing to the formation of a homogeneous, stable cellular polymer matrix that is capable of supporting an even distribution of the cork particles (or the coated particles as defined herein) throughout the matrix. The exact composition used can vary within the parameters and ranges disclosed herein.

The closure of the invention may be formed by means of moulding, for example injection moulding or compression moulding, particularly compression moulding, or by means of extrusion. The present disclosure is advantageous for forming closures by moulding, for example because it permits a more rapid formation than known moulding processes, for example because the moulding time depends more on the time taken to melt, if not already melted, and optionally foam the first and/or second plastic material, rather than on the time necessary for the moulding materials to react, for example in a polymerisation and/or a crosslinking reaction, as is the case for known moulding processes to form closures. The present disclosure can also permit moulding at lower temperatures, since the moulding temperature will depend principally on the melting point of the first and/or second plastic material, and/or on the activating temperature of the blowing agent. The present disclosure thus has the potential to permit shorter moulding formation times, possibly at lower temperatures, which not only results in process advantages, but also requires lower energy input and is thus more environmentally friendly. These advantages are in addition to the advantages associated with thermoplastic rather than thermosetting polymers as closure material. The moulding method of the present disclosure also has the further advantage over known moulding methods that, for example, the amount of compression applied in order to form a closure can be reduced or even eliminated.

Preferably the closure is formed by means of extrusion. Extrusion permits a convenient, reliable, continuous mass production of closures including polymer components. One of the advantages of the present invention is that it makes it possible to manufacture closures by means of extrusion, in contrast to many of the known methods, which are only possible using discontinuous moulding techniques.

According to one embodiment, the closure of the invention does not comprise a separately formed peripheral layer surrounding and intimately bonded to the peripheral surface of the closure. If such a separate peripheral layer is not comprised, the closure according to the invention is preferably formed by means of moulding or by means of mono-extrusion, preferably by means of monoextrusion. This means that an extrudate having a single component, an elongated cylindrical rod, is formed. This also corresponds to a core member of the present disclosure.

It is possible that the closure comprises one or more peripheral layers peripherally surrounding and intimately bonded to the peripheral surface of the closure, also referred to as the core member. An optional peripheral layer is preferably intimately bonded to substantially the entire peripheral surface of the core member, in particular the entire peripheral surface of a substantially cylindrical core member. If any large unbonded areas exist, flow paths for gas and liquid could result. Consequently, secure, intimate, bonded interengagement of at least one peripheral layer with the core member is advantageous for attaining a bottle closure for the wine industry. In order to achieve integral bonded interconnection between the at least one peripheral layer and the core member, the at least one peripheral layer is formed about the core member in a manner which assures intimate bonded engagement.

The closure according to the present disclosure is preferably formed by extrusion. If the closure comprises one or more peripheral layers, these are preferably formed as a separate layer or as separate layers, by means of co-extrusion. Particularly, the desired secure, intimate, bonded, interengagement is attained by simultaneous co-extrusion of the at least one peripheral layer and the core member or by applying the at least one peripheral layer to the continuous, elongated length of material after the continuous, elongated length of material has been formed. By employing either process, intimate bonded interengagement of the at least one peripheral layer to the continuous, elongated length of material is attained.

In a particular aspect of the present disclosure, therefore, the closure can be produced by a process comprising at least a process step of co-extrusion. According to this aspect of the disclosure, the synthetic closure comprises a core member and a peripheral layer, which are formed by co-extrusion. Suitable co-extrusion methods are known to the skilled person.

In one aspect of the present disclosure, comprising a core member and a peripheral layer, said core member and said at least one peripheral layer are extruded substantially simultaneously. In another aspect, the core member is extruded separately and subsequent thereto said at least one peripheral layer is formed in extrusion equipment peripherally surrounding and enveloping the pre-formed core member.

In further aspects of the disclosed closure, comprising two or more peripheral layers, it is possible that a first peripheral layer which is in secure, intimate, bonded, interengagement with the outer surface of a core member, particularly with the outer cylindrical surface of a cylindrical core member is formed by either substantially simultaneous extrusion with the core member, or by subsequent extrusion, or by moulding, as described herein. A second and subsequent peripheral layers can then be formed likewise by either substantially simultaneous extrusion with the core member and the first or further peripheral layers, or by subsequent extrusion, as described herein for the first peripheral layer. With multiple peripheral layers it is also possible that two or more peripheral layers are extruded subsequently, as described herein, but substantially simultaneously with each other.

In one embodiment of the inventive closure, the closure does not comprise a peripheral layer. This can be preferred, for example with closures for sparkling wine bottles, but can also be preferred with cylindrical closures, for example for still wine bottles. It is an advantage of the present disclosure that even in the absence of a peripheral layer, a closure according to the invention has a sufficiently smooth surface for use as a closure even if cork particles (or coated particles as defined herein) are comprised to greater than 50 wt. %, for example 51 wt. % or more of the total closure weight.

The closure comprises a first and a second plastic material, said first and second plastic material each comprising at least one thermoplastic polymer. The first and second plastic materials can be identical or different. The first and second plastic materials can be chosen independently. In other words: The plastic material chosen for the coating of the particles (first plastic material) can be the same as or different from the second material. Whatever is described herein with respect to the "plastic material" can apply both to the first plastic material and/or to the second plastic material. The plastic material can comprise one thermoplastic polymer, or more than one thermoplastic polymer, for example two, three or more thermoplastic polymers. If expandable microspheres are used as foaming agent (blowing agent), the plastic material typically comprises more than one thermoplastic polymer. This is because the thermoplastic polymer or polymers of the microsphere shells remains in the closure. If the expandable microspheres are provided in the form of a masterbatch, a slurry, or the like, any polymer or other component, in particular solid components, also present in the masterbatch, slurry, or the like will also be comprised in the closure precursor, in the closure and in the composition used to make the closure. The term "polymer" is intended to include all materials having a polymeric chain composed of many subunits, which may be the same or different, such as, for example, all types of homopolymers and copolymers, including statistical copolymers, random copolymers, graft copolymers, periodic copolymers, block copolymers, any of which may be straight chain or branched. The term "thermoplastic" has its usual meaning in the art.

According to a preferred aspect of the closure according to the invention, the plastic material is thermoplastically processable. This means that the plastic material of the closure, once formed into the closure, can be re-formed or re-processed thermally, i.e. by applying heat. This is preferably achieved if the plastic material comprises thermoplastic polymer without added crosslinker. It is, however, possible to add small amounts of crosslinker or of some types of glue, such as epoxy glue, for example in order to modify rheology or make polymers compatible, and still retain thermoplastic processability. Thermoplastic processability can be advantageous if it is desired to separate the cork particles, for example in order to recycle or reuse any part of the closure, such as the cork particles or the plastic material or both. The thermoplastic processability of the plastic material distinguishes the closures of the present invention from known closures comprising cork particles, which are generally formed by reactive moulding involving in situ polymerization to form non-thermoplastic polymers such as polyurethanes or polyacrylates, or include thermosetting polymers, or crosslinkers that reduce or prevent thermal processability, or crosslinkers in an amount that reduce or prevent thermal processability. These known non-thermoplastic closures cannot be processed thermally, making it difficult, if not impossible, to separate different components such as cork and polymer and thus separately to recycle or reuse any part of the closure. The formulation of the closures of the present invention, which allows the formation of the closures by thermoplastic extrusion or moulding methods, contributes to making this possible.

According to one embodiment of the present disclosure, at least one, preferably each thermoplastic polymer comprised in the plastic material optionally is a low-density polymer having an unfoamed density in the range of from 0.7 g/cm$^3$ to 1.4 g/cm$^3$. This aspect can be particularly advantageous if the core member comprises larger amounts of cork particles (or coated particles as defined herein) within the ranges disclosed herein, for example more than 40 wt. %, more than 45 wt. %, more than 50 wt. % and particularly more than 51 wt. % particles. A lower polymer density helps to compensate a possible increase in density of the closure resulting from inclusion of the particles.

In an exemplary aspect according to the present disclosure the closure of the present disclosure comprises, as its principal component, a core member formed from extruded, foamed plastic material comprising one or more thermoplastic polymers, selected from copolymers, homopolymers, or combinations of any two or more thereof. Although any known thermoplastic polymeric material, particularly any foamable thermoplastic polymeric material can be employed in the closure of the present disclosure, the plastic material is preferably selected for producing physical properties similar to natural cork, so as to be capable of providing a synthetic closure for replacing natural cork as a closure for wine bottles. By way of example, the plastic material for the core member can be a closed cell foam plastic material.

If the closure comprises one or more peripheral layers, the material of one or more peripheral layers comprises one or more thermoplastic polymers. In an exemplary aspect, the at least one peripheral layer, if comprised, comprises a thermoplastic polymer identical or similar to the thermoplastic polymer comprised in the core member. A peripheral layer can, on the other hand, comprise a thermoplastic polymer which is different to the thermoplastic polymer or thermoplastic polymers comprised in the core member. However, as detailed herein, in either case, irrespective of the polymer or polymers, the physical characteristics imparted to a peripheral layer preferably differ substantially from the physical characteristics of the core member, in particular the peripheral layer density is substantially greater than the core member density. A preferred peripheral layer density is in the range of from 50 kg/m$^3$ to 1500 kg/m$^3$, preferably in the range of from 100 kg/m$^3$ to 1500 kg/m$^3$, preferably in the range of from 200 kg/m$^3$ to 1500 kg/m$^3$, preferably in the range of from 300 kg/m$^3$ to 1500 kg/m$^3$, preferably in the range of from 400 kg/m$^3$ to 1500 kg/m$^3$, preferably in the range of from 500 kg/m$^3$ to 1500 kg/m$^3$, preferably in the range of from 600 kg/m$^3$ to 1500 kg/m$^3$, preferably in the range of from 700 kg/m$^3$ to 1500 kg/m$^3$, preferably in the range of from 750 kg/m$^3$ to 1500 kg/m$^3$, or in the range of from 700 kg/m$^3$ to 1350 kg/m$^3$, or in the range of from 700 kg/m$^3$ to 1100 kg/m$^3$, or in the range of from 750 kg/m$^3$ to 1350 kg/m$^3$, or in the range of from 750 kg/m$^3$ to 1100 kg/m$^3$.

According to a preferred aspect of the closure according to the invention the plastic material comprises one or more polymers that are biodegradable according to ASTM D6400. As the cork particles are biodegradable, if the plastic material comprises one or more biodegradable polymers, the majority or the entirety of the closure can be made to be biodegradable. If it is desired for a multi-component closure to be biodegradable, compostable or recyclable, preferably both the plastic material of the core member and the plastic material of the peripheral layer or layers are biodegradable, compostable or recyclable.

Preferably, from 50% by weight to 100% by weight of the closure, preferably from 60% by weight to 100% by weight of the closure, preferably from 70% by weight to 100% by weight of the closure, preferably from 80% by weight to 100% by weight of the closure, preferably from 85% by weight to 100% by weight of the closure, preferably from 85% by weight to 99.9% by weight of the closure, preferably from 90% by weight to 99.9% by weight of the closure, preferably from 90% by weight to 99% by weight of the closure, preferably from 90% by weight to 98% by weight of the closure, based on the entire weight of the closure, including any peripheral layer or layers if present, is biodegradable, as determined, for example, by ASTM D6400. If a chemical or physical blowing agent is used to form the foam plastic material, it can be possible to achieve up to and including about 100% biodegradability of the closure, for example from 90% by weight to 100% by weight of the closure, preferably from 95% by weight to 100% by weight of the closure, preferably from 98% by weight to 100% by weight of the closure, based on the entire weight of the closure, by selecting one or more biodegradable thermoplastic polymers as plastic material. The currently available polymer formulations for the shells of commercial expandable microspheres are not biodegradable. If a closure according to the invention is made using currently available expandable microspheres as foaming agent (blowing agent), the closure will include approximately the same weight percent amount of non-biodegradable polymer as the weight percent amount of the expandable microspheres in the closure, and the biodegradable portion of the closure will be correspondingly decreased by the same amount. Accordingly, if expandable microspheres are employed as foaming agent (blowing agent), the plastic material can comprise up to 10 wt. %, preferably from about 0.005 wt. % to about 10 wt. %, preferably in an amount ranging from about 0.05 wt. % to about 10 wt. %, preferably in an amount ranging from about 0.5 wt. % to about 10 wt. %, preferably in an amount ranging from about 1.0 wt. % to about 10 wt. %, preferably in an amount ranging from about 1.0 wt. % to about 8 wt. %, preferably in an amount ranging from about 1.0 wt. % to about 5 wt. %, preferably in an amount ranging from about 1.0 wt. % to about 4 wt. %, or in an amount ranging from about 1.5 wt. % to about 4.0 wt. %, based on the total weight of the plastic material, of non-biodegradable thermoplastic polymer. The same is generally true of any polymer or polymers which may be present in a masterbatch or slurry of expandable microspheres. For example, a commercially available masterbatch of Expancel from Akzo Nobel may include other polymers such as ethylene vinylacetate copolymer, EVA. These other components are not removed, but remain in the closure and, if themselves not biodegradable, further decrease the weight percent amount of biodegradable material by the same amount. The overall amount of non-biodegradable material preferably remains within the above ranges nonetheless. Should suitable biodegradable expandable microspheres become available, and/or materbatches or slurries in which biodegradable polymers replace non-biodegradable polymers, the amount of biodegradable material in the closure can be increased accordingly. Slurries may be advantageous in this respect, for example a slurry comprising only expandable microspheres and carrier liquid. Masterbatches in solid form may be advantageous for other reasons, such as ease of handling, dosing, storage and/or providing to a method step.

Whilst cork is biodegradable, it may not be biodegradable as determined by ASTM D6400. In this case, if the plastic material, or a percentage by weight of the plastic material, is biodegradable according to ASTM D6400, the closure is biodegradable according to ASTM D6400 to the extent of the content of biodegradable plastic material or to the percentage by weight of the biodegradable plastic material comprised in the closure.

The plastic material of the closure according to the invention preferably comprises one or more thermoplastic polymers selected from the group consisting of: polyethylenes; metallocene catalyst polyethylenes; polybutanes; polybutylenes; thermoplastic polyurethanes; silicones; vinyl-based resins; thermoplastic elastomers; polyesters; ethylenic acrylic copolymers; ethylene-vinyl-acetate copolymers; ethylene-methyl-acrylate copolymers; thermoplastic polyolefins; thermoplastic vulcanizates; flexible polyolefins; fluorelastomers; fluoropolymers; polytetrafluoroethylenes; ethylene-butyl-acrylate copolymers; ethylene-propylene-rubber; styrene butadiene rubber; styrene butadiene block copolymers; ethylene-ethyl-acrylic copolymers; ionomers; polypropylenes; copolymers of polypropylene and ethylenically unsaturated comonomers copolymerizable therewith; olefin copolymers; olefin block copolymers; cyclic olefin copolymers; styrene ethylene butadiene styrene block copolymers; styrene ethylene butylene styrene block copolymers; styrene ethylene butylene block copolymers; styrene butadiene styrene block copolymers; styrene butadiene block copolymers; styrene isoprene styrene block copolymers; styrene isobutylene block copolymers; styrene isoprene block copolymers; styrene ethylene propylene styrene block copolymers; styrene ethylene propylene block copolymers; polyvinylalcohol; polyvinylbutyral; polyhydroxyalkanoates; copolymers of hydroxyalkanoates and monomers of biodegradable polymers; polylactic acid; copolymers of lactic acid and monomers of biodegradable polymers; aliphatic copolyesters; polycaprolactone; polyglycolide; poly (3-hydroxybutyrate); poly(3-hydroxybutyrate-co-3-hydroxyvalerate); poly(3-hydroxybutyrate-co-3-hydroxyhexanoate); poly(butylenesuccinate); poly (butylenesuccinate-co-adipate); poly (trimethyleneterephthalate); aliphatic-aromatic copolyesters, in particular aliphatic-aromatic copolyesters comprising units derived from renewable resources and/or units derived from fossil resources, in particular one or more aliphatic-aromatic copolyesters selected from poly(butylenadipate-co-terephthalate); poly(butylenesuccinate-co-terephthalate); poly(butylenesebacate-co-terephthalate); polymers derived from lactic acid, copolymers of lactic acid and monomers of biodegradable polymers, in particular selected from polylactic acid; lactic acid caprolactone lactic acid copolymers; lactic acid ethylene oxide lactic acid copolymers; polymers formed from monomer units selected from vinylidene chloride, acrylonitrile, methacrylonitrile, and methyl methacrylate; copolymers formed from two or more monomer units selected from vinylidene chloride, acrylonitrile and methyl methacrylate; PEF, PTF, bio-based polyesters and combinations of any two or more thereof.

Thermoplastic polymers for the plastic material may be selected from the group consisting of polyolefins, in particular polyethylenes and/or polypropylenes. If a polyethylene is employed, in an exemplary aspect of the closure disclosed herein the polyethylene can comprise one or more polyethylenes selected from the group consisting of high density, medium density, low density, linear low density, ultra high density, and medium low density polyethylenes. Suitable plastic materials for the closure, or the core element thereof, can be polyethylene, in particular LDPE, and/or ethylene-vinyl-acetate copolymer (EVA). These materials can be used alone or in combination with one or more other thermoplastic polymers disclosed herein, in particular with metallocene PE or metallocene PP, particularly with metallocene PE.

The closure can comprise a cyclic olefin copolymer. Suitable cyclic olefin copolymers, as well as methods for their synthesis and characterization, are described in U.S. Pat. No. 8,063,163 B2, the contents of which in relation thereto are incorporated by reference herein and form a part of the present disclosure. A suitable cyclic olefin copolymer is commercially available under the name Topas® Elastomer E-140 from Topas Advanced Polymers, Germany. A preferred cyclic olefin copolymer is a copolymer of ethylene and norbornene.

Particularly preferred plastic materials are thermoplastic elastomers based on one or more polyesters. Thermoplastic elastomers have both thermoplastic and elastomeric properties and are sometimes also referred to as thermoplastic rubbers. The elastomeric properties can be useful in closures as they can contribute, for example to elasticity, compression recovery, and compressibility, among others. Elastomers are generally thermosetting and thus not thermoplastically processable. For this reason elastomers generally cannot be recycled. They also cannot be processed thermoplastically, for example by means of extrusion. Thermoplastic elastomers are thermoplastically processible and can be recycled. Thermoplastic elastomers based on polyesters can additionally be biodegradable to a significant degree due to the ester linkages, which are more easily cleaved than other polymer linkage types. Thermoplastic elastomers based on one or more polyamides can also be considered. However, thermoplastic elastomers based on one or more polyesters are preferred. The entire plastic material can be formed from one or more thermoplastic elastomers, or the plastic material can comprise one or more thermoplastic elastomers, in particular one or more thermoplastic elastomers based on one or more polyesters, in an amount of up to 80 wt. %, particularly in an amount in a range of from 2 wt. % to 80 wt. %, particularly in an amount in a range of from 5 wt. % to 80 wt. %, particularly in an amount in a range of from 10 wt. % to 80 wt. %, particularly in an amount in a range of from 15 wt. % to 80 wt. %, particularly in an amount in a range of from 20 wt. % to 80 wt. %, particularly in an amount in a range of from 25 wt. % to 80 wt. %, It is advantageous for the closure to be at least partially biodegradable, compostable, recyclable, or to be made using at least a proportion of renewable and/or sustainable materials. If it is desired that the closure should be biodegradable, or biodegradable to greater than 85 wt. %, preferably to greater than 90 wt. %, the plastic material preferably comprises one or more biodegradable thermoplastic polymers. In particular, the plastic material preferably comprises one or more biodegradable thermoplastic polymers selected from the group consisting of polyhydroxyalkanoates; copolymers of hydroxyalkanoates and monomers of biodegradable polymers; polylactic acid; copolymers of lactic acid and monomers of biodegradable polymers; aliphatic copolyesters; aliphatic-aromatic copolyesters; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); poly(butylenesuccinate-co-adipate); poly(trimethyleneterephthalate); poly(butylenadipate-co-terephthalate); poly(butylenesuccinate-co-terephthalate); poly(butylenesebacate-co-terephthalate); lactic acid caprolactone lactic acid copolymers; lactic acid ethylene oxide lactic acid copolymers; and combinations of any two or more thereof. If a polyhydroxyalkanoate (PHA) is comprised, the polyhydroxyalkanoate monomers preferably contain at least four carbon atoms, preferably four or five carbon atoms. Advantageously, the repeat unit of the polyhydroxyalkanoate according to the present disclosure comprises [—O—CHR—CH$_2$—CO—], wherein R is a linear or branched alkyl group with the formula C$_n$H$_{2n+1}$ with n being an integer from 1 to 15, particularly from 1 to 6. If a PHA is employed, in an exemplary aspect of the present disclosure, the PHA preferably comprises one or more PHAs selected from the group consisting of poly(3-hydroxybutyrate), poly(3-hydroxybutyrate-co-3-hydroxyvalerate), and poly(3-hydroxybutyrate-co-3-hydroxyhexanoate). Advantageously, these polymers have a molecular weight of from 100,000 g/mol to 1,000,000 g/mol and/or a melting point of from 100° C. to 200° C. Mixtures of one or more PHAs with poly(lactic acid) are also particularly useful. If a polyester is employed, in an exemplary aspect of the present disclosure, the polyester preferably comprises one or more polyesters selected from the group consisting of polycaprolactone, polyglycolide, poly(butylensuccinate), poly(lactic acid), polybutylenesuccinateadipate, polytrimethyleneterephthalate, polybutylenadipateterephthalate, polybutylensuccinate-terephthalate, polybutylensebacateterephthalate. If a block copolymer of lactic acid is employed, in an exemplary aspect of the present disclosure, the block copolymer of lactic acid comprises lactic acid-caprolactone-lactic acid copolymers, lactic acid-ethylene oxide-lactic acid copolymers. Particularly preferred biodegradable thermoplastic polymers are polybutylenesebacate-co-terephthalate ("PBSeT"), polybutyleneadipate-co-terephthalate ("PBAT"), and polylactic acid ("PLA"). Any of the thermoplastic polymers disclosed herein may be used alone as plastic material or in any weight percent combination with any one or more other thermoplastic polymer disclosed herein.

It is preferred if the plastic material comprises one or more thermoplastic polymers selected from the group consisting of aliphatic (co)polyesters, aliphatic-aromatic copolyesters, polylactic acid, EVA, olefinic polymers such as metallocene polyethylene, styrenic block copolymers, and any combination of two or more thereof.

If expandable microspheres are used as foaming agent (blowing agent), the plastic material may further comprise one or more thermoplastic polymers selected from the group consisting of polymers formed from monomer units selected from vinylidene chloride, acrylonitrile and methyl methacrylate; copolymers formed from two or more monomer units selected from vinylidene chloride, acrylonitrile and methyl methacrylate; and combinations of any two or more thereof. If the expandable microspheres are used in the form of a masterbatch, the plastic material may additionally comprise further polymer, which may or may not be biodegradable.

A particularly preferred biodegradable thermoplastic polymer is one or more aliphatic-aromatic copolyesters. According to a preferred aspect of the inventive closure, the closure comprises an aliphatic-aromatic copolyester. The aliphatic-aromatic copolyester is preferably selected from aliphatic-aromatic copolyesters having a glass transition temperature measured by Dynamic Scanning calorimetry (DSC) according to ASTM D3418-15 of less than 0° C., preferably less than −4° C., more preferably less than −10° C., more preferably less than −20° C., more preferably less than −30° C. The aliphatic-aromatic copolyester is preferably a statistical copolyester on the basis of at least adipic acid and/or sebacic acid. In a statistical copolyester, the constituting monomer units are irregularly distributed along the polymer chain. Statistical copolyesters are sometimes also referred to as random copolyesters. In general, aliphatic-aromatic copolyesters comprising terephthalate units derived from terephthalic acid or a substituted terephthalic acid as aromatic unit are preferred. Aliphatic-aromatic copolyesters comprising terephthalate units derived from terephthalic acid or a substituted terephthalic acid as aromatic unit and aliphatic units derived from difunctional aliphatic organic acids and/or difunctional aliphatic alcohols, such as aliphatic diacids, aliphatic diols, or aliphatic units comprising at least one alcohol functionality and at least one acid functionality, have been found capable of fulfilling the requirements imposed upon plastic materials for closures as described herein, in particular closures for wine bottles. Preferably, the aliphatic-aromatic copolyester according to the disclosure is a copolyester or a statistical copolyester on the basis of 1,4-butanediol, adipic acid or sebacic acid, and terephthalic acid or an ester-forming derivative of terephthalic acid. Preferably, the aliphatic-aromatic copolyester according to the disclosure exhibits a glass transition temperature measured according to ASTM D 3418-15 of from −25° C. to −40° C., more preferably from −30° C. to −35° C., and/or an area of melting temperatures of from 100° C. to 120° C., more preferably from 105° C. to 115° C. This ensures suitable handling and use properties in a typical temperature range. The aliphatic-aromatic copolyester according to the disclosure may have a melt volume rate ("MVR") measured at 190° C., 2.16 kg according to ISO 1133, or at 190° C./5 kg according to ISO 1133, in the range of from 1.5 to 7.0 ml/10 min, particularly in the range of from 2 to 6.5 ml/10 min, more particularly in the range of from 2.5 to 6.0 ml/10 min, more particularly measured at 190° C., 2.16 kg according to ISO 1133 in the range of from 2.5 to 4.5 ml/10 min, or more particularly measured at 190° C., 5.00 kg according to ISO 1133 in the range of from 2.5 to 5.5 ml/10 min. The aliphatic-aromatic copolyester according to the disclosure may have a melt flow index ("MFI"), also referred to as melt flow rate, measured at 190° C., 2.16 kg according to ISO 1133, or at 190° C./5 kg according to ISO 1133, in the range of from 1.5 to 15.0 g/10 min, particularly in the range of from 2 to 14 g/10 min, more particularly in the range of from 2.5 to 12.0 g/10 min, more particularly measured at 190° C., 2.16 kg according to ISO 1133 in the range of from 2.5 to 10 g/10 min, preferably in the range of from 2.5 to 8 g/10 min, or more particularly measured at 190° C., 5.00 kg according to ISO 1133 in the range of 2.5 to 10 g/10 min, in the range of from 2.5 to 8 g/10 min. Before measuring the MVR or the MFI the polymer may be dried at a temperature and for a time sufficient to remove sufficient water to minimise any plasticising effect of the water upon a melt of the plastic, for example at a temperature in a range of from 50° C. to 90° C., or at a temperature in a range of from 60° C. to 80° C., or preferably at a temperature in a range of from 65° C. to 75° C., and a time selected from up to 24 h, in particular 20 h, 15 h, 12 h, 10 h, 8 h, 6 h, 5 h, 4 h, 3 h, 2 h or 1 h or less than 1 h, for example 0.5 h; drying can be carried out for example for 6 h at 70° C., or for 5 h, 4 h, 3 h, 2 h or 1 h at 70° C., or for 0.5 h at 70° C. It can be advantageous if the thermoplastic polymer or polymers comprised in the plastic material can be processed in a similar way, using the same equipment and under similar conditions to polymers which are already known and used in formation of closures, such as polyethylene, in particular metallocene catalyst polyethylene. The MVR and MFI of the thermoplastic polymer or polymers comprised in the plastic material are preferably in a range which allows the plastic material to be formed by thermal processing as described herein, in particular using existing equipment, for example equipment and/or processes suitable for processing of polyethylene, in particular metallocene polyethylene, whilst ensuring sufficient mechanical strength of the final article. The density of the aliphatic-aromatic copolyester may be, preferably is in the range disclosed herein as unfoamed polymer density.

Particularly preferred biodegradable thermoplastic polymers are one or more selected from the group consisting of polybutyleneadipateterephthalates; polybutylenesuccinateterephthalates; polybutylenesebacateterephthalates; and combinations of two or more thereof. A suitable commercially available biodegradable thermoplastic aliphatic-aromatic copolyester is Ecoflex® C1200 from BASF SE, Ludwigshafen, Germany or from BASF Corporation of Wyandotte, Mich. (US). Ecoflex® C1200 is a polybutylene adipate terephthalate (PBAT) copolymer that is a statistical, aliphatic-aromatic copolyester based on the monomers 1,4-butanediol, adipic acid and terephthalic acid in the polymer chain. A further suitable commercially available biodegradable thermoplastic aliphatic-aromatic copolyester is Ecoflex® FS from BASF SE, Ludwigshafen, Germany or from BASF Corporation of Wyandotte, Mich. (US). Ecoflex® FS is a polybutylene sebacate terephthalate (referred to as PBSeT or PBST) copolymer that is a statistical, aliphatic-aromatic copolyester based on the monomers 1,4-butanediol, sebacic acid and terephthalic acid in the polymer chain. PBSeT has the further advantage that sebacic acid is derived from renewable (non-fossil) resources, thus further improving the environmental footprint of PBSeT compared to polymers derived entirely or to a greater extent from fossil resources.

If the closure comprises one or more peripheral layers, the peripheral layer or layers can comprise a thermoplastic polymer identical or similar to the thermoplastic polymer comprised in the core member. A peripheral layer can, on the other hand, comprise a thermoplastic polymer which is different from the thermoplastic polymer or thermoplastic polymers comprised in the core member.

According to an exemplary aspect of the closure of the present disclosure comprising a core member and at least one peripheral layer, the peripheral layer comprises at least one thermoplastic polymer selected from the group consisting of polyethylenes, metallocene catalyst polyethylenes, polypropylenes, metallocene catalyst polypropylenes, polybutenes, polybutylenes, other polyolefins, fluorinated polyolefins, particularly partially fluorinated or perfluorinated polyethylenes, polyurethanes, EPDM rubber, silicones, vinyl-based resins, thermoplastic elastomers, polyesters, ethylenic acrylic copolymers, ethylene-vinyl-acetate copolymers, ethylene-methyl-acrylate copolymers, thermoplastic polyurethanes, polyether-type polyurethanes, thermoplastic olefins, thermoplastic vulcanizates, flexible polyolefins, fluorelastomers, fluoropolymers, polyethylenes, polytetrafluoroethylenes, and blends thereof, ethylene-butyl-acrylate copolymers, ethylene-propylene-rubber, styrene butadiene rubber, styrene butadiene block copolymers, ethylene-ethyl-acrylic copolymers, ionomers, polypropylenes, and copolymers of polypropylene and copolymerizable ethylenically unsaturated comonomers, olefin copolymers, olefin block copolymers, cyclic olefin copolymers, styrene ethylene butadiene styrene block copolymers, styrene ethylene butylene styrene block copolymers, styrene ethylene butylene block copolymers, styrene butadiene styrene block copolymers, styrene butadiene block copolymers, styrene isoprene styrene block copolymers, styrene isobutylene block copolymers, styrene isoprene block copolymers, styrene ethylene propylene styrene block copolymers, styrene ethylene propylene block copolymers, polyvinylalcohol, polyvinylbutyral, polyhydroxyalkanoates, copolymers of hydroxyalkanoates and monomers of biodegradable polymers, aliphatic copolyesters, poly(lactic acid), copolymers of lactic acid and monomers of biodegradable polymers, polycaprolactone, polyglycolide, poly(3-hydroxybutyrate), poly(3-hydroxybutyrate-co-3-hydroxyvalerate), poly(3-hydroxybutyrate-co-3-hydroxyhexanoate), poly(butylensuccinate), aromatic-aliphatic copolyesters, for example poly(butylensuccinate-co-adipate), poly(trimethyleneterephthalate), poly(butylenadipate-co-terephthalate), poly(butylensuccinate-co-terephthalate), poly(butylensebacate-co-terephthalate), lactic acid caprolactone lactic acid copolymers, lactic acid ethylene oxide lactic acid copolymers, and combinations of two or more thereof. According to an exemplary aspect of the present disclosure said at least one peripheral layer is further defined as comprising one selected from the group consisting of foamed plastics and non-foamed plastics, advantageously having a substantially greater density than the core member, in order to impart desired physical characteristics to the bottle closure of the present disclosure. In particular, the composition employed for the at least one peripheral layer is particularly selected to withstand the compression forces imposed thereon by the jaws of the corking machine. However, many different polymers, as detailed herein, are able to withstand these forces and, as a result, can be employed for the at least one peripheral layer.

Particular examples of the plastic material for the at least one peripheral layer are polyethylene, a thermoplastic vulcanizate, styrene ethylene butylene styrene block copolymers, poly(butyleneadipateterephthalate) (PBAT), polybutylenesebacate coterephthalate (PBSeT), lactic acid-caprolactone-lactic acid copolymers, and combinations thereof. If desired, said at least one peripheral layer can be formed from a transparent material. Furthermore, the material selected for said at least one peripheral layer may be different from that of the core member.

In order to form bottle closures comprising a core member and at least one peripheral layer with some or all of the desirable inherent physical and chemical properties detailed above, it can be advantageous to comprise metallocene catalyst polyethylene in at least one peripheral layer. As detailed herein, at least one peripheral layer may comprise, for example, substantially metallocene catalyst polyethylene as single component, or the metallocene catalyst polyethylene may be combined with one or more thermoplastic elastomers, for example with one or more thermoplastic elastomers as detailed above. If the closure comprises a peripheral layer, at least one peripheral layer may comprise, for example, one or more polyethylenes selected from the group consisting of medium density polyethylenes, medium low density polyethylenes, and low density polyethylenes in an amount in the range of from about 5% to about 100% by weight, particularly in the range of from about 5% to about 80% by weight, particularly in the range of from about 10% to about 60% by weight, particularly in the range of from about 15% to about 40% by weight, based upon the weight of the entire composition.

While peripheral layers comprising polyethylenes provide preferred closure performance properties, in order to form bottle closures comprising a core member and at least one peripheral layer with some or all of the desirable inherent physical and chemical properties according to the present invention, in particular increased environmental friendliness, in particular increased closure biodegradability, it is preferred that at least one peripheral layer, if one or more peripheral layers are present, comprises poly(butyleneadipateterephthalate) (PBAT) and/or polybutylenesebacate coterephthalate (PBSeT). As detailed herein, at least one peripheral layer, if present, may comprise PBAT and/or PBSeT as substantially the sole polymer component or, if desired, PBAT and/or PBSeT may be combined with one or more thermoplastic elastomers, particularly with one or more thermoplastic elastomers as detailed above, particularly with one or more biodegradable thermoplastic elastomers as detailed above. In this regard, it has been found advantageous that at least one peripheral layer particularly comprises one or more polyesters selected from the group of biodegradable polyesters in an amount in the range of from about 5% to about 100% by weight, particularly in the range of from about 15% to about 95% by weight, particularly in the range of from about 25% to about 90% by weight, based upon the weight of the entire composition.

In an exemplary construction of this embodiment, the preferred PBAT and/or PBSeT employed for forming the at least one peripheral layer is or comprises Ecoflex®, which is sold by BASF Corporation of Wyandotte, Mich. (US). This compound has been found to produce an outer layer in combination with the core member which achieves at least one, particularly more than one, particularly almost all or even all of the physical and chemical characteristics suitable for attaining a highly effective closure for the wine industry. This may be an Ecoflex® F or Ecoflex® FS polymer, as disclosed herein.

A formulation which has been found to be highly effective in providing a peripheral layer comprises at least one lactic acid and/or at least one styrene block copolymer. Suitable styrene block copolymers which come into consideration can be selected from the group consisting of styrene ethylene butadiene styrene block copolymers, styrene ethylene butylene styrene block copolymers, styrene ethylene butylene block copolymers, styrene butadiene styrene block copolymers, styrene butadiene block copolymers, styrene isobutylene block copolymers, styrene isoprene styrene block copolymers, styrene isoprene block copolymers, styrene ethylene propylene styrene block copolymers, styrene ethylene propylene block copolymers and combinations of two or more thereof. In particular aspects of the present disclosure, the at least one styrene block copolymer is selected from the group consisting of styrene ethylene butadiene styrene block copolymers, styrene ethylene butylene styrene block copolymers, styrene ethylene propylene styrene block copolymers, styrene ethylene propylene block copolymers and combinations of two or more thereof. Examples of commercially available styrene block copolymers according to the present disclosure are SBS, SIS, SEBS, SIBS, SEPS, SEEPS, MBS, which are available, for example under the trade names Styroflex® and Styrolux® (BASF Corporation of Wyandotte, Mich., USA), Septon® Q, Septon® V, and Hybar (Kuraray America, Inc., Houston, Tex., USA), Maxelast® TPE (Nantong Polymax Elastomer Technology Co., Ltd), GLOBALPRENE® Polymers (LCY Chemical Corporation), Elexar® and Monprene® (Teknor Apex Company), Elastocon® series (Elastocon TPE Technologies, Inc.), TPR (Washington Pa.), Evoprene™ (Alpha Gary), Versaflex®, OnFlex®, Versalloy®, Versollan®, Dynaflex® (GLS Thermoplastic Elastomers), Sevrene™ (Vichem Corporation), Vector™ (Dexco Polymers LP), Calprene® and Solprene (Dynasol), Multiflex® TEA and Multiflee TPE (Multibase, Inc.), Europrene® Sol T (Polimeri Europe), Sunprene™ (PolyOne), Leostomer® (Riken Technos Corporation), RTP 2700 and 6000 series (RTP), Invision® (A. Schulman), Dryflex® (VTC Elastotechnik), Quintac® (Zeon), Megol® and Raplan® (API spa), Asaprene™ and Tufprene™ (Asahi Kasei), Lifoflex (Müller Kunststoffe, Germany), Thermolast® (Kraiburg TPE GmbH & Co. KG, Waldkraiberg, Germany) or Kraton®, for example Kraton® D, Kraton® G or Kraton® FG (Kraton Polymers, Houston, Tex., USA). Suitable lactic acid copolymers which come into consideration can be selected from the group consisting of lactic acid caprolactone lactic acid block copolymers, lactic acid ethylene oxide lactic acid block copolymers, and mixtures thereof. Further sources for biodegradable polymers can be found in "Bio-Based Plastics: Materials and Applications", Stephan Kabasci, editor, John Wiley & Sons, 2014, ISBN 978-1119994008.

Another formulation which has been found to be highly effective in providing a peripheral layer comprises at least one thermoplastic vulcanizate.

Another formulation which has been found to be highly effective in providing a peripheral layer which provides at least one, particularly more than one, particularly almost all or even all physical and chemical attributes to attain a commercially viable closure comprises at least one of at least one polyether-type thermoplastic polyurethane and at least one olefin block copolymer or a blend of at least two thereof.

Each of the materials disclosed as suitable for a peripheral layer can be used alone or in combination with one or more of these materials. By employing this material or these materials and forming the material or the materials in peripheral, surrounding, bonded engagement with any desired foamed core member, a highly effective, multi-layer closure can be attained which is able to provide at least one, particularly more than one, particularly almost all or even all properties suitable for a wine bottle closure.

In an exemplary construction of this embodiment, the particular polyether-type thermoplastic polyurethane employed for forming the at least one peripheral layer comprises Elastollan® LP9162, manufactured by BASF Corporation of Wyandotte, Mich. (US). This compound has been found to produce an outer layer in combination with the core member which provides at least one, particularly more than one, particularly almost all or even all of the physical and chemical characteristics suitable for attaining a highly effective closure for the wine industry.

In another exemplary aspect of the disclosed closure comprising a core member and at least one peripheral layer, the peripheral layer comprises thermoplastic vulcanizates (TPV). Such thermoplastic vulcanizates are well known in the art and are commercially available, for example, under the trade name Santoprene® from ExxonMobil Chemical Company of Houston, Tex. (US), Sarlink® from Teknor Apex B.V., Geleen (NL) or OnFlex® from PolyOne Inc. of Avon Lake, Ohio (US).

In addition to employing the polyether-type thermoplastic polyurethane detailed above, another composition that has been found to be highly effective in providing at least one, particularly more than one, particularly almost all or even all of the desirable attributes for at least one peripheral layer is a blend of at least one polyolefin, particularly at least one thermoplastic polyolefin and at least one thermoplastic vulcanizate. The construction of a closure using a peripheral layer formed from this blend provides a closure which is highly suitable for use as a wine bottle closure.

A further composition that can provide at least one, particularly more than one, particularly almost all or even all of the desirable attributes for at least one peripheral layer is a blend of at least one polyolefin, particularly at least one thermoplastic polyolefin, and at least one styrene block copolymer, or a blend of at least one thermoplastic vulcanizate and at least one styrene block copolymer. The construction of a closure using a peripheral layer formed from this blend provides a closure which is highly suitable for use as a wine bottle closure.

In a further alternate embodiment, a closure can be attained by employing at least one of at least one metallocene catalyst polyethylene and at least one olefin block copolymer, either independently or in combination with at least one selected from the group consisting of low density polyethylenes, medium density polyethylenes, and medium low density polyethylenes.

A further composition that has been found to be highly effective in providing at least one, particularly more than one, particularly almost all or even all of the desirable attributes for at least one peripheral layer, and is preferred according to the present invention, is a blend of at least one polyester, particularly at least one statistical aromatic-aliphatic copolyester, and at least one lactic acid block copolymer. A suitable blend of at least one polyester, preferably at least one statistical aromatic-aliphatic copolyester, preferably PBAT and/or PBSeT, and at least one lactic acid polymer or lactic acid derivative, in particular at least one lactic acid block copolymer, comprises the polyester, preferably the statistical aromatic-aliphatic copolyester in an amount in the range of from about 5% to about 95% by weight, or in an amount in the range of from about 20% to about 80% by weight, or in an amount in the range of from about 30% to about 70% by weight, or in an amount in the range of from about 40% to about 60% by weight, based upon the weight of the entire composition of and the lactic acid polymer or lactic acid derivative, preferably the lactic acid block copolymer, in an amount in the range of from about 95% to about 5% by weight, particularly in an amount in the range of from about 80% to about 20% by weight, particularly in an amount in the range of from about 70% to about 30% by weight, particularly in an amount in the range of from about 60% to about 40% by weight, based upon the weight of the entire composition. Exemplary weight ratios of lactic acid block copolymer to statistical aliphatic-aromatic copolyester are about 95:5, about 90:10, about 85:15, about 80:20, about 75:25, about 70:30, about 65:35, about 60:40, about 55:45, about 50:50, based on the total weight of lactic acid block copolymer and statistical aliphatic-aromatic copolyester. The construction of a closure using a peripheral layer formed from this blend provides a closure which is highly suitable for use as a wine bottle closure, particularly a biodegradable wine bottle closure.

Still further additional compounds which have been found to provide highly effective peripheral layers for forming closures, in accordance with the present disclosure, comprise Teflon®, fluoroelastomeric compounds and fluoropolymers. These compounds, whether employed individually or in combination with each other or with the other compounds detailed above have been found to be highly effective in producing a peripheral layer which is capable of providing at least one, particularly more than one, particularly almost all or even all of the properties making it suitable for bottle closures.

Any of the compounds detailed herein for providing the at least one peripheral layer can be employed alone or in combination with each other, using suitable preparation methods detailed herein to produce a peripheral layer which is securely and integrally bonded to the core member and/or to a different peripheral layer, as a foamed outer layer or a non-foamed outer layer, or as an intermediate layer.

According to a particular aspect of the present disclosure, at least one, preferably each, thermoplastic polymer comprised in the peripheral layer is biodegradable according to ASTM D6400.

The at least one peripheral layer, if present, particularly the outer peripheral layer is particularly formed with a thickness and/or a density which are capable of imparting desired physical characteristics, such as resistance to bottling conditions, to the closure of the present disclosure. The at least one peripheral layer, particularly the outer peripheral layer is, in particular, formed with a substantially greater density than the inner core and/or with a selected thickness.

Accordingly, said at least one peripheral layer, if present, is particularly further defined as comprising a thickness ranging from about 0.05 mm to about 5 mm. Although this range has been found to be efficacious for producing a closure which is completely functional and achieves most or all of the desired goals, the exemplary aspect for wine bottles particularly comprises a thickness ranging from about 0.05 mm to about 2 mm, whereby exemplary lower limits for the thickness are about 0.05 mm, about 0.06 mm, about 0.07 mm, about 0.08 mm, about 0.09 mm, about 0.1 mm, about 0.2 mm, about 0.3 mm, about 0.4 mm or about 0.5 mm and exemplary upper limits for the thickness are about 1 mm, about 2 mm, about 3 mm, about 4 mm, or about 5 mm. The exemplary thickness of the at least one peripheral layer, if present, can be selected according to criteria such as, for example, the composition, physical properties and/or density of the material of the at least one peripheral layer, and the desired properties of the at least one peripheral layer.

As discussed herein, intimate bonded interengagement of the at least one peripheral layer, if present, to the core member is advantageous for providing a bottle closure capable of being used in the wine industry. In this regard, although it has been found that the methods detailed herein provide secure intimate bonded interengagement of the at least one peripheral layer to the core member, alternative layers or bonding chemicals can be employed, depending upon the particular materials used for forming the core member and the at least one peripheral layer.

If desired, for a disclosed closure comprising a core member and at least one peripheral layer, bonding agents or tie layers known to the skilled person can be employed on the outer surface of the core member in order to provide secure intimate bonded interengagement of the at least one peripheral layer therewith. If a tie layer is employed, the tie layer would effectively be interposed between the core member and the at least one peripheral layer to provide intimate bonded interengagement by effectively bonding the peripheral layer and the core member to the intermediately positioned tie layer. However, regardless of which process or bonding procedure is employed, all of these alternate embodiments are within the scope of the present disclosure. If more than one peripheral layer is present, such bonding agents or tie layers can similarly be employed between respective peripheral layers.

The closure according to the present invention comprises a plurality of cork particles (or coated particles as defined herein). The cork particles (or coated cork particles as defined herein) may have a particle size distribution measured by means of mechanical sieving, according to the ISO standard test method ICS 19.120, such that the $D_{50}$ value is in the range of from 0.25 millimetres to 5 millimetres. The plurality of particles preferably has a $D_{50}$ determined according to test method ICS 19.120, in the range of from 0.3 mm to 3 mm, or in the range of from 0.5 mm to 2.0 mm, particularly in the range of from greater than 1.0 mm to 2.0 mm. The particle size is determined for the plurality of particles, or for the cork particles, in particular for the cork particles which are comprised in the plurality of particles, before their incorporation into the closure, in particular before providing the plurality of particles to a method according to the present disclosure.

Alternatively or additionally, the cork particles (or the coated particles as defined herein) may be defined by their average or mean particle size measured by means of mechanical sieving, according to the ISO standard test method ICS 19.120. Preferably, the average or mean particle size of the particles is in the range of from 0.25 mm to 5 mm, preferably in the range of from 0.5 mm to 4 mm, preferably in the range of from 0.5 mm to 6 mm, preferably in the range of from 0.5 mm to 5.0 mm, preferably in the range of from 0.5 mm to 4.0 mm, preferably in the range of from 0.8 mm to 4.0 mm, preferably in the range of from 0.8 mm to 3.8 mm, preferably in the range of from 0.8 mm to 3.5 mm, preferably in the range of from 1.0 mm to 3.5 mm, preferably in the range of from 1.0 mm to 3.3 mm, most preferably in the range of from 1.0 mm to 3.0 mm. The plurality of particles can alternatively or additionally have an average or mean particle size or a $D_{50}$ value in the range of from greater than 2.0 mm to 10.0 mm, particularly in the range of from greater than 2.0 mm to 8.0 mm, preferably in the range of from greater than 2.0 mm to 5.0 mm, or in the range of from greater than 2.0 mm to 4.0 mm, preferably in the range of from greater than 2.0 mm to 3.5 mm, particularly in the range of from greater than 2.0 mm to 3.0 mm. Preferred ranges for the average or mean particle size or $D_{50}$ are selected from the ranges of from 0.9 mm to 1.0 mm, from 1.0 mm to 2.0 mm, from 1.5 mm to 2.5 mm, from 2.0 mm to 3.0 mm, from 2.5 mm to 3.5 mm, and from 3.0 mm to 4.0 mm. Particularly preferred ranges for the average particle size or $D_{50}$ are selected from the ranges of from 1.0 mm to 2.0 mm, and from 2.0 mm to 3.0 mm, or from greater than 1.0 mm to less than 2.0 mm, or from greater than 2.0 mm to 3.0 mm.

It is possible that the plurality of coated particles (a) comprising cork comprises a mixture of two or more different average particle sizes $D_{50}$. In particular, the cork within the coated particles can comprise a mixture of two or more different average particle sizes $D_{50}$. For example, the plurality of coated particles (a), in particular the cork particles comprised in the coated particles, can comprise a mixture of larger particles defined as having an average particle size $D_{50}$ in the range of from 1.0 mm to 3.0 mm, or from greater than 1.0 mm to 3.0 mm, or from 1.0 mm to 2.5 mm, or from greater than 1.0 mm to 2.5 mm, or from 1.0 mm to 2.0 mm, or from greater than 1.0 mm to 2.0 mm; and smaller particles defined as having an average particle size $D_{50}$ of 1.0 mm or less, for example from 0.1 mm to 1.0 mm or from 0.1 to less than 1.0 mm, or from 0.2 to 1.0 mm or from 0.2 to less than 1.0 mm, or from 0.3 to 1.0 mm or from 0.3 to less than 1.0 mm, or from 0.4 to 1.0 mm or from 0.4 to less than 1.0 mm, more particularly from 0.5 to 1.0 mm or from 0.5 to less than 1.0 mm.

The two types of particle size may be present in any ratio relative to each other. For example, there may be a greater proportion of larger particles relative to smaller particles, or there may be a greater proportion of smaller particles relative to larger particles. The amounts are relative to each other, so a relative greater amount means above 50 wt. % and a relative lesser amount means below 50 wt. %, based on the total weight of the particles. The principal difference between these two types of ratio is the visual aspect of the closure. Smaller particles with an average particle size $D_{50}$ as defined herein can contribute to a more uniform appearance of the closure. It can be advantageous to have a greater amount of smaller particles relative to larger particles. Larger particles with an average particle size $D_{50}$ as defined herein can contribute to cohesion and stability of the closure.

A mixture of larger particles and smaller particles as defined herein may be employed. The method of the present disclosure defines a preferred aspect, wherein the coated particles comprising cork, in particular the cork particles comprised in the coated particles, comprise a mixture of at least:

from 5 wt. % to 100 wt. %, particularly in a range of from 10 wt. % to 95 wt. %, particularly in a range of from 20 wt. % to 90 wt. %, particularly in a range of from 30 wt. % to 80 wt. %, particularly in a range of from 40 wt. % to 75 wt. %, particularly in a range of from 50 wt. % to 75 wt. %, particularly in a range of from 55 wt. % to 75 wt. %, particularly in a range of from 60 wt. % to 70 wt. %, based on the total weight of the cork particles, of smaller particles, in particular smaller cork particles having a particle size distribution $D_{50}$ measured by means of mechanical sieving according to ISO ICS 19.120 and in particular ISO 2591-1:1988 in the range of from 1.0 mm or less, for example from 0.1 mm to 1.0 mm or from 0.1 to less than 1.0 mm, or from 0.2 to 1.0 mm or from 0.2 to less than 1.0 mm, or from 0.3 to 1.0 mm or from 0.3 to less than 1.0 mm, or from 0.4 to 1.0 mm or from 0.4 to less than 1.0 mm, more particularly from 0.5 to 1.0 mm or from 0.5 to less than 1.0 mm; and from 0 wt. % to 95 wt. %, particularly in a range of from 5 wt. % to 90 wt. %, particularly in a range of from 10 wt. % to 80 wt. %, particularly in a range of from 20 wt. % to 70 wt. %, particularly in a range of from 25 wt. % to 60 wt. %, particularly in a range of from 25 wt. % to 50 wt. %, particularly in a range of from 25 wt. % to 45 wt. %, particularly in a range of from 30 wt. % to 40 wt. %, based on the total weight of the cork particles of larger particles, in particular larger cork particles having a particle size distribution $D_{50}$ measured by means of mechanical sieving according to ISO ICS 19.120 and in particular ISO 2591-1:1988, in the range of from 1.0 mm to 3.0 mm, or from greater than 1.0 mm to 3.0 mm, or from 1.0 mm to 2.5 mm, or from greater than 1.0 mm to 2.5 mm, or from 1.0 mm to 2.0 mm, or from greater than 1.0 mm to 2.0 mm.

The method of the present disclosure defines a further aspect, wherein the particles comprising cork, in particular the cork particles comprised in the coated particles, comprise a mixture of at least:

from 5 wt. % to 100 wt. %, particularly in a range of from 10 wt. % to 95 wt. %, particularly in a range of from 20 wt. % to 90 wt. %, particularly in a range of from 30 wt. % to 90 wt. %, particularly in a range of from 40 wt. % to 85 wt. %, particularly in a range of from 50 wt. % to 85 wt. %, particularly in a range of from 55 wt. % to 85 wt. %, particularly in a range of from 60 wt. % to 85 wt. %, based on the total weight of the cork particles, of larger particles, in particular larger cork particles having a particle size distribution $D_{50}$ measured by means of mechanical sieving according to ISO ICS 19.120 and in particular ISO 2591-1:1988, in the range of from 1.0 mm to 3.0 mm, or from greater than 1.0 mm to 3.0 mm, or from 1.0 mm to 2.5 mm, or from greater than 1.0 mm to 2.5 mm, or from 1.0 mm to 2.0 mm, or from greater than 1.0 mm to 2.0 mm; and from 0 wt. % to 95 wt. %, particularly in a range of from 5 wt. % to 90 wt. %, particularly in a range of from 10 wt. % to 80 wt. %, particularly in a range of from 10 wt. % to 70 wt. %, particularly in a range of from 15 wt. % to 60 wt. %, particularly in a range of from 15 wt. % to 50 wt. %, particularly in a range of from 15 wt. % to 45 wt. %, particularly in a range of from 15 wt. % to 40 wt. %, based on the total weight of the cork particles, of smaller particles, in particular smaller cork particles having a particle size distribution $D_{50}$ measured by means of mechanical sieving according to ISO ICS 19.120 and in particular ISO 2591-1:1988 in the range of from 1.0 mm or less, for example from 0.1 mm to 1.0 mm or from 0.1 to less than 1.0 mm, or from 0.2 to 1.0 mm or from 0.2 to less than 1.0 mm, or from 0.3 to 1.0 mm or from 0.3 to less than 1.0 mm, or from 0.4 to 1.0 mm or from 0.4 to less than 1.0 mm, more particularly from 0.5 to 1.0 mm or from 0.5 to less than 1.0 mm.

It is believed that the use of larger particles as defined herein, for example in the amounts defined herein, can be advantageous for mechanical properties of the closure. The use of smaller particles as defined herein, for example in the amounts defined herein, contributes to providing a visual appearance of the closure which more closely resembles a natural cork closure.

As used herein, the term "particle" may refer to the core comprising cork material (e.g. a cork particle forming the core of the coated particle) or to the coated particle as defined herein or to both. The same applies to the term "plurality of particles".

Manufacture of Coated Particles

The coated particles used in the method according to the present invention can be produced, for example, by a method as described in the following three clauses:

1. A method for manufacturing coated particles, said coated particles comprising (1) a core comprising cork material and (2) at least one outer shell comprising a plastic material, said method comprising at least the following method steps:
    i. providing a mixture comprising the following components:
        (A) 60 to 90 wt. % of cork particles having a particle size distribution $D_{50}$ measured by means of mechanical sieving according to ISO ICS 19.120 and in particular ISO 2591-1:1988, in the range of from 0.25 millimetres to 5 millimetres;
        (B) 10 to 40 wt. % of plastic material comprising one or more thermoplastic polymers;
    ii. applying mechanical and/or thermal energy to said mixture to at least partially soften component (B) and;
    iii. blending said mixture, whereby component (B) is at least partially distributed over the surfaces of the individual cork particles of component (A), to obtain said coated particles.

2. A method for manufacturing coated particles, said coated particles comprising (1) a core comprising cork material and (2) at least one outer shell comprising a plastic material, said method comprising at least the following method steps:
    i. providing a mixture comprising the following components:
        (A) 51 to 95 wt. % of cork particles having a particle size distribution $D_{50}$ measured by means of mechanical sieving according to ISO ICS 19.120 and in particular ISO 2591-1:1988 in the range of from 0.25 millimetres to 5 millimetres;

(B) 5 to 49 wt. % of plastic material comprising one or more thermoplastic polymers;

ii. applying mechanical and/or thermal energy to said mixture to at least partially soften component (B) and;

iii. blending said mixture, whereby component (B) is at least partially distributed over the surfaces of the individual cork particles of component (A), to obtain said coated particles.

3. The method of any one of clauses 1 or 2, wherein in step iii. component (B) is distributed over essentially the entire surface area of the individual cork particles of component (A).

According to the method for manufacturing coated particles as disclosed herein, in a first method step (i), a mixture is provided comprising components (A) and (B) in the amounts disclosed herein. In particular, the components (A) and (B) may be comprised, for example, in the following weight percent amounts, based on the total weight of components (A) and (B):

(A) 60 to 90 wt. %, in particular 62 to 85 wt. %, in particular 65 to 80 wt. %, in particular 65 to 75 wt. % of the cork particles (dry weight);

(B) 10 to 40 wt. %, in particular 15 to 38 wt. %, in particular 20 to 35 wt. %, in particular 25 to 35 wt. % of the plastic material, or in the following weight percent amounts, based on the total weight of components (A) and (B):

(A) 51 to 95 wt. %, in particular 52 to 90 wt. %, in particular 55 to 85 wt. %, in particular 60 to 80 wt. % of the cork particles (dry weight);

(B) 5 to 49 wt. %, in particular 10 to 48 wt. %, in particular 15 to 45 wt. %, in particular 20 to 40 wt. % of the plastic material.

In method step (ii), mechanical and/or thermal energy is or are provided to the mixture provided in method step (i). Thermal energy is preferably provided by heating, or by infra-red heating. Mechanical energy is preferably provided in the form of shear, for example by mixing, for example by high speed mixing with a shear rate as disclosed herein. The mechanical and/or thermal energy is preferably sufficient to soften at least partially or at least a part of plastic material (B).

In method step (iii), the mixture is blended, preferably at high speed as disclosed herein, whereby component (B) is at least partially distributed over the surfaces of the individual cork particles of component (A), to obtain said coated particles. It is preferred that plastic material (B) is at least partially softened, at least partially, preferably substantially, in molten form, during method step (iii). This can be achieved, for example, through use of high speed mixing at a shear rate as disclosed herein, and/or through heating. Method step (iii) is preferably carried out with high speed mixing at a shear rate as disclosed herein, and/or with heating. By using the method of the present disclosure, component (B) is at least partially distributed over the surfaces of the individual cork particles of component (A), to obtain said coated particles Method steps ii. and iii. may be carried out subsequently, meaning first one and then the other, optionally with a pause between steps (ii) and (iii), or concurrently, meaning both at substantially the same time.

Preferably in method step iii. component (B) is distributed over essentially the entire surface area of the individual cork particles of component (A). This allows the formation of coated particles in which the cork core is entirely or almost entirely encapsulated by plastic material (B), preferably without any uncovered portions.

In a preferred aspect of the method, step ii. and/or step iii. is/are carried out so as to substantially avoid any decomposition of components (A) and/or (B). Decomposition may occur, for example, if either of components (A) and (B) is subjected to a temperature close to, at or above its respective decomposition temperature. Decomposition might also occur, for example, through mechanical means, for example if too high a shear rate is employed.

It is preferred that step ii. and/or step iii. is/are carried out so as to substantially avoid any crosslinking of component (B). Plastic material (B) might become crosslinked, for example, if plastic material (B) comprises groups susceptible to being crosslinked, such as reactive groups which can form crosslinking bonds with other groups on plastic material (B), for example if plastic material (B) is subjected to a temperature at which such crosslinking type reactions can occur. Crosslinking can reduce thermoplastic processability of plastic material (B).

Component (B) is preferably essentially free of a material selected from the group consisting of thermoset polymers, crosslinkable polymers, curable polymers and non-thermoplastic polymers. These types of materials can reduce or eliminate thermoplastic processability, either because the material itself is not thermoplastically processable, or through reactions, such as crosslinking, curing, and the like, which could reduce thermoplastic processability of plastic material (B) or render the plastic material not thermoplastically processable.

Preferably, component (B) is essentially free of polyurethane. Polyurethane, in particular when used as a binder in agglomerate corks, is generally formed by reactive polymerization and is not a thermoplastic.

Method step ii. and/or method step iii. is/are preferably carried out at a temperature of 50 to 250° C., in particular 60 to 200° C., or 90 to 150° C., or 100 to 150° C. These temperatures can ensure thermoplastic processability of plastic material (B), sufficient to coat particles (A) with plastic material (B), without or substantially without crosslinking or crosslinking type reactions which could reduce thermoplastic processability of plastic material (B), or degradation or decomposition of either or both of components (A) and (B).

In a preferred aspect of the method of the invention, step ii. and/or step iii. comprise(s) subjecting said mixture to a shear rate of at least 50 s$^{-1}$, in particular at least 100 s$^{-1}$, and more particular 200 s$^{-1}$. This constitutes the definition of high shear according to the present disclosure. The upper limit for shear rate is limited by the mixing equipment used for the method of the invention, and by the shear rate at which the components do not degrade or decompose. Suitable upper limits will depend to some extent on the components to be mixed and can be determined by the skilled person through routine experimentation. These shear rates can ensure suitable processability of components (A) and (B), sufficient to coat particles (A) with plastic material (B), without or substantially without crosslinking or crosslinking type reactions which could reduce thermoplastic processability of plastic material (B), or degradation or decomposition of either or both of components (A) and (B).

Step ii. and/or step iii. is/are preferably carried out in a high-shear mechanical device. High shear mechanical devices are commercially available. The high shear mechanical device may be any high shear mechanical device known and appearing suitable to the skilled person.

Preferably the high-shear mechanical device comprises at least one rotor and/or at least one stator, preferably at least one rotor and at least one stator. A high shear mechanical device comprising an array of rotors and stators may also be used.

The high-shear mechanical device may be a batch high-shear device or an inline high-shear mechanical device. In either case, the dwell time of the mixture in the high-shear mechanical device is preferably sufficient to achieve coating of the cork particles (A) with plastic material (B) without degradation or decomposition of either one or both of components (A) and (B) or of the coated particles. An inline high-shear mechanical device is preferably used in a continuous process.

The rotor of the high-shear mechanical device may operate at a peripheral velocity of 4 to 50 m/s, in particular 15 to 40 m/s or at least 25 m/s, in particular 25 to 50 m/s or 25 to 40 m/s. A higher peripheral velocity will provide a higher shear. This may, for example, reduce the dwell time in the high-shear mixer necessary to achieve coating of the particles (A), and/or result in a thinner coating, and/or reduce the amount of thermal energy necessary to achieve coating.

The method of the present disclosure for manufacturing coated cork particles may further comprise the following method step: iv. blending the mixture of step iii. in a mechanical mixing device at a temperature lower than that of step iii. If step (iv) is present, it is preferably continuous to step (iii), i.e. directly following step (iii) with no discontinuous pause between steps (iii) and (iv). A step (iv) at a lower temperature than that of step (iii) may also be referred to as a cooling step. When exiting step (iii) the coated particles may still be at elevated temperature in the ranges disclosed herein, possibly at a temperature at which the plastic material (B) is soft or partially molten. This may result in the coating of plastic material (B) of individual particles sticking to equipment and/or to other particles. Mixing in step (iv) at a lower temperature than the blending in step (iii) contributes to maintaining the coated particles in individual particulate form until they are cool enough for the plastic material to no longer be soft or sticky, preventing agglomeration and clumping.

In order to achieve this, the blending in step iv. is preferably carried out at a temperature of 5 to 100° C., 23 to 90° C., 40 to 80° C. or 50 to 60° C. The temperature or temperature range can be selected depending on factors such as the desired rate of cooling, and the melting or softening temperature of the plastic material.

The blending in step iv. is preferably carried out in a mechanical blending device comprising at least one rotor, said rotor operating at a peripheral velocity of 0.3 to 5.5 m/s. The upper limit overlaps with the lower limit of the peripheral velocity for the high shear mechanical device. This can permit a smooth transition. It is possible that the blending in step (iv) includes a portion at higher peripheral velocity and a portion at lower peripheral velocity. It is also possible that the blending in step (iv) takes place at a continuous peripheral velocity in the disclosed range.

The method for producing coated cork particles is exemplified in Example 1 herein.

The cork material is preferably suitable for food contact. The cork material is preferably a plurality of "clean" cork particles. This means that the particles are cleaned or washed using an appropriate cleaning or washing method, before being incorporated into or used in the inventive closures. The plurality of clean particles is preferably free or substantially free from any contaminants, for example contaminants that might be present from previous uses or processing steps, as well as agents that can affect the taste, smell, and/or other properties of the product to be retained in the container. The plurality of clean particles is particularly preferably free or substantially free from organoleptic agents, in particular free from all or substantially all haloanisoles, in particular TCA, but also optionally TBA, TeCA and/or PCA. If the plurality of particles is a plurality of cork particles, the particles have preferably been washed in order to remove all or substantially all organoleptic agents, in particular all or substantially all haloanisoles, in particular TCA, but also optionally TBA, TeCA and/or PCA which may be present in cork. Such a washing step can be effected, for example, by means of any suitable solvent, including, but not limited to, organic solvents such as hydrocarbons, aqueous fluids such as washing solutions or dispersions which are capable of removing TCA from cork, or supercritical fluids such as supercritical carbon dioxide. Environmentally friendly solvents which are also food-safe are preferred, such as aqueous fluids or supercritical fluids. During a washing step the cork particles can be suspended in the solvent, optionally agitated, and then the solvent removed by filtration or the like. A washing step can be repeated as many times as necessary to achieve an acceptable level of haloanisoles, particularly of chloroanisoles, particularly of TCA, but also optionally TBA, TeCA and/or PCA, in the particles, in particular in the cork particles. The amount of haloanisole released from a cork into wine can be measured as so-called "releasable haloanisole" by soaking a cork or a sample of corks in a wine for 24 hours for an untreated cork or 48 hours for a treated cork, and measuring the amount of each haloanisole compound in the wine, for example by means of chromatographic or spectroscopic methods such as gas chromatography or nuclear magnetic resonance spectroscopy. An acceptable level is generally considered to be one which results in an amount of the respective chloroanisole or chloroanisoles in the wine which is below the average sensory threshold of about 6 ng/L for TCA or TBA, whereby TeCA and PCA have been reported to be respectively about three times and one thousand times less potent in their sensory thresholds. A closure disclosed herein preferably has a content of releasable trichloroanisole of less than 2 ng/L, preferably less than 1 ng/L, preferably less than 0.5 ng/L, preferably less than 0.3 ng/L.

The cork material preferably has a humidity in the range of from about 0% to about 10%, particularly in the range of from about 0% to about 8%, particularly in the range of from about 0% to about 8%, particularly in the range of from about 0% to about 7%, particularly in the range of from about 0% to about 6%, more particularly in the range of from about 0% to about 5%, more particularly in the range of from about 0% to about 5%, more particularly in the range of from about 0% to about 4%, more particularly in the range of from about 0% to about 3%, more particularly in the range of from about 0% to about 2%, more particularly in the range of from about 0% to about 1%. The humidity is measured in particular by standard method ISO 9727-3. ISO 9727-3 provides a method for measuring water content of cork and can be used, for example, to measure the humidity of cork particles as used in the methods of the present disclosure. It is also possible to measure the humidity of cork particles in a closure, for example using standard method, ISO15512: 2016 to determine the overall water content of the closure or of a sample of the closure material, and assuming that the plastic material has a water content of effectively zero, so that any measured water content is due to the cork. The water content of the cork can be modified if desired, prior to formation of a closure according to the present disclosure, for example by drying means, such as for example solvent extraction, heating means such as conventional heating or infra-red treatment. Infra-red treatment can be advantageous as it does not have the risk of leaving solvent residues or of damaging, burning or discolouring the cork.

One advantage of the closure and methods according to the present disclosure is that it is possible to achieve a homogeneous distribution of the cork particles (or the coated particles as defined herein) throughout the closure. In particular, the cork particles (or the coated particles as defined herein) are preferably homogeneously distributed within the polymer matrix, preferably substantially each individual particle is surrounded by and embedded within the polymer matrix Accordingly, in the inventive closure the cork particles are preferably distributed homogeneously throughout the closure. This is possible because the formulation enables a processability that allows the formation of a polymer matrix by means of extrusion, the polymer matrix having physical properties, such as cellular structure and cell density, that support a homogeneous distribution of the cork particles (or the coated particles as defined herein) throughout the polymer matrix. The homogeneous distribution of the cork particles (or the coated particles as defined herein) is advantageous because it allows individual particles to be coated by and/or embedded within the polymer matrix, which avoids the formation of localized clusters of particles without sufficient polymer, which in turn can cause weak spots and crumbling of the closure. The composition and method disclosed herein contribute to achieving these advantages.

According to one aspect of the closure according to the present disclosure, the closure comprises a core member and does not comprise a peripheral layer. In this aspect, the core member forms the entire closure, and the plurality of particles is comprised in the core member. This aspect can be advantageous particularly in reducing cost per closure, and simplifying the production.

If a peripheral layer is comprised, the cork particles (or the coated particles as defined herein) are comprised in at least one of the core member and the peripheral layer, preferably in either the core member or the peripheral layer, or in the core member and the peripheral layer.

In a particular aspect of the present disclosure the cork particles (or the coated particles as defined herein) are comprised in the core member and in the peripheral layer, if a peripheral layer is present.

In a further aspect of the present disclosure the plurality of particles is comprised in the core member, and is substantially absent from the peripheral layer, if a peripheral layer is present.

In a particular aspect of the present disclosure the closure comprises a peripheral layer and the cork particles (or the coated particles as defined herein) are comprised in the peripheral layer. According to this aspect the cork particles (or the coated particles as defined herein) can be substantially absent from the core member.

In another embodiment, the closure does not comprise a peripheral layer, or does not comprise a separately extruded peripheral layer.

The plurality of coated particles can be comprised in an amount in the range of from 51 wt. % to 80 wt. %, or in an amount in the range of from 51 wt. % to 85 wt. %, more particularly in an amount in the range of from 52 wt. % to 75 wt. %, more particularly in an amount in the range of from 53 wt. % to 70 wt. %, more particularly in an amount in the range of from greater than 55 wt. % to 65 wt. %, or in an amount in the range of from 51 wt. % to 60 wt. %, more particularly in an amount in the range of from 51 wt. % to 55 wt. %, or in an amount in the range of from 55 wt. % to 60 wt. %, in each case based on the total weight of the closure.

The plurality of coated particles may be comprised in an amount in the range of from 52 wt. % to 100 wt. %, based on the total weight of the closure or based on the total weight of the composition disclosed herein.

When referring to the methods of the present disclosure, the weight percent amounts of the respective components (a), (b), (c), (d), (e) and (f) are based on the total weight of the composition formed in method step i.

According to an aspect of the closure comprising a peripheral layer, the plurality of coated particles may be comprised in the peripheral layer. However, the plurality of coated particles is preferably comprised in the core member, or in both the core member and the peripheral layer.

The inclusion of the plurality of coated particles can detrimentally affect the processability of the composition used for preparing a closure of the present invention, as well as potentially negatively affecting closure performance and properties. In order to reduce or eliminate any reduction in processability or performance, particularly due to the plurality of coated particles, the closure of the present invention may optionally comprise one or more processing aids. One or more processing aid may be comprised as an additive (f) or as a lubricant (d).

The one or more processing aids can be comprised in at least the closure component that comprises the plurality of coated particles. The preferred processing aid or processing aids are preferably selected from processing aids that are capable of modifying the processability of the formulation during formation of the closure, such as the melt processability of the formulation during formation of the closure by means of extrusion or moulding, particularly by means of extrusion. Process and processability modifications can be, for example, reduction in operating pressure and/or temperature, reduced friction between the composition and the forming equipment, improved cork dispersibility in the polymer matrix, improved cork wettability in the polymer matrix, improved torque release for flow improvement during extrusion, reduction or elimination of melt fracture during extrusion, reduced die build-up, improved speed and increased output, melt viscosity, melt flow rate, melt index, thermal stability, and/or surface properties. The processing aid or processing aids preferably assist in improving mechanical and performance properties of the closure, such as cell size and/or cell density of the plastic material, cell stability, homogeneous distribution of the plurality of particles throughout the polymer matrix, viscosity under conditions of varying shear and/or temperature, in particular increased shear and/or temperature, and the like. One particular advantage that has been observed with the processing aid or processing aids is that the density of the plastic material in the closure can be reduced compared to the density of plastic material in closures not comprising one or more processing aids according to the invention. The lower density of the plastic material contributes to achieving the objects of the invention, such as, for example, reduced plastic material content of the closure, elasticity, compressibility, and uniform distribution of the plurality of particles throughout the plastic material. As the processing aid or processing aids remain in the closure after its production, they are preferably suitable for use in food applications. It is preferred that one or more of the processing aid or processing aids is or are one or more of biodegradable, compostable, and thermoplastically processable. While it is possible that a single processing aid achieves all or most of the desired advantages, it is also possible that the processing aid comprises two or more processing aids. A suitable processing aid that can be used alone or in combination with one or more other processing aids can be, for example, a lubricant, a slip agent, a release agent, an antiblocking agent, or any agent or combination of agents that achieves one or more of the desired advantages. A lubricant as processing aid can be a lubricant (d) as disclosed herein, or the processing aids disclosed herein can be considered as lubricant (d) according to the present disclosure. It is possible that one or more of the processing aids and/or lubricants defined herein is comprised as both additive (f) and lubricant (d). Processing aids and lubricants may comprise the same components, which are defined functionally as being a processing aid or a lubricant. A processing aid is generally considered to have an effect on the processing and formation of the closure precursor and the closure in the presently disclosed method. A lubricant is generally considered to have a lubricating effect at the surface of the closure precursor and/or the closure.

Suitable optional processing aids that can be comprised in the closure according to the invention are preferably selected from the group consisting of fatty acids; fatty acid esters; fatty acid amides; waxes; wax esters; ester waxes; plasticisers; alcohols; glycerol esters; polyol esters; polyol partial esters; polyglycol esters; fatty acid polyglycol esters; fatty acid polyglycol ethers; fatty alcohol polyglycol ethers; metallic soaps; fluoropolymers; polyols; silicones; glycerol monostearate; fatty acid esters of polyols; high molecular weight poly esters; and combinations of any two or more thereof. A suitable processing aid could also be a polymer blend resulting in a large molecular weight dispersity. For example, a processing aid might comprise a combination of higher molecular weight polymer with lower molecular weight polymer such that a broad molecular weight distribution is achieved which provides a lower melt viscosity. The polymer or polymers in such a polymer blend may be the same as one or more of the thermoplastic polymer or polymers comprised in the plastic material that forms the body of the closure, in particular the core member of the closure, or the entire closure if no peripheral layer is comprised. In this case the amount of plastic material is increased by the amount of processing aid as disclosed herein. The polymer or polymers in such a polymer blend may also be different to at least one or more of the thermoplastic polymer or polymers comprised in the plastic material, such that the different polymer or polymer blend is comprised in the amount disclosed herein for the one or more processing aids. Such a polymer blend may be used as processing aid or processing aids, or may be used in combination with one or more of the other processing aids disclosed herein.

If two or more processing aids are employed, these preferably complement or supplement each other in terms of achieving the properties and advantages mentioned herein. For example, the processing aid can comprise at least one processing aid that reduces the melt viscosity of the plastic material, and at least one processing aid that aids the release of the plastic material from forming equipment, such as at least one processing aid that reduces the friction of the plastic material relative to at least one extruder surface during extrusion, and/or at least one processing aid that aids the release of the plastic material from a mould. The processing aid that reduces the friction of the plastic material relative to at least one extruder surface during extrusion may be the same as the processing aid that aids the release of the plastic material from a mould, or these may be different processing aids.

The one or more optional processing aids may be selected from processing aids as described herein. Any processing aid may be combined with any other processing aid, in order to achieve the objectives and advantages of the present invention. According to a preferred aspect of the closure according to the invention, at least one processing aid that reduces the melt viscosity of the plastic material is selected from the group consisting of fatty acids; fatty acid esters; fatty acid amides; waxes; wax esters; ester waxes; plasticisers; alcohols; glycerol esters; polyol esters; polyol partial esters; polyglycol esters; fatty acid polyglycol esters; fatty acid polyglycol ethers; fatty alcohol polyglycol ethers; glycerol monostearate; metallic soaps; and combinations of any two or more thereof; and at least one processing aid that reduces the friction of the plastic material relative to at least one extruder surface during extrusion is selected from the group consisting of fatty acids; fatty acid esters; fatty acid amides; fluoropolymers; polyols; silicones; glycerol esters; glycerol monostearate; polyol esters; polyol partial esters; polyglycol esters; fatty acid polyglycol esters; fatty acid polyglycol ethers; fatty alcohol polyglycol ethers; fatty acid esters of polyols; wax esters; ester waxes; metallic soaps; high molecular weight poly esters; and combinations of any two or more thereof.

It can be advantageous in the closure according to the invention that, at atmospheric pressure, at least one processing aid is solid or at least partially solid at temperatures up to 160° C., or at temperatures up to 150° C., or at temperatures up to 140° C., or at temperatures up to 130° C., or at temperatures up to 120° C. Optionally at least one processing aid comprises one or more fatty acid derivatives that are solid or at least partially solid at temperatures up to 160° C., or at temperatures up to 150° C., or at temperatures up to 140° C., or at temperatures up to 130° C., or at temperatures up to 120° C., at atmospheric pressure. This can be advantageous in terms of transport and storage of a processing aid, as well as in combining a processing aid with the plastic material and the plurality of particles, which can occur in a dry blending step, to form a homogeneous combination of processing aid with plastic material and plurality of particles. It is also preferred that the processing aid, which at least substantially remains in the closure after formation of the closure, can be solid at use temperatures of the closure, for example in order to avoid bleeding of the processing aid or oily feel of the closure. It can be advantageous for processing and/or combining if the processing aid is softened, melted, or partially melted at processing temperatures. Typical processing temperatures are indicated herein in connection with the method of forming a closure.

It can be advantageous in the closure according to the invention that, at atmospheric pressure, at least one processing aid is at least partially in liquid form, for example at least partially in the form of a melt, at temperatures above 50° C. Optionally at least one processing aid comprises one or more fatty acid derivatives that are at least partially in liquid form at temperatures above 50° C. at atmospheric pressure. This could allow lower processing temperatures, while substantially not leading to bleeding of the processing aid from a finished closure or oily feel of a closure.

A processing aid suitable for the closure according to the invention, can, for example, comprise one or more processing aids selected from the group consisting of fatty acid derivatives derived from a saturated or unsaturated fatty acid having from 12 to 45 carbon atoms, preferably from 25 to 38 carbon atoms; modified fatty acid derivatives derived from a modified, saturated or unsaturated fatty acid having from 12 to 45 carbon atoms, preferably from 25 to 38 carbon atoms; natural waxes; synthetic waxes; plasticizers; and combinations of two or more thereof. By way of example, the processing aid can comprise one or more fatty acid derivatives and/or modified fatty acid derivatives derived from a fatty acid selected from the group consisting of lauric acid, palmitic acid, arachidic acid, behenic acid, stearic acid, 12-hydroxystearic acid, oleic acid, erucic acid, recinolic acid, adipic acid, sebacic acid, myristoleic acid, palmitoleic acid, sapienic acid, elaidic acid, vaccenic acid, linoleic acid, linoelaidic acid, alpha-linolenic acid, gamma-linolenic acid, dihomo-gamma-linolenic acid, arachidonic acid, eicosapentaenoic acid, docosahexaenoic acid, caprylic acid, capric acid, myristic acid, lignoceric acid, cerotic acid, tridecylic acid, pentadecylic acid, margaric acid, nonadecylic acid, heneicosylic acid, tricosylic acid, pentacosylic acid, heptacosylic acid, montanic acid, nonocosylic acid, melissic acid, henatriacontylic acid, lacceroic acid, psyllic acid, geddic acid, ceroplastic acid, hexatriacontylic acid, heptatriacontanoic acid, octatriacontanoic acid, stearidonic acid, docosatetraenoic acid, palmitoleic acid, vaccenic acid, paullinic acid, elaidic acid, gondoic acid, nervonic acid, mead acid, modified fatty acids derived from one or more of the fatty acids comprised in the group, and mixtures of any two or more of the fatty acids and modified fatty acids comprised in the group.

It can be advantageous for the closure according to the invention if the processing aid comprises one or more processing aids selected from the group consisting of erucamides; fatty acids; waxes; stearamides; glycerol monostearate; high-mono glycerol monostearate; glycerol ester; ethylene-bis-stearamide; calcium stearate; erucic acid amide; oleic acid amide; stearic acid amide; trimellitate esters; adipate esters; sebacate esters; azelaic esters; diesters; polymer plasticizers; and any combination of two or more thereof.

The processing aid can, for example, have one or more of the following properties:
a dropping point measured according to ASTM D2265 in the range of from 50° C. to 160° C., or in the range of from 50° C. to 150° C., or in the range of from 50° C. to 140° C., or in the range of from 50° C. to 130° C., in the range of from 50° C. to 120° C.;
a specific gravity in the range of from 0.900 to 1.300, measured according to ASTM D1298-12b, relative to water at 4° C.

It can further be advantageous for the method and the closure according to the present disclosure if a processing aid comprising one or more waxes is present as additive. Suitable waxes may be of natural and/or synthetic origin, and may be selected from those disclosed herein. Preferred waxes of synthetic origin are polyolefin waxes, for example polyethylene waxes, polypropylene waxes, and mixtures thereof with each other or with other processing aids or lubricants mentioned herein. Polyethylene waxes are particularly preferred.

In the closure according to the invention, the components (a), (b) and (c) are preferably comprised in the weight percent amounts, based on the total weight of the closure. In particular, the components (a), (b), and (c) may be comprised in the following weight percent amounts, based on the total weight of the closure:
(a) 55 to 65 wt. % of the plurality of particles (dry weight);
(b) 24.9 to 39.9 wt. %, in particular 24.9 to 39 wt. %, in particular 25 to 38 wt. % of the plastic material;
(c) 0.1 to 4 wt. %, in particular 2 to 2.5 wt. % of a blowing agent selected from expandable microspheres.

In the closure according to the invention, the components (a), (b) and (c) are particularly comprised in the weight percent amounts, based on the total weight of the closure. In particular, the components (a), (b), and (c) may be comprised in the following weight percent amounts, based on the total weight of the closure:
(a) 65 to 85 wt. % of the plurality of particles (dry weight);
(b) 14.9 to 29.9 wt. %, in particular 14.9 to 29 wt. %, of the plastic material;
(c) 0.1 to 4 wt. %, in particular 2 to 2.5 wt. % of a blowing agent selected from expandable microspheres.

The closure according to the invention preferably does not comprise a binder; and/or the closure preferably does not comprise a crosslinking agent; and/or the plastic material is preferably not crosslinked by means of a crosslinking agent. Preferably the closure does not comprise a binder and does not comprise a crosslinking agent. The known closures comprising larger quantities, for example greater than about 50 wt. % based on the total weight of the closure, of cork powder or cork particles are generally agglomerates, in which the binder is typically a polyurethane or polyacrylate glue formed by means of in situ reactive polymerization of corresponding monomers and/or prepolymers, such as oligomers. These binders or glues are not thermoplastically processable, nor are they thermoplastic polymers or plastic materials according to the definition of the present invention. Known closures often comprise one or more crosslinking agents, also referred to as crosslinkers, in order to improve certain properties. Not only binders, or their monomers, but also crosslinkers, can give rise to food safety concerns. In addition, typically neither binders nor crosslinked polymers are either biodegradable or thermoplastically processable. It is thus generally not possible to recycle, biodegrade or compost a closure comprising binders or crosslinkers or crosslinked polymers. However, while it is preferred that the closure according to the invention does not comprise crosslinker, it is possible that the closure according to the invention comprises a small amount of crosslinker, for example in an amount sufficient to modify in a desired way the rheology of the composition used to prepare the closure, in particular the rheology of the thermoplastic component thereof, and/or to modify one or more other properties of the closure and/or of the composition used to prepare the closure, in particular of the thermoplastic component thereof, such as viscosity, elasticity, and/or hardness. The amount of crosslinker, if present, should be small enough so that the thermoplastic processability of the closure is not affected, or at least is substantially not affected, in particular the recyclability of the closure is not affected, or at least is substantially not affected.

In one embodiment of the present disclosure, the closure is produced by a process comprising at least a process step of extrusion. For closures comprising a core member and at least one peripheral layer, this allows to achieve integral bonded interconnection between the at least one peripheral layer and the core member, since the at least one peripheral layer is formed about the core member in a manner which assures intimate bonded engagement.

According to a particular aspect of the closure, composition and methods according to the present disclosure, the temperature of the composition, the closure, and/or any method step, particularly during formation of a closure or a composition, preferably does not exceed 200° C., preferably is maintained in the range of from about 120° C. to about 170° C., or in the range of from about 125° C. to about 170° C., or in the range of from about 130° C. to about 165° C., or in the range of from about 135° C. to about 165° C., or in the range of from about 140° C. to about 160° C. An extrusion temperature in the disclosed range is particularly maintained during extrusion of a material comprising cork particles. If the temperature exceeds this range, in particular the upper limit, there is a risk of discoloration and/or degradation of the cork particles, as well as burnt aromas which could affect a food product coming into contact with the closure. The lower limit is generally determined by the temperature at which the composition can be suitably processed, for example in the form of a melt.

It has also been found that further additional additives (f) may be incorporated into the closure of the present disclosure. For a closure according to the disclosure comprising a core member and at least one peripheral layer, the additives may be incorporated into either the core member and/or the at least one peripheral layer of the closure in order to provide further enhancements and desirable performance characteristics. These additional additives can include, for example, colouring agents, such as pigments (e), antimicrobial agents, antibacterial compounds, and/or oxygen scavenging materials. Suitable additives are known to the person skilled in the art. The antimicrobial and antibacterial additives can be incorporated into the closure to impart an additional degree of confidence that in the presence of a liquid the potential for microbial or bacterial growth is extremely remote. These additives preferably have a long-term time release ability and further increase the shelf life without further treatments by those involved with the bottling of wine. Furthermore, it is possible for the cells of the closure to be substantially filled with a non-oxidizing gas, in order to further reduce oxygen ingress into the container. Ways of achieving this are known in the prior art. It is possible for one or more fillers (f), preferably particulate fillers, preferably particulate fillers having a particle size less than 0.2 mm, to be incorporated into the closure according to the invention, preferably by being incorporated into the composition for preparing the closure according to the invention. Preferred fillers are inorganic fillers such as mineral fillers, which may be selected from talc, chalk, silica, mica, alumina, clay, calcium carbonate, magnesium carbonate, calcium aluminate, titanium dioxide, vermiculite, perlite, and combinations of one or more thereof. It can be advantageous to include one or more fillers, for example to modify the rheology or other properties of the closure and/or of the composition, Depending upon the sealing process to be employed for inserting the closure of the present disclosure in a desired bottle, additives, such as slip additives, lubricating agents, and sealing compounds may be incorporated into a peripheral layer if the closure of the present disclosure comprises a core member and at least one peripheral layer, for example to provide lubrication of the closure during the insertion process. In addition, other additives typically employed in the bottling industry may be incorporated into the closure of the present disclosure for improving the sealing engagement of the closure with the bottle as well as reducing the extraction forces necessary to remove the closure from the bottle for opening the bottle.

The closures according to the present disclosure may comprise decorative indicia such as letters, symbols, colors, graphics, and wood tones printed on at least one peripheral surface and/or one or both of the terminating surfaces forming the opposed ends of said closure or stopper. If present, at least one peripheral layer can be in overlying relationship with the indicia printed on the peripheral surface. Printing of these indicia can be performed in-line, during production of the closure or in a separate step after the closure has been manufactured. Accordingly, the closure of the present disclosure may comprise a decorative effect on at least one of the peripheral surface, in particular substantially cylindrical surface and one or both terminating ends, in particular substantially flat terminating surfaces forming the opposed ends of said closure or stopper. Additionally, indicia comprising ink that is invisible under normal lighting and/or temperature conditions can be comprised in the closure. Normal lighting conditions in the context of this disclosure means light from a light source having a spectrum that substantially comprises the visible range of the spectrum. Normal temperature conditions in the context of this disclosure means a temperature from 10° C. to 35° C. These indicia can, for example, be useful as registration marks.

The closure according to the present disclosure can further comprise a lubricant layer on at least one of its surfaces, in particular on its peripheral surface. A lubricant surface layer of this type may comprise a lubricant (d) as defined herein. It is also possible that a lubricant surface layer comprises a different type of lubricant to those defined as lubricant (d) herein. The lubricant layer can comprise, for example, one or more of a silicone, a wax, a paraffin, and a Teflon® layer, or any type of layer known for natural cork or synthetic closures. Such a layer can help for example with insertion of the closure into a container and be formed by any means known and appearing suitable. If a silicone, wax and/or paraffin layer is present, this can be formed, for example, by extrusion and/or by tumbling. If a lubricant (d) is comprised, this may have a function as one or both of processing aid and surface lubricant.

The closure according to the present disclosure can further comprise a coating on at least one of its surfaces, in particular on its peripheral surface, or on substantially the entire closure surface, including the peripheral surface and the terminating surfaces. The coating layer can comprise, for example, a vinyl acrylate copolymer, which can be applied for example in the form of a solution or an emulsion with one or more of an organic and/or an aqueous solvent, for example one or more of a paraffin and water. An example of a suitable coating agent for forming a coating is Hydrotopcork, available from Mikroquimica. The coating can be applied by any means known to and appearing suitable to the skilled person, such as any one or more of spraying, immersion coating or tumbling, any of which may be followed by a step of drying the coating by any suitable means, such as air drying, blowing, or heating. Preferably the coating is applied by means of tumbling a closure with the coating mixture, in particular with a coating emulsion. Heat may optionally be applied before, during or after the coating step. The coating step, for example by means of tumbling, may be carried out once or it may be carried out more than once, for example two times, three times, or more than three times, using the same or a different coating, particularly the same coating, depending on the type of coating, the application form of the coating material, and the desired coating thickness. A coating of this type typically has a thickness of less than 5 µm, preferably less than 4 µm, particularly less than 3 µm, and can be as thin as less than 2 µm or less than 1 µm. Whilst a minimum thickness of at least 0.1 µm, or 0.2 µm, 0.3 µm, 0.4 µm, or 0.5 µm is typically achieved, it is possible, due to both the application method and subsequent processing of the closure, that the coating does not cover the entirety of the closure surface, but instead is absent from some areas of the surface, for example due to lack of full coverage during application, or due to rubbing off after application. It is also possible that the coating has different thicknesses in different areas of the closure surface. For example, if the closure surface has a degree of surface roughness, with depressions and protuberances, the coating can form a thicker layer in the depressions and a thinner layer in the protuberances. The thicker and thinner layers are defined by thickness relative to each other, but may also be defined respectively as being in the higher 50% and lower 50% of the numerical ranges for thickness disclosed herein. One advantage of a coating of this type is that it can improve smoothness of a rough closure surface. Another effect of a coating can be to improve resistance of the closure surface to water and/or aqueous and/or alcoholic formulations, or to reduce leakage from a bottle sealed with a closure according to the invention. A further effect can be to assist with insertion and removal of a closure in an aperture such as a bottle neck.

By employing the materials and methods disclosed herein, a highly effective, single component or multi-layer closure can be attained which is able to provide at least one, particularly more than one, particularly almost all or even all properties suitable for a wine bottle closure.

The closure according to the present disclosure has advantageous properties making it particularly suitable for packaging and in particular for use as a closure for wine bottles. If the product is packaged under inert conditions, the closure advantageously has an oxygen ingress rate measured according to ASTM F1307 of less than about 5 mg oxygen per container in the first 100 days after closing the container. The oxygen ingress rate is advantageously selected from the group consisting of less than about 3 mg oxygen, less than about 2 mg oxygen, less than about 1 mg oxygen, less than about 0.8 mg oxygen, less than about 0.5 mg oxygen, less than about 0.25 mg oxygen, less than about 0.2 mg oxygen and less than about 0.1 mg oxygen, per container in the first 100 days after closing the container. The closure according to the present disclosure or produced according to the methods of the present disclosure achieves at least a comparable performance to known closures from alternative materials such as polymers with respect to use as a closure for wine bottles, as measured by, for example, at least one of, particularly more than one of, particularly all of the properties of oxygen transfer rate, extraction force, and leakage. In addition, the closure according to the present disclosure or produced according to the methods of the present disclosure has an appearance resembling that of natural cork and can in some aspects preferably be branded in the same way as a natural cork closure. Furthermore, the tactile properties of the closure according to the present disclosure are very similar to a closure from natural cork.

The closure according to the invention preferably has an oxygen transfer rate measured according to ASTM F1307 in 100% oxygen of less than 0.05 cc/day, preferably in the range of from 0.0001 cc/day to 0.05 cc/day, or from about 0.0001 cc/day/closure to about 0.1000 cc/day/closure, or from about 0.0005 cc/day/closure to about 0.050 cc/day/closure, more particularly in the range of from about 0.001 cc/day/closure to about 0.04 cc/day/closure, more particularly in the range of from about 0.002 cc/day/closure to about 0.03 cc/day/closure, more particularly in the range of from about 0.002 cc/day/closure to about 0.02 cc/day/closure. The unit cc/day/closure is the same as the unit cc/day, where this relates to a closure.

The closure according to the present disclosure preferably has a water content of less than 3 wt. %, preferably less than 2.5 wt. %, particularly less than 2.0 wt. %, preferably less than 1.5 wt. %, preferably less than 1 wt. %, based on the weight of the closure. The water content of the closure is measured by the ISO15512:2016 method defined herein.

The details and properties of all components of the inventive closure also apply to the compositions and methods according to the present disclosure as described hereinbelow. References to a closure of the invention or a closure of the present disclosure are intended to mean closures as defined herein, as well as closures prepared by a method as defined herein.

Advantageously, the closure according to the present disclosure has an extraction force determined according to the herein described test method of not more than about 445 N (100 lb), particularly of not more than about 440 N, particularly of not more than about 430 N, particularly of not more than about 420 N, particularly of not more than about 410 N, preferably not more than about 400 N, particularly of not more than about 390 N, particularly of not more than about 380 N, particularly of not more than about 370 N, particularly of not more than about 360 N, particularly of not more than about 350 N, particularly of not more than about 340 N, particularly of not more than about 330 N, more particularly of not more than about 320 N, more particularly of not more than about 310 N, more particularly of not more than about 300 N, whereby extraction forces in the range of from about 200 N to about 400 N, particularly in the range of from about 210 N to about 380 N, particularly in the range of from about 220 N to about 350 N, particularly in the range of from about 230 N to about 300 N are advantageously achieved. The extraction force describes the force needed to remove a closure from a container, in particular from a bottle, under standardized conditions. A lower extraction force relates to a greater ease of extraction of the closure. An extraction force in the range of from about 150 N to about 445 N is generally considered acceptable for a wine bottle closure. The presently disclosed closures achieve extraction force within the range considered acceptable for wine bottle closures.

The plastic material, thermoplastic polymers, plurality of particles, cork, lubricants, processing aids, additives, fillers, pigments, and blowing agents, and all details relating thereto, including preferred embodiments and aspects, are as defined herein with respect to the closure, the composition for forming a closure, the method for forming a composition, and the method for forming a closure.

The present disclosure further relates to a method for producing a closure according to the present disclosure. All features that heretofore have been described with respect to the closure of the present disclosure likewise optionally also apply to the method of the present disclosure.

The present disclosure discloses a method for manufacturing a closure for a product-retaining container constructed for being inserted and securely retained in a portal-forming neck of said container, said method comprising at least the following method steps:

i. intimately combining the following components, to form a composition:
  (a) 51 to 80 wt. %, or 51 to 85 wt. %, particularly 51 wt. % to 75 wt. %, particularly 51 wt. % to 70 wt. % (dry weight) of a plurality of coated particles, said coated particles comprising (1) a core comprising cork material and (2) at least one outer shell comprising a first plastic material, said first plastic material comprising one or more thermoplastic polymers;
  (b) 12 to 49 wt. %, particularly 15 wt. % to 47 wt. %, particularly 18 wt. % to 45 wt. %, particularly 20 wt.

% to 42 wt. %, particularly 23 wt. % to 40 wt. % of a second plastic material comprising one or more thermoplastic polymers;
(c) optionally, 0 to 10 wt. %, particularly 2 wt. % to 8 wt. %, particularly 2 wt. % to 6 wt. % of one or more blowing agents;
(d) optionally, 0 to 15 wt. %, particularly 1 wt. % to 13 wt. %, particularly 2 wt. % to 10 wt. %, particularly 3 wt. % to 9 wt. %, particularly 3.5 wt. % to 8 wt. % of one or more lubricants;
(e) optionally, 0 to 2 wt. %, particularly 0 to 1.5 wt. %, or 0.5 to 1.5 wt. %, of one or more pigments; and
(f) optionally, 0 to 10 wt. % of one or more additives and/or fillers;
ii. heating the composition obtained in step i. to form a melt;
iii. forming, by means of extrusion or molding, a closure precursor from the melt obtained in step ii.;
iv. optionally cutting and/or finishing the closure precursor to form the closure.

The present disclosure further discloses a method for manufacturing a closure for a product-retaining container constructed for being inserted and securely retained in a portal-forming neck of said container, said method comprising at least the following method steps:
i. intimately combining the following components, to form a composition:
(a) 52 to 100 wt. %, particularly 52 wt. % to 98 wt. %, particularly 52 wt. % to 95 wt. %, particularly 52 wt. % to 90 wt. %, (dry weight) of a plurality of coated particles, said coated particles comprising (1) a core comprising cork material and (2) at least one outer shell comprising a first plastic material, said first plastic material comprising one or more thermoplastic polymers;
(b) 0 to 48 wt. %, particularly 2 wt. % to 48 wt. %, particularly 5 wt. % to 48 wt. %, particularly 10 wt. % to 48 wt. %, of a second plastic material comprising one or more thermoplastic polymers;
(c) optionally, 0 to 10 wt. %, particularly 2 wt. % to 8 wt. %, particularly 2 wt. % to 6 wt. % of one or more blowing agents;
(d) optionally, 0 to 15 wt. %, particularly 1 wt. % to 13 wt. %, particularly 2 wt. % to 10 wt. %, particularly 3 wt. % to 9 wt. %, particularly 3.5 wt. % to 8 wt. % of one or more lubricants;
(e) optionally, 0 to 2 wt. %, particularly 0 to 1.5 wt. %, or 0.5 to 1.5 wt. %, of one or more pigments; and
(f) optionally, 0 to 10 wt. % of one or more additives and/or fillers;
ii. heating the composition obtained in step i. to form a melt;
iii. forming, by means of extrusion or molding, a closure precursor from the melt obtained in step ii.;
iv. optionally cutting and/or finishing the closure precursor to form the closure.

According to this method, only the first plastic material is comprised and the second plastic material (b) is optional. According to this aspect, the closure can be formed from the plurality of coated particles without further addition of plastic material, or without addition of second plastic material. This can simplify the method.

The plastic material, thermoplastic polymers, plurality of particles (a), and the optional blowing agents (c), lubricants (d), pigments (e), fillers and additives (f), as well as, for example, processing aids, and all details relating thereto, including amounts, ranges, form, particle sizes, definitions, preferred embodiments and aspects, as well as details relating to method steps, are as defined herein with respect to the closure, the composition for forming a closure, the method for forming a composition, and the method for forming a closure. The closure may be a cylindrical closure, comprising a peripheral surface and two substantially flat terminating end surfaces, such as a closure for a still wine bottle. Alternatively, the closure may be in the form of a closure for a sparkling wine bottle.

The combination in method step i can be by any means known and appearing suitable to the skilled person. Exemplary combination methods are blending, mixing, dispersing, and the like. The combination can take place in any suitable equipment for combining solids, for example particulate solids, such as, for example, blending equipment; or any suitable equipment for combining solids and/or liquids with a molten plastic material, such as for example an extruder. The conditions of method step i, such as temperature, pressure, and the like are selected based on the components and their properties, in order to optimize the combination, in particular to provide as homogeneous a composition as possible.

The details of the plurality of coated particles (a) are as disclosed herein.

According to a preferred aspect of the method disclosed herein, the core of said coated particles is a cork particle having a particle size distribution $D_{50}$ measured by means of mechanical sieving according to ISO ICS 19.120 and in particular ISO 2591-1:1988, in the range of from 0.25 millimetres to 5 millimetres, in particular from 0.5 millimetres to 2 millimetres. This represents the particle size distribution $D_{50}$ of the cork particles in the plurality of coated particles as provided to the method of the present disclosure. Preferred ranges are as disclosed herein.

According to a preferred aspect, the plurality of coated particles comprises cork particles, in particular cork particles having an average particle size distribution $D_{50}$ as defined herein. The cork particles may comprise two types of particle size, referred to herein respectively as larger and smaller particles, each of which is defined by a respective particle size distribution $D_{50}$ as defined herein. The method of the present disclosure defines a preferred aspect, wherein the core of said coated particles is a cork particle and the cork particles comprise a mixture of at least:

from 5 wt. % to 100 wt. %, particularly in a range of from 10 wt. % to 95 wt. %, particularly in a range of from 20 wt. % to 90 wt. %, particularly in a range of from 30 wt. % to 80 wt. %, particularly in a range of from 40 wt. % to 75 wt. %, particularly in a range of from 50 wt. % to 75 wt. %, particularly in a range of from 55 wt. % to 75 wt. %, particularly in a range of from 60 wt. % to 70 wt. %, based on the total weight of the cork particles, of smaller cork particles having a particle size distribution $D_{50}$ measured by means of mechanical sieving according to ISO ICS 19.120 and in particular ISO 2591-1:1988, in the range of from 1.0 mm or less, for example from 0.1 mm to 1.0 mm or from 0.1 to less than 1.0 mm, or from 0.2 to 1.0 mm or from 0.2 to less than 1.0 mm, or from 0.3 to 1.0 mm or from 0.3 to less than 1.0 mm, or from 0.4 to 1.0 mm or from 0.4 to less than 1.0 mm, more particularly from 0.5 to 1.0 mm or from 0.5 to less than 1.0 mm; and from 0 wt. % to 95 wt. %, particularly in a range of from 5 wt. % to 90 wt. %, particularly in a range of from 10 wt. % to 80 wt. %, particularly in a range of from 20 wt. % to 70 wt. %, particularly in a range of from 25 wt. % to 60 wt. %, particularly in a range of from 25 wt. % to 50 wt. %, particularly in a range of from 25 wt. % to 45 wt. %, particularly in a range of from 30 wt. % to 40 wt. %, based on the total weight of the cork particles of larger cork particles having a particle size distribution $D_{50}$ measured by means of mechanical sieving according to ISO ICS 19.120 and in particular ISO 2591-1:1988, in the range of from 1.0 mm to 3.0 mm, or from greater than 1.0 mm to 3.0 mm, or from 1.0 mm to 2.5 mm, or from greater than 1.0 mm to 2.5 mm, or from 1.0 mm to 2.0 mm, or from greater than 1.0 mm to 2.0 mm.

The lower limit for the weight percent amount of plurality of particles (a) in the closure is 51 wt. % based on the weight of the closure or 52 wt. % based on the weight of the closure. A minimum amount of 51 wt. % cork, based on the weight of the closure, is required for a closure to be referred to as a cork closure. An upper limit of 85 wt. %, based on the weight of the closure, represents the currently achievable amount of cork particles in a closure without detriment, or at least significant detriment, to the properties of the closure, in particular cohesion between the various components, such that the closure might not have the requisite mechanical or performance properties, for example might crumble or break apart in use. An upper limit of 100% of coated particles, based on the weight of the closure, is possible and can be selected depending on the weight ratio of cork to first plastic material in the coated particles and the desired relative amounts of cork and plastic material in the closure obtained by the disclosed method. The weight percent amount of coated particles (a) provided to method step (i) or present in the composition is preferably selected in order to achieve at least 51 wt. % of cork in the finished closure. Preferably the cork material in the plurality of coated particles is cork, in particular cork particles, more particularly cork particles with a particle size or average particle size $D_{50}$ in the range or the ranges disclosed herein.

The plurality of particles is preferably a plurality of clean particles, as defined herein. It is conceivable to carry out at least one step of washing the plurality of particles, in particular washing the cork material in the plurality of coated particles, in particular washing the cork particles which form the core of the coated particles, in particular to remove all or substantially all haloanisoles, in particular TCA, but also optionally TBA, TeCA and/or PCA, as disclosed herein. A closure produced by a method disclosed herein preferably has a content of releasable trichloroanisole of less than 2 ng/L, preferably less than 0.5 ng/L, preferably less than 0.3 ng/L. In order that the closure has a content of releasable trichloroanisole as defined herein, it is advantageous that the coated particles comprising cork material, in particular wherein the core of said coated particles is a cork particle and wherein said cork particles have a content of releasable trichloroanisole measured according to the test method defined herein of less than 6 ng/L, preferably less than 5 ng/L, preferably less than 4 ng/L, preferably less than 3 ng/L, preferably less than 2 ng/L, preferably less than 1 ng/L. Preferably the cork material in the coated particles has a content of releasable trichloroanisole measured according to the test method defined herein of less than 6 ng/L, preferably less than 5 ng/L, preferably less than 4 ng/L, preferably less than 3 ng/L, preferably less than 2 ng/L, preferably less than 1 ng/L.

According to one aspect of the method of the present disclosure, in step (i) the plurality of coated particles comprising cork material has a water content of less than 3 wt. %. In particular the core of said coated particles is a cork particle having a water content of less than 3 wt. %, in particular less than 2 wt. %, less than 1.5 wt. %., or less than 1 wt. %. In particular, the moisture content of the cork material comprised in the plurality of coated particles (a) provided to method step (i) is preferably less than 3 wt. % based on the weight of the cork material, particularly in the range of from 0 to 3 wt. %, or 0 to 2 wt. %, or 0 to 1.5 wt. %, or 0 to 1 wt. %. This water content may be achieved, for example, by means of a pre-drying step prior to method step (i), in particular prior to formation of the coated particles. According to this aspect, in a method step which precedes method step (i), the cork material comprised in the coated particles, in particular the cork comprised in the plurality of coated particles, is dried to a water content of less than 3 wt. %. The drying is preferably by conventional means, in particular by any means known and appearing suitable to the skilled person. A preferred drying means is by heating, for example by infrared heating, or infrared drying. The drying temperature is maintained below about 200° C., in particular below about 170° C. In this way it is possible to reduce the water content from about 5 to 8 wt. % to less than 3 wt. %, preferably without adverse effects on the cork, such as discoloration, scorching or burning. The cork material may be dried before being formed into cork particles, or the cork material may be dried in the form of particles, in particular in the form of particles having an average particle diameter in the range or ranges disclosed herein, or in the form of larger particles which are subsequently comminuted to provide cork particles having an average particle diameter in the range or ranges disclosed herein.

It is possible according to the presently disclosed method that the melt obtained in method step (ii) is degassed prior to forming the closure precursor, thereby reducing the water content of the plurality of coated particles to a water content of less than 3 wt. %. Degassing not only contributes to reducing the water content, it can also contribute to reducing or eliminating organoleptics, such as those causing odours and/or impairing flavour, in particular volatile organoleptic substances.

In a preferred aspect of the method of the present disclosure the plurality of coated particles in the closure precursor, in particular the cork material, more particularly the cork particles in the closure precursor, or the cork particles in the closure, has a water content of less than 2 wt. %, preferably less than 1.5 wt. %. This water content may be achieved by pre-drying the plurality of coated particles, for example by pre-drying the cork, before forming the coated particles and providing the coated particles to the method, or by degassing during the method, or by a combination of pre-drying the plurality of particles and/or the cork material, and degassing the melt.

The degassing may be effected by atmospheric venting and/or vacuum degassing. If the second plastic material (b) is provided to the method in the form of particles with $D_{50}$ less than 1000 microns, as disclosed herein, at least one degassing of the composition formed in method step (i) is preferably by means of atmospheric venting. Whilst atmospheric venting of the melt is possible, it is preferred that degassing of any melt as disclosed herein is effected by means of vacuum degassing at any one or more points during the method, for example before, during or after any one or more of method steps (i), (ii) and (iii) and any other method steps disclosed herein. The vacuum degassing is preferably effected by subjecting the melt to a vacuum, said vacuum optionally being applied via at least one degassing port in an extrusion line prior to the melt exiting the extrusion die. Degassing may be carried out at more than one point during the method. For example, if the second plastic material is provided in the form of particles with $D_{50}$ of 1000 microns or lower, there may be a first degassing, in particular by means of atmospheric venting, before melting the composition, optionally followed by a second degassing of the melt by applying a first vacuum to the melt, optionally followed by one or more further degassing steps of the melt by applying a further vacuum to the melt one or more further times, which further vacuum may, for example, be a higher vacuum, such as a higher vacuum than the previous vacuum, such that gas, water vapour and the like which is or are still present in the melt after the application of the first or subsequent vacuum can be removed by the further degassing step or steps. Degassing of the composition comprising particles by applying vacuum could lead to loss or partial loss of any components which are in particulate form, which could be aspirated by the vacuum. For this reason atmospheric venting is preferred as degassing method for any composition with components in unmolten, particulate form. If the second plastic material is provided in the form of a melt to method step (i), the same degassing procedure may be followed, and/or the degassing may be by means of application of a vacuum in one or more vacuum degassing steps, which may take place at the same or increasing vacuum as described herein, and possible without a step of degassing by atmospheric venting.

According to a particular aspect of the present disclosure, the particles comprising cork have a substantially isotropic shape, in particular a substantially spherical shape. Anisotropic particles, which may be defined as having a length and a width, whereby the length is greater than the width, are expected to orient themselves in the flow direction during movement of the molten composition, for example during extrusion. Particles can thus become more visible on the closure surface because the length, or the long axis, of the particle is parallel to the surface of the closure. This can be disadvantageous, for example if a uniform appearance is desired. Isotropic, in particular spherical, particles do not have this disadvantage.

An advantage of the present disclosure is that, in contrast to moulding processes which are typical for cork-comprising closures such as agglomerate closures, little or no compacting or compression of the composition is necessary in order for the composition components, in particular the cork and the plastic material, to adhere to each other. According to a particular aspect of the method of the present disclosure, the relative increase in density of the particles comprising cork from step i. (starting material) to step iii. (precursor product, closure precursor) is not more than 150%, in particular not more than 100%. The "density of the particles" in this context refers to a compression of the cork particles which increases the cell density within each respectively compressed cork particle. According to a preferred aspect of the method, the closure and the composition of the present disclosure, the core of said coated particles is a cork particle and the density of said cork particles in the closure precursor or in the closure is in the range of 50 to 100 g/l. This contributes to achieving an overall closure density in the preferred range. The overall closure density can contribute to desirable closure parameters such as oxygen transfer rate, oxygen ingress, compressibility, leakage, and ability to reinsert a closure after opening a bottle. The relative lack of compacting or compression of the present disclosure thus represents an advantage over more highly compressed closures of the art, such as moulded closures, in particular agglomerate closures.

According to a particularly preferred aspect of the method of the present disclosure, the cork material comprised in the plurality of coated particles (a) is a plurality of cork particles. A cork particle or cork particles preferably forms the core of a coated particle according to the present disclosure. The cork particles may be pre-treated, for example by washing, drying, and the like as disclosed herein. The cork particles are pre-coated with the first plastic material as defined herein, prior to method step (i).

According to a preferred aspect of the method disclosed herein, the core of said plurality of particles is substantially encapsulated by said at least one outer shell comprising said first plastic material. Whilst it is possible that portions of the core are not covered by the at least one outer shell, or not covered to a thickness as disclosed herein, more preferably the core of said plurality of particles is entirely encapsulated by said at least one outer shell comprising said first plastic material, preferably to a thickness as disclosed herein.

The outer shell of said coated particles preferably has a thickness in the range of from 5 to 100 microns, in particular from 10 to 50 microns. The thickness of the outer shell may vary, but even if there is some variation, preferably the average thickness is in the disclosed range. Variation may be due to the core-forming cork particle not being spherical, for example, whilst the outer shell is substantially spherical, and/or due to uneven coverage by the first plastic material, which could in turn be due to processing, handling and/or storage factors such as chipping or wearing away of the outer shell in one or more areas, or due to uneven coverage during the coating of the cork particle.

The details of the first and second plastic materials are as disclosed herein. The lower limit for the total weight percent amount of plastic material is preferably 12 wt. % based on the weight of the closure. According to the present disclosure, this is believed to be the smallest amount of plastic material which is capable of binding cork particles to form a closure which has suitable cohesion and mechanical and performance properties in order to be used as a closure. The preferred upper limit for the total weight percent amount of plastic material is 49 wt. % based on the weight of the closure. A minimum amount of 51 wt. % cork in a closure represents the lower limit at which the closure may be referred to as a cork closure. The closure of the present disclosure preferably comprises at least 51 wt. % cork. The amount of first plastic material which coats the cork material, and the amount of second plastic material, if a second plastic material is used, can be modified and/or selected in order to achieve a preferred weight percent ratio of cork to plastic material in the composition and in the closure of the present disclosure. The weight percent ratio of cork material, in particular cork particles, to first plastic material is as defined in the clauses defined herein, in particular from 60 to 90 wt. % cork and from 10 to 40 wt. % first plastic material. Further preferred amounts are from 60 to 85 wt. %, or from 60 to 80 wt. %, or from 65 to 75 wt. % cork; and from 15 to 40 wt. %, or from 20 to 40 wt. %, or from 25 to 35 wt. % first plastic material. Particularly preferred cork: first plastic material weight percent ratios in the coated particles (a) are any one or more or all selected from 75:25, 74:26, 73:27, 72:28, 71:29, 70:30, 69:31, 68:32, 67:33, 66:34 and 65:35.

The method can be continuous or discontinuous. In a continuous method, the combining in method step i. can take place by means of any one or more of blending, dry blending, mixing, melting, pultrusion, extrusion, compounding, or any other method known to the skilled person and appearing suitable. Preferably, method step i. of any method defined herein involves applying shear to the components, preferably applying shear while heating. Application of shear while heating is a preferred means of combining the components in method step (i) where the second plastic material (b) is provided in the form of a melt as disclosed herein. Application of shear without heating is a preferred means of combining the components in method step (i) where the plastic material (b) is provided in particulate form as disclosed herein, in particular with average particle size $D_{50}$ as defined herein. The composition resulting from method step i., which can be, for example, in the form of a dry blend or a melt, is then fed continuously to a moulding device or an extrusion device. The heating in method step ii. can be carried out at a time selected from during method step i.; after method step i. and before method step iii.; during method step iii.; or any combination of two or more thereof. In a preferred aspect of method steps i. and ii., which may be combined with any other aspect of the method according to the invention or any method step according to the invention, method step i. is carried out at atmospheric pressure or at a pressure below atmospheric pressure or at a pressure above atmospheric pressure, and method step ii. is carried out at a pressure above atmospheric pressure or at a pressure below atmospheric pressure. If second plastic material (b) is provided to method step i. in particulate form with a $D_{50}$ of less than 1000 µm, method step i. is preferably carried out at atmospheric pressure or greater than atmospheric pressure, preferably at a pressure as disclosed herein. If second plastic material (b) is provided to method step i. in the form of a melt, method step i. may be carried out at atmospheric pressure, or at a pressure greater than atmospheric pressure, or at a pressure lower than atmospheric pressure, for example under a vacuum or under a partial vacuum. Preferably heating is carried out at least during method step iii. In a discontinuous method, any or all method steps can be discontinuous, or one or more method steps can be continuous or discontinuous. For example, a masterbatch of the composition can be pre-prepared in method step i., or a masterbatch of the plastic material and the plurality of particles can be pre-prepared as defined herein with respect to the composition, and optionally stored before further method steps. It is, for example, possible that a masterbatch of the second plastic material and the plurality of coated particles, or a masterbatch of any one or more of components (a), (b), (c), (d), (e) and (f) can be pre-prepared as defined herein with respect to the composition, and optionally stored before further method steps.

In method step (ii) and/or method step (iii), the plurality of coated particles, optionally together with any one or more of second plastic material (b), blowing agent (c), lubricant (d), pigment (e) and additives/fillers (f), any one or more of which may be provided in the form of a masterbatch, may be melted by application of heat, in forming equipment, for example in an extruder or in moulding equipment, in order to form a closure precursor.

A masterbatch of second plastic material (b) with any one or more of components (c), (d), (e) and (f) may, for example, be pre-prepared, in particular a masterbatch of second plastic material (b) with one or more pigments (e) and/or a masterbatch of second plastic material (b) with one or more blowing agents (c), in particular with expandable microspheres. If a masterbatch of the plastic material and the plurality of particles is pre-prepared, this is then combined with all other components in method step i. of any method as described herein. If a masterbatch of second plastic material (b) and pigment (e), and/or a masterbatch of second plastic material (b) and blowing agent (c), either of which may further comprise any one or more of components (c), (d), (e) and (f), is pre-prepared, this is then combined with the other components in method step i. of any method as described herein. In a discontinuous method, if one or more blowing agents are combined in a discontinuous method step, care must be taken that the temperature to which the blowing agent or blowing agents are exposed is below the initiation temperature for the blowing agent or agents, unless it is intended that the blowing agent or agents are combined during the method step in which foaming takes place. The respective initiation temperature depends on the blowing agent and is known or available to the skilled person.

It is preferred according to the method disclosed herein that during the heating step ii. the plastic material is foamed, preferably that during the heating step ii. the plastic material is foamed to a foam density in the range of from 25 kg/m$^3$ to 800 kg/m$^3$. The plastic material which is foamed can be the first plastic material and optionally also the second plastic material, if a second plastic material is present. References herein to "the plastic material" are generally intended to refer to one or both of the first and second plastic materials.

The heating in method step ii. preferably occurs to a temperature at which the composition provided in method step i. can be foamed to the desired density, and/or the composition can be extruded or moulded to form the closure precursor. If a blowing agent is used which requires heat to provide or initiate the blowing effect, the heating in method step ii. preferably occurs to a temperature at which this blowing effect can occur. The blowing agent is preferably selected from the group consisting of expandable microspheres, chemical blowing agents, physical blowing agents, and combinations of two or more thereof. If the blowing agent comprises or consists of expandable microspheres, a temperature is selected at which the expandable microspheres expand to form expanded microspheres. The expanded microspheres form the individual cells of the plurality of cells. A temperature is preferably selected at which the expanded microspheres have a desired cell size. Suitable temperatures depend principally on the thermoplastic polymer and blowing agent selected and can be easily determined by the skilled person based on the known properties of the thermoplastic polymer and blowing agent and/or based on simple trials. The heating temperature is preferably maintained in the range of from about 120° C. to about 170° C. This temperature range is preferred for all method steps that involve heating, in particular method steps that involve heating a composition comprising cork particles (or coated particles as defined herein), including mixing, combining, extruding and moulding. According to the method of the present disclosure, the temperature in any of steps (i), (ii), and (iii) preferably does not exceed 200° C., in particular does not exceed 170° C., more particularly does not exceed 165° C. Preferred heating temperature ranges are from 50° C. to 250° C., particularly from 60° C. to 200° C., more particularly from 90° C. to 150° C., or from 100° C. to 150° C. The actual temperature may be higher than the applied temperature, for example by up to 30° C. higher, up to 25° C. higher, up to 20° C. higher, up to 15° C. higher, or up to 10° C. higher, due to other factors which can result in heat generation, such as friction and/or shear. The maintaining of an extrusion or moulding temperature in this range is particularly envisaged during extrusion or moulding of any composition comprising cork powder. In this way, for example, discoloration can be avoided. Should discoloration nonetheless occur this can be at least partially corrected, for example by addition of colorants or other additives, or by bleaching the surface portion of the closure or the closure precursor. During the heating step ii. the plastic material, in particular the first and/or second plastic material, is preferably foamed. Particularly preferably the plastic material is foamed to a foam density in the range of from about 25 kg/m³ to 800 kg/m³, preferably in the range of from about 50 kg/m³ to 800 kg/m³, preferably in the range of from about 75 kg/m³ to 800 kg/m³, preferably in the range of from about 100 kg/m³ to 800 kg/m³, preferably in the range of from about 150 kg/m³ to 700 kg/m³, preferably in the range of from about 150 kg/m³ to 600 kg/m³, preferably in the range of from about 150 kg/m³ to 500 kg/m³, preferably in the range of from about 180 kg/m³ to 500 kg/m³, or in the range of from about 200 kg/m³ to 450 kg/m³, preferably in the range of from about 200 kg/m³ to 420 kg/m³, particularly in the range of from 250 kg/m³ to 420 kg/m³, particularly in the range of from 300 kg/m³ to 420 kg/m³, more particularly in the range of from 300 kg/m³ to 400 kg/m³. In order to achieve such a foam density, the composition obtained in method step (i) preferably comprises at least one blowing agent (c) as defined herein in an amount as defined herein. In particular, the composition obtained in method step (i) may comprise expandable microspheres as blowing agent, in an amount as defined herein. It is also possible to include a low density filler (f) in the composition, such as a foam plastic filler, for example expanded beads, in order to achieve a desired density. A low density filler of this type or any other suitable type may be included in the composition in addition to or instead of a blowing agent (c). This could be advantageous in allowing a desired density, or, for example, in increasing biodegradability of the plastic material, if biodegradable foam plastic is used as filler.

According to a preferred aspect of the method of the present invention, the second plastic material as used in the method according to the invention has a an average particle size distribution $D_{50}$ measured by means of mechanical sieving according to ISO ICS 19.120 and in particular ISO 2591-1:1988, of less than 1000 microns, in particular less than 800, 600, 500, 400, 300, 200 or 50 microns, in particular in a range of from 50 microns to 1000 microns, particularly in a range of from 100 microns to 800 microns, more particularly in a range of from 200 microns to 600 microns, particularly in a range of from 300 microns to 500 microns. The word "micron" has its usual meaning of a micrometer, denoted as μm. It was found that by using such small particle sizes for the second plastic material, difficulties in processability arising from the inclusion of the plurality of coated particles, as well as potentially negative effects on closure performance and properties, can be eliminated or reduced. Particles of plastic material of such size can be obtained, for example, by suitable milling techniques known to the skilled person, such as cryogenic milling.

Cryogenic milling techniques are known to the skilled person. The milling parameters are determined according to the desired average particle diameter of the second plastic material after milling. The cryogenic milling according to the present disclosure preferably has a shear rate of at least 50 s⁻¹, in particular a shear rate of at least 100 s⁻¹, more particularly a shear rate of at least 200 s⁻¹. The peripheral velocity is preferably in the range from 4 ms⁻¹ to 50 ms⁻¹, preferably from 15 ms⁻¹ to 40 ms⁻¹, preferably at least 25 ms⁻¹, preferably from 25 ms⁻¹ to 40 ms⁻¹. The upper lower limits for the shear rate and peripheral velocity are determined by what is technically possible, together with the desired average particle diameter of the second plastic material.

If the average particle size $D_{50}$ of the second plastic material is below 50 microns, it can become more difficult to handle the particles, for example in terms of delivering them to the method, for example due to increased electrostatics which can make the particles clump and/or stick to surfaces. There may also be safety issues arising from very small particles, such as explosion risk, or health issues associated with respiration of small particles. Such risks are usually more pronounced at smaller particle sizes, for example in the ranges of single digit microns or smaller. Moreover, the increased energy and possibly cost associated with milling the plastic material to a smaller average particle size $D_{50}$ below 50 microns is unlikely to be compensated by any process improvements, such as speed of melting, compared to particles with average particle size $D_{50}$ above 50 microns. If the average particle size $D_{50}$ is above 1000 microns, additional time and/or energy can be necessary to convert the composition to a molten form, if the larger particles take longer to melt. According to this aspect of the present disclosure, the components (a) and (b) which are combined in method step (i) are combined in particulate form with their respective average particle size distributions $D_{50}$ as defined herein. According to this aspect, the combination in method step (i) can take place without heating, or without sufficient heating to melt the plastic material (b); or it can take place with heating sufficient to melt the first plastic material and/or the second plastic material. Preferably the plurality of coated particles and the second plastic material in particulate form are combined substantially without heating, such that the plastic material does not melt or substantially does not melt in method step (i).

It is possible that the second plastic material (b) can be melted prior to being combined with the plurality of coated particles (a), by applying heat to the second plastic material (b) in a method step prior to method step (i). In this case, in step (i) the second plastic material (b) is provided to the method in the form of a melt. It is further possible that heat can be applied during method step (i) in order to melt the first and/or second plastic material and/or in order to maintain the already molten second plastic material (b) in the form of a melt. Providing the second plastic material (b) to method step (i) in the form of a melt can be advantageous, for example if it is desired to provide the second plastic material (b) in a form which does not have an average particle diameter $D_{50}$ less than 1000 μm, for example if the second plastic material (b) is provided to the method in the form of pellets, lentils, or any other form with an average diameter per individual piece of greater than 1000 μm, in particular any commercially available form. Commercially available plastic material can be provided for example in the form of pellets, lentils, or the like, and milled, particularly cryogenically milled, to an average particle diameter $D_{50}$ of less than 1000 μm, as disclosed herein, or second plastic material (b) can be provided to the method in the form of pellets, lentils, or the like, preferably without milling, or if desired with milling to an average particle diameter of greater than 1000 μm.

If the second plastic material (b) is provided to the method in particulate form, in particular having an average particle diameter $D_{50}$ less than 1000 μm, in particular less than 800, 700, 600, 500, 400, 300, 200, 100 or 50 microns, in particular in a range as disclosed herein, the particulate second plastic material (b) can be provided in a step including force-feeding the particulate plastic material (b) to the method, in particular to the equipment used for carrying out the method, in particular to the equipment for carrying out the combination in step (i) of the method, such as an extruder, a blender, or any mixing apparatus known and appearing suitable to the skilled person. Force-feeding can achieve improved homogeneity of feeding, and can help to overcome any process disadvantages associated with the plastic material being in particulate form, such as, for example, difficulty in gravity feeding, or for example plastic material particles sticking to equipment, for example due to static charge.

It is possible that the plastic material comprising one or more thermoplastic polymers is provided in the form of a polymer dispersion, polymer emulsion and/or polymer gum. For example in the form of a latex. Any type of polymer dispersion, polymer emulsion and polymer gum known to the skilled person and appearing suitable may be used. Possible advantages of this form for the provision of the plastic material are that smaller particles of the plastic material are available with lower energy input, and cohesion of the closure components might be improved. It could also make it possible to use more elastic polymers.

According to a preferred aspect, the plastic material is thermoplastically processable, as disclosed herein. The plastic material can be the first and/or second plastic material, preferably first and second plastic material.

According to a particular aspect of the present disclosure, the plastic material comprises one or more polymers that are biodegradable according to US standard ASTM D6400. The plastic material can be the first and/or second plastic material, preferably first and second plastic material. The plastic material preferably comprises one or more polymers that are biodegradable according to European standard DIN EN 13432 (also referred to in the literature as EN 13432). The requirements of ASTM D6400 and DIN EN 13432 are substantially the same, so that a polymer which fulfils the requirements of ASTM D6400 will also fulfil the requirements of DIN EN 13432.

It is preferred according to the present disclosure that at least 90 wt. %, preferably at least 95 wt. %, in particular 100 wt. % of said plastic material is biodegradable according to ASTM D6400. If expandable microspheres are used as blowing agent, there may be a small percentage of non-biodegradable polymer in the plastic material, where this small percentage corresponds to the percentage by weight of the expandable microspheres in the composition or in the closure, or the percentage by weight of the expandable microspheres together with any non-biodegradable polymer provided with the microspheres, for example a carrier polymer in a masterbatch comprising the expandable microspheres. Thus, for example, if 3 wt. % of expandable microspheres, or 3 wt. % of a masterbatch comprising non-biodegradable carrier polymer and expandable microspheres, are present in the composition, up to and including 97 wt. % of the plastic material could be biodegradable.

According to a particular aspect of the present disclosure, from 1% by weight to 49% by weight of the closure, based on the entire weight of the closure, is biodegradable according to ASTM D6400. The percentage by weight of the closure which is biodegradable according to ASTM D6400 is determined principally by the percentage by weight of plastic material in the closure, in particular first and/or second plastic material, preferably first and second plastic material if one or more second plastic materials are present, in particular by the percentage by weight of plastic material which is biodegradable according to ASTM D6400. The percentage by weight of the closure which is biodegradable according to ASTM D6400 is determined in part by the amount of cork in the closure, which should be 51% by weight or more, based on the weight of the closure. If, for example, the composition and/or the closure formed from the composition obtained in method step (i) comprise 51 wt. % of cork and 49 wt. % of biodegradable plastic material, which may be first and/or second plastic material, 49% by weight of the closure will be biodegradable according to ASTM D6400. If one or more non-biodegradable components (c), (d), (e) and or (f) are comprised, the biodegradability will decrease by the weight % amount to which it or they are comprised.

The first and/or second plastic material preferably comprises one or more thermoplastic polymers selected from the group consisting of: polyethylenes; metallocene catalyst polyethylenes; polybutanes; polybutylenes; thermoplastic polyurethanes; silicones; vinyl-based resins; thermoplastic elastomers; polyesters; ethylenic acrylic copolymers; ethylene-vinyl-acetate copolymers; ethylene-methyl-acrylate copolymers; thermoplastic polyolefins; thermoplastic vulcanizates; flexible polyolefins; fluorelastomers; fluoropolymers; polytetrafluoroethylenes; ethylene-butyl-acrylate copolymers; ethylene-propylene-rubber; styrene butadiene rubber; styrene butadiene block copolymers; ethylene-ethylacrylic copolymers; ionomers; polypropylenes; copolymers of polypropylene and ethylenically unsaturated comonomers copolymerizable therewith; olefin copolymers; olefin block copolymers; cyclic olefin copolymers; styrene ethylene butadiene styrene block copolymers; styrene ethylene butylene styrene block copolymers; styrene ethylene butylene block copolymers; styrene butadiene styrene block copolymers; styrene butadiene block copolymers; styrene isoprene styrene block copolymers; styrene isobutylene block copolymers; styrene isoprene block copolymers; styrene ethylene propylene styrene block copolymers; styrene ethylene propylene block copolymers; polyvinylalcohol; polyvinylbutyral; polyhydroxyalkanoates; copolymers of hydroxyalkanoates and monomers of biodegradable polymers; polylactic acid; copolymers of lactic acid and monomers of biodegradable polymers; aliphatic copolyesters; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); aliphatic-aromatic copolyesters, in particular aliphatic-aromatic copolyesters comprising units derived from renewable resources and/or units derived from fossil resources, in particular one or more aliphatic-aromatic copolyesters selected from poly(butylenesuccinate-co-adipate); poly(t-rimethyleneterephthalate); poly(butyleneadipate-co-terephthalate); poly(butylenesuccinate-co-terephthalate); and poly (butylenesebacate-co-terephthalate); polymers derived from lactic acid, copolymers of lactic acid and monomers of biodegradable polymers, in particular selected from polylactic acid; lactic acid caprolactone lactic acid copolymers; and lactic acid ethylene oxide lactic acid copolymers; polymers formed from monomer units selected from vinylidene chloride, acrylonitrile and methyl methacrylate; copolymers formed from two or more monomer units selected from vinylidene chloride, acrylonitrile and methyl methacrylate; PEF, PTF, bio-based polyesters, and combinations of any two or more thereof.

According to a particular aspect, the first and/or second plastic material comprises one or more thermoplastic polymers selected from the group consisting of aliphatic (co) polyesters, aliphatic-aromatic copolyesters, polylactic acid, EVA, olefinic polymers such as metallocene polyethylene, and styrenic block copolymers. Examples of preferred aromatic-aliphatic copolyester, polymers are polybutylenesebacate-co-terephthalate and polybutyleneadipate-co-terephthalate. These thermoplastic biodegradable polymers have processing properties, such as MVR and MFI, similar to PE-LD, meaning they can be processed in a similar fashion as disclosed herein.

The first and/or second plastic material is preferably suitable for food contact and/or food packaging, more preferably complies with relevant national and/or international legislation and/or regulations for food contact and/or food packaging.

The first and second plastic materials may be the same or different. Preferably, the first and/or second plastic materials are identical, in particular have the same chemical composition.

According to a preferred aspect of the method of the present disclosure, said first and/or second plastic material is unfoamed and/or foamed plastic material. Foamed plastic material is preferably formed by foaming the plastic material in melted form with a blowing agent as defined herein, for example by heating the composition formed in method step (i) comprising one or more blowing agents.

The second plastic material (b) in particulate form, may be provided to method step i in combination with any one or more of components (c), (d), (e) and (f), in particular with at least component (e), at least one or more pigments, optionally also or alternatively with component (c), one or more blowing agents, in particular where expandable microspheres are used as blowing agent, optionally also or alternatively with one or more lubricants (d), and optionally also or alternatively with component (f), one or more additives and/or one or more fillers. Preferably the particulate second plastic material (b) is provided to method step (i) at least in combination with one or more pigment. The plastic material and the one or more pigment, and/or any one or more of components (c), (d) and (f) can be combined prior to method step (i), for example by any means of mixing particles known and appearing suitable to the skilled person. It is possible to mill, for example cryogenically mill, the second plastic material together with the one or more pigment. One or more component (c), (d), (e) and/or (f) may be added or combined in method step (i). A two-stage addition or combination is also conceivable, whereby one or more of each of components (c), (d), (e) and (f) is added or combined both prior to method step (i) and in method step (i), provided that the total weight percent amounts according to the present disclosure are maintained.

If second plastic material (b) is provided to method step (i) in the form of a melt, the melt may additionally comprise at least one of components (c), (d), (e) and (f). Any one or more of components (c), (d), (e) and (f) may be combined with second plastic material (b) prior to method step (i), whereby the combining may be in any form known to the skilled person and appearing suitable. Preferred methods of combining are blending and mixing, which may take place with second plastic material (b) in molten form or prior to melting second plastic material (b). According to this aspect of the method, it is preferred that the combination of second plastic material (b) with any one or more of components (c), (d), (e) and (f) takes place in an extruder before, during and/or subsequent to a step of melting second plastic material (b).

According to a preferred aspect, the method according to the invention can comprise, before step (i), a step of heating second plastic material (b), optionally in combination with any one or more of components (c), (d), (e) and (f), to form a melt of plastic material (b), wherein optionally the melt comprises one or more of components (c), (d), (e) and (f).

If second plastic material (b) is provided to method step (i) in the form of a melt, step (i) may be, preferably is carried out at elevated temperature such that at least plastic material (b) is maintained in the form of a melt. According to this aspect, it is preferred that the heating in step (ii) is continuous with the heating in step (i). The heating in each of the steps may be to different temperatures, but is preferably to approximately the same temperature.

If any one or more of components (c), (d), (e) and (f) is or are present, and any one or more thereof is or are provided to method step (i) already pre-combined with second plastic material (b) in the form of a melt, optionally at least one component selected from components (c), (d), (e) and (f), optionally at least two components selected from components (c), (d), (e) and (f), optionally three components selected from components (c), (d), (e) and (f), optionally four components selected from components (c), (d), (e) and (f), or any combination thereof, may be combined with second plastic material (b) prior to method step (i), and prior to, during or after the step of heating second plastic material (b) to form a melt. Alternatively any one or more may be combined during method step (i).

The first and/or second plastic material may be unfoamed and/or foamed first and/or second plastic material. During the method of the present disclosure, said first and/or second plastic material may be unfoamed and/or foamed. The first and/or second plastic material is preferably foamed during the method disclosed herein by means of one or more blowing agents.

The details regarding blowing agents (c) are as disclosed herein.

The composition in step (i) preferably comprises sufficient blowing agent to achieve a desired density of the first and/or second plastic material. Preferably the composition obtained in step (i) comprises from 0 to 10 wt. %, particularly from 0.05 to 10 wt. %, preferably from 0.1 to 7 wt. %, preferably from 0.1 to 4 wt. %, particularly from 0.5 to 4 wt. %, particularly from 1 to 3 wt. %, particularly from 2 to 2.5 wt. % of one or more blowing agents, based on the weight of the composition. Where a blowing agent is provided as part of a masterbatch, or for example as a slurry, the amount of blowing agent means the amount of the active component present in the amount of masterbatch or slurry added, and not the total weight of the masterbatch or slurry. The active component is the blowing agent itself.

The blowing agent (c) is preferably selected from the group consisting of expandable microspheres, chemical blowing agents, physical blowing agents, and combinations of two or more thereof. Suitable blowing agents are as described herein. Expandable microspheres are particularly preferred as blowing agent, as they improve stabilisation of the foamed plastic material comprising the cork particles, which allows an improved homogeneity of the dispersion of cork particles throughout the plastic material, in particular throughout the entire closure. Suitable expandable microspheres are, for example, those commercially available from AkzoNobel under the name Expancel®. The blowing agent (c) may be added to the composition in method step (i) in neat form, or it may be pre-combined with plastic material, in particular with any one or more plastic material to form a masterbatch, or with any other polymer which appears suitable and is known to the skilled person, and then added to the composition in method step (i) in the form of a masterbatch. Such a masterbatch may have a relatively high concentration of blowing agent, for example a blowing agent masterbatch may comprise greater than 50% by weight of blowing agent, preferably greater than 55% by weight, particularly greater than 60% by weight, optionally 65% by weight or more, based on the total weight of the masterbatch. Pre-prepared masterbatches are commercially available. These can be used as bought, with the corresponding concentration of blowing agent, or they can be combined with further polymer, such as one or more polymers disclosed herein as plastic material or with any other polymer which appears suitable and is known to the skilled person. Combination with one or more further polymers may be done if a different concentration of blowing agent is desired, or, for example, if such a combination could contribute to other process parameters, such as rate and/or degree of foaming, distribution of the blowing agent through the composition, compatibility of the blowing agent with the composition components, in particular with the plastic material, ease of dosing. These process parameters can also have an effect on the closure parameters, for example on the mechanical and performance properties of the closure. Other forms of blowing agent are also available, such as slurries in a suitable carrier. Slurries of expandable microspheres are commercially available, for example under the name Expancel® from AkzoNobel. The concentration of expandable microsphere in a slurry may be in the same ranges as disclosed herein for a masterbatch, or may be below 50 wt. %, based on the weight of the slurry, for example in the range of from 20 to 50 wt. %, or from 25 to 50 wt. %. Use of a masterbatch, slurry, or the like may be preferred if expandable microspheres are used as blowing agent. If expandable microspheres are used as blowing agent they are preferably provided to the method in unexpanded form. The expansion of the unexpanded form during the method to give the expanded form of the microspheres may be referred to herein as foaming. Unexpanded expandable microspheres in dry form are in the form of a fine powder. Use of a masterbatch, a slurry or the like can contribute to ease of handling, and/or dosing, and/or feeding to the method. Already expanded microspheres may be used in the method, but would then be referred to as an additive or filler, rather than as a blowing agent.

The closure or closure precursor preferably comprises a plurality of cells, in particular said first and/or second plastic material in the closure or closure precursor comprises a plurality of cells, in particular said first and/or second plastic material comprises a polymer matrix comprising a plurality of cells.

The plurality of cells is preferably a plurality of substantially closed cells, in particular a plurality of closed cells.

The plurality of cells, in particular the plurality of cells comprised in the plastic material, preferably has an average cell size in a range of from about 0.025 mm to about 0.5 mm, in particular from about 0.05 mm to about 0.35 mm.

At least one of the size and the distribution of the plurality of cells in the closure is preferably substantially uniform throughout at least one of the length and the diameter of the closure, preferably wherein at least one of the size and the distribution of the plurality of cells comprised in the plastic material is substantially uniform throughout at least one of the length and the diameter of the closure.

The closure or the closure precursor particularly has an overall density in the range of from 100 kg/m$^3$ to 500 kg/m$^3$, in particular an overall density in the range of from 150 kg/m$^3$ to 450 kg/m$^3$, in particular an overall density in the range of from 200 kg/m$^3$ to 400 kg/m$^3$, in particular an overall density in the range of from 300 kg/m$^3$ to 400 kg/m$^3$, more particularly an overall density in the range of from 325 kg/m$^3$ to 380 kg/m$^3$.

The overall density of the closure or the closure precursor includes both the foam density of the first and/or second plastic material and the density of the cells in the cork particles. The first and/or second plastic material in the closure or closure precursor preferably has a foam density in the range of from 25 kg/m$^3$ to 800 kg/m$^3$. The first and/or second plastic material in the closure or closure precursor can particularly have a foam density in the range of from 50 kg/m$^3$ to 700 kg/m$^3$, more particularly in the range of from 100 kg/m$^3$ to 600 kg/m$^3$, more particularly in the range of from 150 kg/m$^3$ to 550 kg/m$^3$, particularly in the range of from 200 kg/m$^3$ to 500 kg/m$^3$, particularly in the range of from 250 kg/m$^3$ to 450 kg/m$^3$, particularly in the range of from 300 kg/m$^3$ to 450 kg/m$^3$, more particularly in the range of from 300 kg/m$^3$ to 400 kg/m$^3$.

The details regarding lubricants (d) are as disclosed herein, for example in connection with the closure of the invention. In particular, suitable lubricants (d) are those disclosed herein as processing aid. Lubricants (d) are preferably suitable for food applications such as contact with food and packaging of food. Preferred lubricants (d) are selected from synthetic waxes and natural waxes, in particular polyolefin waxes, such as polyethylene waxes and polypropylene waxes, and polyester waxes. Exemplary commercially available lubricants are Licocene® from Clamant, Naftolub® from Chemson, Luwax® from BASF, Ceralene® from Euroceras, and Loxiol® from Emery Oleochemicals. The use of a lubricant in the method of the present disclosure contributes to achieving a desired overall density of the closure, for example achieving a desired density of the plastic material in the closure, for example reducing the density of the plastic material in the closure. The amount of lubricant (d) may be selected within the range disclosed herein. A closure density within the desired range as disclosed herein may be achieved, whilst avoiding possible adverse effects of high lubricant content, such as impaired adhesion between the cork particles and the plastic material. The addition of lubricant (d) to the composition may be at the expense of plastic material. Accordingly, if, for example, a weight percent amount of lubricant (d) is included in the composition obtained in method step (i), the amount of first and/or second plastic material, in particular the total amount of first and second plastic material in the composition and/or in the closure, may decrease by substantially the same weight percent amount, based on the total weight of the composition.

Suitable pigments (e) are conventional pigments as disclosed herein, which are preferably suitable for food applications such as contact with food and packaging of food. Suitable pigments are any pigments or colouring agents known and appearing suitable to the skilled person.

The details of additives and fillers (e) are as disclosed herein. Additives and fillers for use in the present disclosure are preferably suitable for food applications such as contact with food and packaging of food. In addition to the fillers disclosed herein above, fillers can include pre-prepared foam, such as particles of foamed plastic, for example expanded microbeads, which can contribute to achieving a desired closure density. Other suitable fillers are, for example, particulate fillers such as inorganic fillers as disclosed herein and known and appearing suitable to the skilled person, for example in the form of particles, fibres, chips, and the like, in particular in the form of particles; organic fillers in the form of particles, fibres, and the like, for example made from natural/renewable sources such as plant materials, which may be any organic filler known and appearing suitable to the skilled person; as well as, for example, microbeads, and glass balls. Compatibilisers may also be used as additive, for example compatibilisers to improve the interface or adhesion between different components, for example between cork particles and plastic material.

Any one or more of components (c), (d), (e) and (f) may be provided to the method of the present disclosure precombined with any one or more plastic material in the form of a masterbatch. This may be additional to the provision of first and/or second plastic material to the method, such that the total amount of plastic material is increased by use of such a masterbatch, or the masterbatch or respective masterbatches of plastic material with different components may form substantially the total amount of second plastic material (b) provided to the method.

The components (a), (b), and (c) are preferably comprised in the following weight percent amounts, based on the total weight of the composition:
  (a) 55 to 65 wt. %, of the plurality of coated particles (dry weight);
  (b) 24.9 to 34.9 wt. % in particular 25 to 34 wt. %, in particular 27 to 34 wt. % of the second plastic material;
  (c) 0.1 to 4 wt. %, in particular 2 to 2.5 wt. % of a blowing agent selected from expandable microspheres.

The components (a), (b), and (c) may be comprised in the following weight percent amounts, based on the total weight of the composition:
  (a) 65 to 85 wt. %, of the plurality of coated particles (dry weight);
  (b) 14.9 to 29.9 wt. % of the second plastic material;
  (c) 0.1 to 4 wt. %, in particular 2 to 2.5 wt. % of a blowing agent selected from expandable microspheres.

In preferred embodiments of the present disclosure, the total percentage by weight of cork in the closure is at least 51 wt. % based on the total weight of the closure.

Method step iii. can be carried out in any way known to the skilled person and appearing suitable, in particular using known extrusion equipment or known moulding equipment. Multiple tube extrusion or moulding equipment may also be used. A further example of a possible type of forming method is so-called "Strangpressen". The use of the composition according to the invention means it is not necessary to modify the extrusion equipment or the moulding equipment, or any surfaces thereof, nor to modify significantly process or equipment parameters, for example to provide additional heating, in order to prevent undesirable phenomena such as surface melt fracture or surface roughness. This is particularly advantageous in large scale production facilities, particularly in a continuous production process, where it could be impractical, time consuming and expensive to modify significantly equipment and/or process parameters upon switching production from one type of closure to a different type of closure. This applies to all method steps, but especially to heating step ii. as well as to forming step iii.

Preferably the pressure in any of steps (i), (ii) and (iii) does not exceed 30 bar, in particular does not exceed 15 bar or does not exceed 10 bar or does not exceed 8 bar, more particularly does not exceed 5 bar. In a preferred aspect, the pressure in any or all of steps i., and iii. is in a range from 2 bar to 8 bar, particularly is in a range from 2 bar to 5 bar, more particularly is in a range from 3 bar to 5 bar. If a partial vacuum is applied to any of method steps i., ii. and iii., the vacuum is typically in the range of from 70-95%, in particular 75-90%, more particular 77-82%, where 100% represents atmospheric pressure. The vacuum, if applied, is preferably maintained in a range which does not cause the foam or the blowing agent to overexpand, in particular does not cause the cells of the foamed plastic material and/or the expandable microspheres to overexpand, which could result in the cell walls becoming too thin and potentially collapsing upon removal of the vacuum, or upon compression of a closure, for example during bottling. Either or any of too high a pressure and too low a pressure or too high a vacuum could result in a loss of mechanical and performance properties of the closure, in particular properties associated with the closure density and the cellular structure of the closure.

If a peripheral layer is formed in the inventive method, the details regarding the peripheral layer composition are the same as the details regarding suitable materials, compounds, components and compositions described herein with respect to a peripheral layer of the closure of the present disclosure. Any peripheral layer, if present, is preferably formed by means of co-extrusion as described herein and known to the skilled person, which is preferably carried out substantially simultaneously with method step iii. According to a further aspect of the method according to the present disclosure, a method step to form a peripheral layer can be repeated one or more times in order to obtain one or more further peripheral layers, whereby the one or more further peripheral layers are separately extruded in intimate bonded engagement with the cylindrical outer surface of the previous peripheral layer to form a multilayer elongated cylindrical structure.

After the extrusion in method step iii., optionally with co-extrusion of one or more peripheral layers, the closure precursor, which is in the form of a continuous elongated cylindrical length of plastic material or a multi-layer elongated structure, can be cooled by methods known to the skilled person. These include, for example, passing through a cooling bath, spraying, blowing and the like.

It is preferred that the distribution of the plurality of coated particles in the closure or the closure precursor is substantially uniform throughout at least one of the length and the diameter of the closure. It is particularly preferred that the distribution of the plurality of cork particles which form the core of the plurality of coated particles, in the closure or the closure precursor is substantially uniform throughout at least one of the length and the diameter of the closure. This can be achieved with the methods, compositions and closures of the present disclosure.

It is particularly preferred that the plurality of coated particles is distributed homogeneously throughout the closure. It is further preferred that the plurality of cork particles which form the core of the plurality of coated particles, is distributed homogeneously throughout the closure. If the plurality of coated particles and/or the plurality of cork particles comprises particles with two or more different average particle diameter $D_{50}$, for example larger particles and smaller particles as defined herein, each type of particle, for example larger particles and smaller particles, may be respectively distributed homogeneously throughout the closure. Alternatively, one type of particle, for example smaller particles, may be more concentrated in a surface portion of the closure or the closure precursor, and/or in a peripheral layer, and another type of particle, for example larger particles, may be present in a core part, for example a core member, of the closure or the closure precursor. The respective particles are preferably distributed homogeneously throughout whichever part of the closure in which they are present.

In a preferred aspect of the present disclosure, the closure or the closure precursor does not comprise a binder; and/or the closure does not comprise a crosslinking agent; and/or the closure does not comprise a binder and does not comprise a crosslinking agent; and/or the plastic material, in particular the first and/or second plastic material, is not crosslinked by means of a crosslinking agent. These are typically associated with lack of thermoplastic processability.

Whilst extrusion and moulding are both suitable for forming the closure or the closure precursor in method step (iii) and both form part of the present disclosure, extrusion is preferred, and preferably the closure precursor in step iii. is formed by means of monoextrusion or co-extrusion. Monoextrusion is particularly suitable for a closure comprising a core member and no peripheral layer. Co-extrusion is particularly suitable for a closure comprising more than one layer, for example a core member and one or more peripheral layers.

If the closure precursor is formed in method step iii. by means of extrusion, it is cut in method step iv. into lengths suitable for closures. If the closure precursor is formed in method step iii. by means of moulding, it may or may not be necessary to carry out such cutting in method step iv.

The closure precursor and/or the closure may be further subjected to one or more surface treatments such as sanding, chamfering bleaching, and/or coating. The closure is preferably sanded or rectified in method step iv. In particular, the peripheral surface and optionally also the end surfaces of the closure are smoothed, for example by means of sanding, grinding, or polishing, preferably polishing, as is known for natural cork closures. The optional finishing in method step iv., which can be applied to the cut lengths or to moulded closure precursors, can be, for example, printing, coating, or post-treating, any or all or which can be carried out in any way known and appearing suitable to the skilled person. Post-treating can comprise, for example, surface treatments such as plasma treatment, corona treatment, or providing a lubricant to the surface of the closure. If the outermost peripheral surface comprises cork particles, it may be desirable and/or possible to use branding to impart an image or writing onto the peripheral surface or one or both terminating surfaces of the closure, for example using branding methods known for natural cork closures. Chamfering can also be carried out, for example by means of sanding. Bleaching can be advantageous for the appearance of the closure, as it can impart an appearance closer to natural cork closures, for example if the cork has become discoloured at any stage of the production process. Bleaching is a surface treatment and is preferably carried out after rectification. Examples of bleaching agents are hydrogen peroxide and ammonia and in particular a mixture thereof. It may be desirable to quench the bleaching agent, for example using a mixture of ascorbic and citric acids. The bleaching agent or agents and the quenching agent or agents preferably do not leave any residues, odour or flavour on the closure or the closure precursor, in particular do not leave any residues, odour or flavour which would be incompatible with use of the closure in food or beverage applications. Coating is preferably as described herein, for example using a vinyl acrylate copolymer emulsion such as Hydrotopcork, from Mikroquimica.

The finished closure preferably has a surface roughness $R_a$ measured by contact profilometry in the range of from 5 µm to 18 µm, particularly in the range of from 6 µm to 18 µm, particularly from 7 µm to 17 µm, particularly in the range of from 8 µm to 17 µm, particularly in the range of from 9 µm to 16 µm, particularly in the range of from 10 µm to 16 µm, particularly in the range of from 10 µm to 15 µm. A surface roughness in this range is more easily achievable if cork particles with smaller particle sizes $D_{50}$ as defined herein are used, at least in a surface portion of the closure. However, the surface roughness is also affected by rectification, bleaching and coating, whereby bleaching can increase surface roughness and rectification and coating can decrease surface roughness. A surface roughness in this range allows for an efficient printing and might provide a better contact to the surface of the container, in particular compared, for example, to an agglomerate closure, which potentially helps to prevent or reduce leakage or ingress of liquid and/or gases such as air. The surface roughness $R_a$ is the arithmetic average of the absolute measured values, for example the average of three, five, six or ten values.

All details disclosed herein for the closures according to the present disclosure are also relevant for the compositions, methods and uses according to the present disclosure and therefore also form part of the disclosure of the compositions, methods and uses disclosed herein, and vice versa. In particular, all details disclosed herein for the methods of the present disclosure form also form part of the disclosure of the closures, compositions and uses disclosed herein, and vice versa.

The present disclosure also relates to a composition for use in manufacturing a closure for a product-retaining container, comprising as components:
(a) 51 to 80 wt. % (dry weight) or 51 to 85 wt. % (dry weight) of a plurality of coated particles, said coated particles comprising (1) a core comprising cork material and (2) at least one outer shell comprising a first plastic material, said first plastic material comprising one or more thermoplastic polymers;
(b) 12 to 49 wt. % of a second plastic material comprising one or more thermoplastic polymers;
(c) 0 to 10 wt. % of one or more blowing agents;
(d) optionally, 0 to 15 wt. % of one or more lubricants;
(e) optionally, 0 to 2 wt. % of one or more pigments; and
(f) optionally, 0 to 10 wt. % of one or more additives and/or fillers.

The present disclosure also relates to a composition for use in manufacturing a closure for a product-retaining container, comprising as components:
(a) 52 to 100 wt. % (dry weight) of a plurality of coated particles, said coated particles comprising (1) a core comprising cork material and (2) at least one outer shell comprising a first plastic material, said first plastic material comprising one or more thermoplastic polymers;
(b) 0 to 48 wt. % of a second plastic material comprising one or more thermoplastic polymers;
(c) 0 to 10 wt. % of one or more blowing agents;
(d) optionally, 0 to 15 wt. % of one or more lubricants;
(e) optionally, 0 to 2 wt. % of one or more pigments; and
(f) optionally, 0 to 10 wt. % of one or more additives and/or fillers The details of the compositions, such as, for example, preferred amounts and ranges of amounts, and all details regarding components (a), (b), (c), (d), (e) and (f) are as disclosed herein for the present disclosure, in particular for the closures and methods of the present disclosure.

The present disclosure also relates to a closure obtainable from a composition disclosed herein, and to a closure obtainable according to a method as described herein, having the features of any closure as defined herein. These closures are also closures according to the invention.

The present disclosure also relates to a use of a closure according to the present invention for sealing closed a container In a preferred embodiment of the closure and of the use said closure has an oxygen ingress rate measured according to ASTM F1307 of less than about 5 mg, in particular less than about 3 mg, in particular less than about 1 mg oxygen per container in the first 100 days after closing the container. In a further preferred embodiment of the closure and of the use, the oxygen ingress rate is selected from the group consisting of less than about 0.8 mg oxygen, less than about 0.5 mg oxygen, less than about 0.25 mg oxygen, less than about 0.2 mg oxygen and less than about 0.1 mg oxygen, per container in the first 100 days after closing the container. Preferably, the closure of the present disclosure, has an oxygen transfer rate measured according to ASTM F1307 in 100% oxygen of less than 0.05 cc/day, preferably in the range of from 0.002 cc/day to 0.02 cc/day.

The present disclosure also relates to a closure system comprising a product-retaining container and a closure according to the present invention.

According to the present disclosure, a closure can be realized which is capable of providing at least one, particularly more than one, particularly almost all or even all of the needs imposed thereupon by the wine industry, as well as any other bottle closure/packaging industry. As a result, a bottle closure can be attained that can be employed for completely sealing and closing a desired bottle for securely and safely storing the product retained therein, optionally with desired markings and/or indicia printed thereon. The disclosure herein concerning the closures of the present disclosure also applies to the closures prepared by the presently disclosed methods. The disclosure herein concerning the closures prepared by the presently disclosed methods also applies to the closures of the present disclosure.

The present disclosure accordingly comprises an article of manufacture possessing the features, properties, and relation of elements which will be exemplified in the article herein described, and the scope of the present disclosure will be indicated in the claims.

BRIEF DESCRIPTION OF THE DRAWINGS

For a fuller understanding of the nature and objects of the present disclosure herein described, reference should be had to the following detailed description taken in connection with the accompanying drawings, in which.

DETAILED DESCRIPTION

By referring to the FIGURES, along with the following detailed disclosure, the construction and production method for the closures of the present disclosure can best be understood. In these Figures, as well as in the detailed disclosure herein, the closure of the present disclosure, is depicted and discussed as a bottle closure for wine products. However, as detailed herein, the present disclosure is applicable as a closure for use in sealing and retaining any desired product in any desired closure system. However, due to the stringent and difficult demands placed upon closures for wine products, the detailed disclosure herein focuses upon the applicability of the bottle closures of the present disclosure as a closure for wine bottles. However, it is to be understood that this detailed discussion is provided merely for exemplary purposes and is not intended to limit the present disclosure to this particular application and embodiment.

Figure 1:
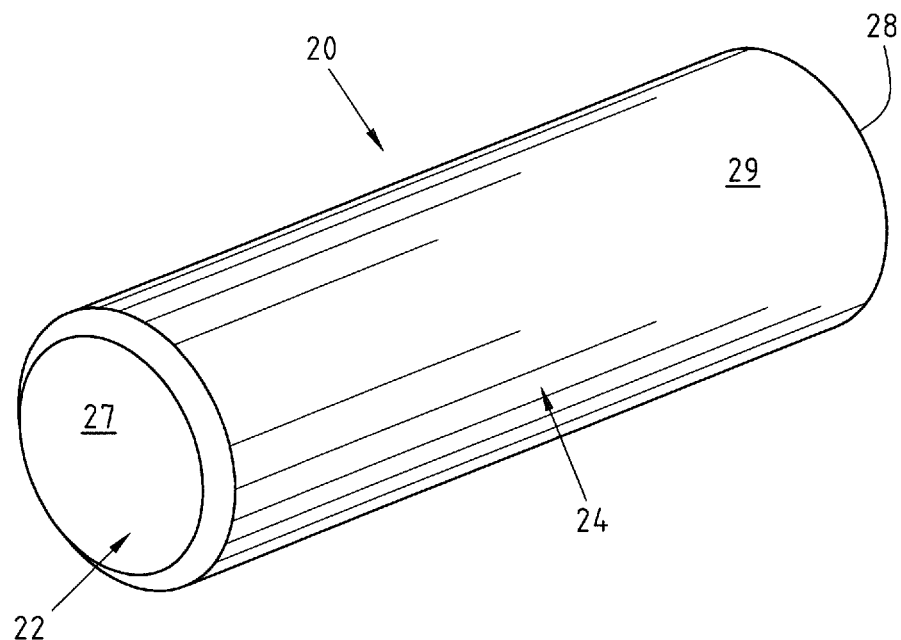
FIG. 1 is a perspective view of a closure according to an aspect of the present disclosure, comprising a peripheral layer.
Figure 2:
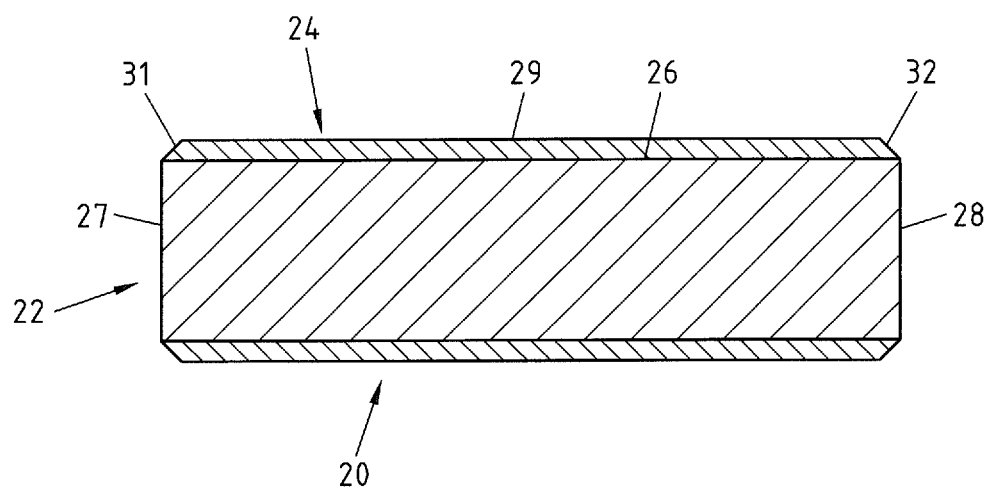
FIG. 2 is a cross sectional-side elevation of a closure according to an aspect of the present disclosure, comprising a peripheral layer.

In FIGS. 1 and 2, the exemplary construction of a closure 20 is depicted comprising a generally cylindrical shape formed by core member 22 and peripheral layer 24 which peripherally surrounds and is intimately bonded to core member 22. In this aspect, core member 22 comprises a substantially cylindrically shaped surface 26, terminating with substantially flat end surfaces 27 and 28. Whenever applicable, the following detailed description of a closure having a layered structure, i.e. a core member and a peripheral layer, shall also apply to closures without a peripheral layer and also to multilayer closures having more than one peripheral layer.

In an exemplary aspect, peripheral layer 24 is intimately bonded directly to core member 22, peripherally surrounding and enveloping surface 26 of core member 22. Peripheral layer 24 incorporates exposed surface 29, which comprises a substantially cylindrical shape and forms the outer surface of bottle closure 20, along with surfaces 27 and 28 of the substantially flat terminating ends.

In order to assist in assuring entry of bottle closure 20 into the portal of the bottle into which closure 20 is inserted, terminating edge 31 may be beveled or chamfered. Similarly, terminating edge 32 may comprise a similar bevel or chamfer. Although any desired bevel or chamfered configuration can be employed, such as a radius, curve, or flat surface, it has been found that by merely cutting ends 31 and 32 with an angle of about 45° or about 60° the desired reduced diameter area is provided for achieving the desired effect. The chamfer angle and the chamfer length, i.e. the length of the chamfered surface as measured between surface 26, or surface 29 if a peripheral layer is comprised, are exemplarily within the ranges described herein for still wine closures or champagne closures.

By incorporating chamfered or beveled ends 31 and 32 on bottle closure 20, automatic self-centering is attained. As a result, when bottle closure 20 is compressed and ejected from the compression jaws into the open bottle for forming the closure thereof, bottle closure 20 is automatically guided into the bottle opening, even if the clamping jaws are slightly misaligned with the portal of the bottle. By employing this configuration, unwanted difficulties in inserting bottle closure 20 into any desired bottle are obviated. However, in applications which employ alternate stopper insertion techniques, chamfering of ends 31 and 32 may not be needed. Further, in order to facilitate the insertion of the closure into the bottle neck, the outer surface can fully or partly be coated with suitable lubricants, for example with silicones. Coating with a lubricant can be carried out by a variety of techniques known in the art, including tumbling and/or extrusion coating. For closures for champagne or sparkling wine, if a silicone lubricant is used a crosslinkable silicone is preferred since silicone can act as an antifoaming agent.

In order to produce the attributes suitable for use in the wine industry, core member 22 is formed from foam plastic material as described herein using a continuous extrusion process or a moulding process. Extrusion processes are preferred.

Figure 3:
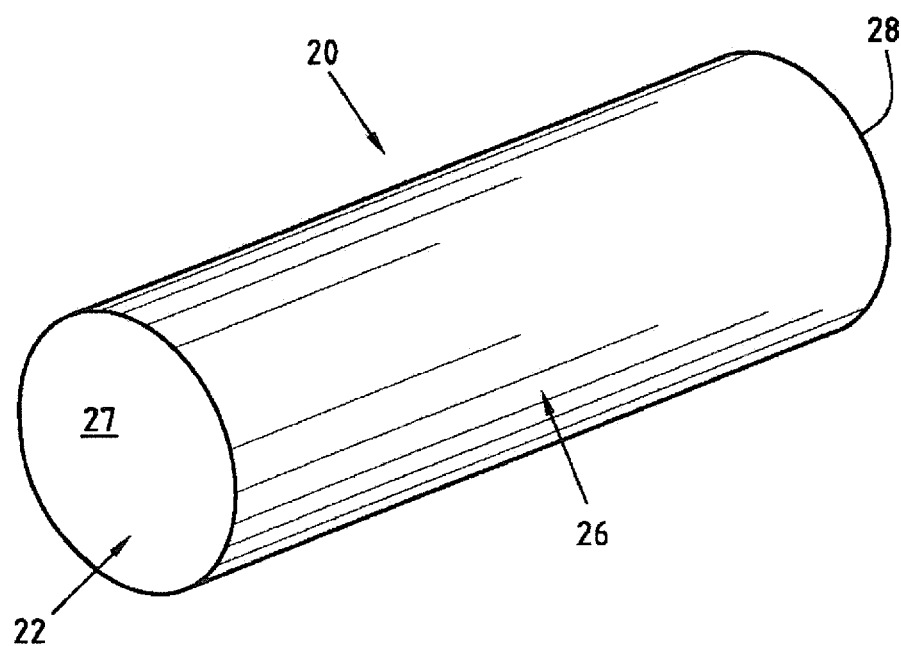
FIG. 3 is a perspective view of a closure according to an aspect of the present disclosure, not comprising a peripheral layer.

In FIG. 3, the exemplary construction of a closure 20 is depicted comprising a generally cylindrical shape formed by core member 22. In the exemplary aspect, core member 22 comprises a substantially cylindrically shaped surface 26, terminating with substantially flat end surfaces 27 and 28. In FIG. 3, closure 20 is shown without a peripheral layer. While closure 20 is depicted in FIG. 3 with a chamfered end, closure 20 can also be formed without chamfering.

While the Figures show cylindrical closures, closures for sparkling wine bottles are also encompassed by the invention.

Any embodiment or aspect described or defined herein, whether defining a closure, a composition, or a method, may be combined with any other aspect or embodiment, or any features thereof, whether defining a closure, a composition, or a method, even when such a combination is not explicitly stated. All combinations of embodiments, aspects and features are within the scope of the present invention. In particular, any aspect of any claim may be combined with any aspect of any one of more claims. Where numerical ranges are defined, any numerical limit of any range may be combined with any other numerical limit of the same range. For example, an upper limit of a range may be combined with an upper limit of a range, or a lower limit of a range may be combined with a lower limit of a range, or an upper limit of a range may be combined with a lower limit of a range, while remaining within the scope of the present invention.

Test Methods:

The Mocon test for OTR/oxygen ingress rate was carried out using 100% oxygen according to ASTM F-1307.

Extraction Force:

The test for extraction force was carried out on a random sample selection according to the methods described in WO 03/018304 A1 (extraction test, p. 48, l. 13-p. 49, l. 10), which are herewith incorporated and form part of the present disclosure. Three empty, clean "Bordeaux" style wine bottles were stoppered using a semi-automatic corking machine (Model 4040 from GAI S.p.A., Italy). The bottles were stored for one hour. The closures were then extracted at ambient temperature using a Dillon AFG-1000N force gauge (from Dillon/Quality Plus, Inc., USA) to measure the force required for extraction.

Surface Hardness:

The surface hardness is tested at room temperature (25° C.) using a Shore 902 automatic operating stand from Instron according to ASTM D2240-10.

Coefficient of Friction:

The dynamic coefficient of friction was measured according to ASTM D1894-14 at room temperature (25° C.) using an Instron Model 2810 Coefficient of Friction Testing Fixture. For the measurement of the dynamic coefficient of friction, a closure was split in half along its long axis and mounted to a steel plate with the flat side of the interior of the closure. This specimen was then loaded with 200 gram weight and pulled across a stainless steel surface at 15.2 cm/min.

Releasable Haloanisole

The amount of haloanisole released from a cork into wine can be measured as so-called "releasable haloanisole" by soaking a cork or a sample of corks in a wine for 24 hours for an untreated cork or 48 hours for a treated cork, and measuring the amount of each haloanisole compound in the wine by means of gas chromatography. An acceptable level is generally considered to be one which results in an amount of the respective chloroanisole or chloroanisoles in the wine which is below the average sensory threshold of about 6 ng/L for TCA or TBA, preferably less than about 2 ng/L.

Surface Roughness:

The surface roughness $R_a$ was determined using a contact profilometer (Manufacturer: Time Group Inc., Model: TR100 Surface Roughness Tester).

Cork Humidity

The amount of moisture in the cork particles was measured as the weight loss after 10 minutes heating at 110° C. Method according to ISO 9727-3 and ISO15512:2016.

EXAMPLES

Example 1—Preparation of Coated Cork Particles

Preparation of 1 kg of Material:

540 g of cork particles A and 130 g of cork particles B, where cork particle A size>cork particle B size, are poured into a high speed mixer. The cork particles are mixed until the high speed mixer reaches a temperature of 65° C. (due to the friction+a heating jacket). Then 290 g of EVA powder and 40 g of a synthetic wax are poured on the cork particles while mixing. The blend is poured into a cold mixer and mixed while cooling.

Example 2—Formation of a Closure by Moulding Using the Coated Cork Particles 9 g of the coated particles obtained in Example 1 are poured into a cylindrical mold (diameter 26 mm approximately), the mold is closed with a press until the cylinder reaches approximately 45 mm length. The mold is placed in an oven at 120° C. for 25 minutes. After cooling until room temperature, the mold is opened. The cylinder obtained (closure precursor) is rectified to obtain a closure with the desired dimensions.

Example 3—Formation of a Closure by Extrusion Using a Mixture of Coated and Uncoated Cork Particles The blend composition of the following table was poured into an extruder.

| | |
|---|---|
| Cork particles A coated with EVA (70:30) | 25% |
| Cork particles B | 35% |
| Plastic material | 29% |
| Lubricant (d) | 6% |
| Blowing agent masterbatch (65 wt. %) | 3.8% |
| Color masterbatch (2 wt. %) | 1.2% |

Cork particles A were coated as in Example 1. As lubricant (d) a wax suitable for food applications was used. A pigment-plastic material masterbatch comprising 2 wt. % of a food-suitable pigment was used as pigment (e).

The extruder is equipped with a vacuum system and multiple temperature zones. The temperatures zones are set between 155° C. and 220° C. The extruded rod is cooled down, cut and rectified to obtain a closure with the desired dimensions. The closure obtained has an OTR measured according to the test method disclosed herein within the range disclosed herein.

What is claimed is:

1. A method for manufacturing a closure for a product-retaining container constructed for being inserted and securely retained in a portal-forming neck of said product-retaining container, said method comprising at least the following method steps:

i. intimately combining the following components, to form a composition:

(a) 51 to 80 wt. % as dry weight or 51 to 85 wt. % as dry weight of a plurality of coated particles, said coated particles each comprising (1) a core comprising cork material and (2) at least one outer shell comprising a first plastic material solidified around and encapsulating the entire core of each of the coated particles after being melted by application of mechanical and/or thermal energy, said first plastic material comprising one or more thermoplastic polymers wherein for each coated particle, the at least one outer shell has a thickness of 10 to 100 microns;
    (b) 12 to 49 wt. % of a second plastic material comprising one or more thermoplastic polymers;
    (c) optionally, 0 to 10 wt. % of one or more blowing agents;
    (d) optionally, 0 to 15 wt. % of one or more lubricants;
    (e) optionally, 0 to 2 wt. % of one or more pigments; and
    (f) optionally, 0 to 10 wt. % of one or more additives and/or fillers;
  ii. heating the composition obtained in step i. to form a melt;
  iii. forming, by means of extrusion or molding, a closure precursor from the melt obtained in step ii; and
  iv. optionally cutting and/or finishing the closure precursor to form the closure.

2. A method for manufacturing a closure for a product-retaining container constructed for being inserted and securely retained in a portal-forming neck of said product-retaining container, said method comprising at least the following method steps:
  i. intimately combining the following components, to form a composition:
    (a) 52 to 100 wt. % as dry weight of a plurality of coated particles, said coated particles each comprising (1) a core comprising cork material and (2) at least one outer shell comprising a first plastic material solidified around and encapsulating the entire core of each of the coated particles after being melted by application of mechanical and/or thermal energy, said first plastic material comprising one or more thermoplastic polymers, wherein for each coated particle, the at least one outer shell has a thickness of 10 to 100 microns;
    (b) 0 to 48 wt. % of a second plastic material comprising one or more thermoplastic polymers;
    (c) optionally, 0 to 10 wt. % of one or more blowing agents;
    (d) optionally, 0 to 15 wt. % of one or more lubricants;
    (e) optionally, 0 to 2 wt. % of one or more pigments; and
    (f) optionally, 0 to 10 wt. % of one or more additives and/or fillers;
  ii. heating the composition obtained in step i. to form a melt;
  iii. forming, by means of extrusion or molding, a closure precursor from the melt obtained in step ii; and
  iv. optionally cutting and/or finishing the closure precursor to form the closure.

3. The method of claim 2, wherein the closure or closure precursor is substantially free of thermoset polymers and/or substantially free of adhesives.

4. The method of claim 2, wherein the closure or closure precursor has a content of releasable trichloroanisole.

5. The method of claim 2, wherein steps i., ii., and iii. are carried out sequentially and/or wherein at least one of steps i., ii., and iii. is carried out in an extruder.

6. The method of claim 2, wherein each one of steps i., ii., and iii. is carried out in an extruder.

7. The method of claim 2, wherein a temperature of the components in any of steps i., ii., and iii. does not exceed 200° C.

8. The method of claim 2, wherein a pressure applied to the components in any of steps i., ii. and iii. does not exceed 30 bar.

9. The method of claim 2, wherein during the heating step ii., at least one of the first plastic material or the second plastic material is foamed.

10. The method of claim 2, wherein the components (a), (b), and (c) are present in the following weight percent amounts, based on the total weight of the composition:
    (a) 55 to 65 wt. % as dry weight of the plurality of coated particles;
    (b) 24.9 to 34.9 wt. % of the second plastic material;
    (c) 0.1 to 4 wt. % of a blowing agent selected from expandable microspheres.

11. The method of claim 2, wherein the components (a), (b), and (c) are present in the following weight percent amounts, based on the total weight of the composition:
    (a) 65 to 85 wt. % as dry weight of the plurality of coated particles;
    (b) 14.9 to 29.9 wt. % of the second plastic material;
    (c) 0.1 to 4 wt. % of a blowing agent selected from expandable microspheres.

12. The method of claim 2, wherein coated particles of said plurality of coated particles have a substantially spherical shape.

13. The method of claim 2, wherein, for each coated particle, the core is a cork particle having a particle size distribution $D_{50}$ measured by means of mechanical sieving according to ISO ICS 19.120, in the range of from 0.25 millimetres to 5 millimetres.

14. The method of claim 2, wherein, for each coated particle, the core is a cork particle, and the cork particles comprise a mixture of at least:
    from 5 wt. % to 100 wt. %, based on the total weight of the cork particles of smaller cork particles having a particle size distribution $D_{50}$ measured by means of mechanical sieving according to ISO ICS 19.120, in the range of from 0.1 millimetres to less than 1.0 millimetre; and
    from 0 wt. % to 95 wt. %, based on the total weight of the cork particles of larger cork particles having a particle size distribution $D_{50}$ measured by means of mechanical sieving according to ISO ICS 19.120, in the range of from 1.0 millimetre to 3.0 millimetres;
  or
  wherein the cork particles comprise a mixture of at least:
    from 5 wt. % to 100 wt. %, based on the total weight of the cork particles of larger cork particles having a particle size distribution $D_{50}$ measured by means of mechanical sieving according to ISO ICS 19.120, in the range of from 1.0 millimetre to 3.0 millimetres; and
    from 0 wt. % to 95 wt. %, based on the total weight of the cork particles of smaller cork particles having a particle size distribution $D_{50}$ measured by means of mechanical sieving according to ISO ICS 19.120, in the range of from 0.1 millimetres to less than 1.0 millimetre.

15. The method of claim 2, wherein, for each coated particle, the core is a cork particle having a water content of less than 3 wt.

16. The method of claim 2, wherein, for each coated particle, the core is a cork particle, and wherein said cork particles have a content of releasable trichloroanisole of less than 6 ng/L.

17. The method of claim 2, wherein, for each coated particle, the core is a cork particle, and wherein the density of said cork particles in the closure precursor or in the closure is in the range of 50 to 100 g/L.

18. The method of claim 2, wherein, for each coated particle, the at least one outer shell has a thickness of 10 to 50 microns.

19. The method of claim 2, wherein said second plastic material comprising one or more thermoplastic polymers has an average particle size distribution D50 measured by means of mechanical sieving according to ISO ICS 19.120, of less than 1000 microns.

20. The method of claim 2, wherein said second plastic material comprising one or more thermoplastic polymers is milled.

21. The method of claim 2, wherein said second plastic material comprising one or more thermoplastic polymers is provided in the form of a polymer dispersion, a polymer emulsion, and/or polymer gum.

22. The method according to claim 2, wherein said second plastic material is provided in the form of a melt.

23. The method of claim 2, wherein at least one of said first plastic material or said second plastic material comprises one or more polymers that are biodegradable according to ASTM D6400.

24. The method of claim 2, wherein at least 90 wt. % of said first plastic material and/or said second plastic material is biodegradable according to ASTM D6400.

25. The method of claim 2, wherein from 1% by weight to 49% by weight of the closure, based on the entire weight of the closure, is biodegradable according to ASTM D6400.

26. The method of claim 2, wherein said first and/or second plastic material comprises one or more thermoplastic polymers independently selected from the group consisting of: polyethylenes; metallocene catalyst polyethylenes; polybutanes; polybutylenes; thermoplastic polyurethanes; silicones; vinyl-based resins; thermoplastic elastomers; polyesters; ethylenic acrylic copolymers; ethylene-vinyl-acetate copolymers; ethylene-methyl-acrylate copolymers; thermoplastic polyolefins; thermoplastic vulcanizates; flexible polyolefins; fluorelastomers; fluoropolymers; polytetrafluoroethylenes; ethylene-butyl-acrylate copolymers; ethylene-propylene-rubber; styrene butadiene rubber; styrene butadiene block copolymers; ethylene-ethyl-acrylic copolymers; ionomers; polypropylenes; copolymers of polypropylene and ethylenically unsaturated comonomers copolymerizable therewith; olefin copolymers; olefin block copolymers; cyclic olefin copolymers; styrene ethylene butadiene styrene block copolymers; styrene ethylene butylene styrene block copolymers; styrene ethylene butylene block copolymers; styrene butadiene styrene block copolymers; styrene butadiene block copolymers; styrene isoprene styrene block copolymers; styrene isobutylene block copolymers; styrene isoprene block copolymers; styrene ethylene propylene styrene block copolymers; styrene ethylene propylene block copolymers; polyvinylalcohol; polyvinylbutyral; polyhydroxyalkanoates; copolymers of hydroxyalkanoates and monomers of biodegradable polymers; polylactic acid; copolymers of lactic acid and monomers of biodegradable polymers; aliphatic copolyesters; polycaprolactone; polyglycolide; poly(3-hydroxybutyrate); poly(3-hydroxybutyrate-co-3-hydroxyvalerate); poly(3-hydroxybutyrate-co-3-hydroxyhexanoate); poly(butylenesuccinate); aliphatic-aromatic copolyesters, in particular aliphatic-aromatic copolyesters comprising units derived from renewable resources and/or units derived from fossil resources, in particular one or more aliphatic-aromatic copolyesters selected from poly(butylenesuccinate-co-adipate); poly(trimethyleneterephthalate); poly(butylenadipate-co-terephthalate); poly(butylenesuccinate-co-terephthalate); poly (butylenesebacate-co-terephthalate); polymers derived from lactic acid, copolymers of lactic acid and monomers of biodegradable polymers, in particular selected from polylactic acid, lactic acid caprolactone lactic acid copolymers; lactic acid ethylene oxide lactic acid copolymers; polymers formed from monomer units selected from vinylidene chloride, acrylonitrile and methyl methacrylate; copolymers formed from two or more monomer units selected from vinylidene chloride, acrylonitrile and methyl methacrylate; PEF, PTF, bio-based polyesters, and combinations of any two or more thereof.

27. The method of claim 2, wherein said first and/or second plastic material comprises one or more thermoplastic polymers independently selected from the group consisting of aliphatic (co)polyesters, aliphatic aromatic copolyesters, polylactic acid, EVA, olefinic polymers, metallocene polyethylene, and styrenic block copolymers.

28. The method of claim 2, wherein said first and/or second plastic material comprises one or more thermoplastic polymers having a melt flow index (MFI) as determined by ISO 1133-1 of greater than 5 g/10 min.

29. The method of claim 2, wherein said first and second plastic materials are identical.

30. The method of claim 2, wherein said first and/or second plastic material comprises unfoamed and/or foamed plastic material.

31. The method of claim 2, wherein the composition in step i. comprises 0.05 to 10 wt. % of the one or more blowing agents.

32. The method of claim 31, wherein the one or more blowing agents are selected from the group consisting of expandable microspheres, chemical blowing agents, physical blowing agents, and combinations of two or more thereof.

33. The method of claim 2, wherein said closure or closure precursor comprises a plurality of cells.

34. The method of claim 33, wherein the plurality of cells comprises a plurality of substantially closed cells.

35. The method of claim 33, wherein each cell of the plurality of cells has an average cell size in a range of from about 0.025 mm to about 0.5 mm.

36. The method of claim 33, wherein at least one of a size and a distribution of cells of the plurality of cells in the closure is substantially uniform throughout at least one of a length or a diameter of the closure.

37. The method of claim 2, wherein the closure or the closure precursor has an overall density in the range of from 100 kg/m$^3$ to 500 kg/m$^3$.

38. The method of claim 2, wherein the first plastic material and/or the second plastic material in the closure or closure precursor has a foam density in the range of from 25 kg/m$^3$ to 800 kg/m$^3$.

39. The method of claim 2, wherein a distribution of the plurality of coated particles in the closure or the closure precursor is substantially uniform throughout at least one of a length or a diameter of the closure.

40. The method of claim 2, wherein coated particles of the plurality of coated particles are distributed homogeneously throughout the closure.

41. The method of claim 2, wherein the closure or the closure precursor does not comprise a binder; and/or wherein the closure does not comprise a crosslinking agent; and/or wherein the closure does not comprise a binder and does not comprise a crosslinking agent; and/or wherein the first plastic material and/or the second plastic material is not crosslinked by means of a crosslinking agent.

42. The method of claim 2, wherein the closure precursor in step iii. is formed by means of monoextrusion or co-extrusion.

43. The method of claim 2, wherein the closure precursor and/or the closure is further subjected to one or more surface treatments comprising sanding, chamfering, bleaching, and/or coating.

* * * * *